(12) United States Patent
Kurose et al.

(10) Patent No.: US 7,580,151 B2
(45) Date of Patent: Aug. 25, 2009

(54) IMAGE PROCESSING SYSTEM AND METHOD, PRINTING SYSTEM

(75) Inventors: Mitsukazu Kurose, Nagano-ken (JP); Ken Ikuma, Nagano-ken (JP); Takeharu Toguchi, Nagano-ken (JP); Koichi Ishii, Nagano-ken (JP); Koji Yanagisawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 682 days.

(21) Appl. No.: 10/953,415

(22) Filed: Sep. 30, 2004

(65) Prior Publication Data

US 2005/0168770 A1    Aug. 4, 2005

(30) Foreign Application Priority Data

| Oct. 1, 2003 | (JP) | ............................. 2003-343692 |
| Oct. 20, 2003 | (JP) | ............................. 2003-359773 |
| Oct. 21, 2003 | (JP) | ............................. 2003-360725 |
| Oct. 30, 2003 | (JP) | ............................. 2003-370788 |
| Nov. 7, 2003 | (JP) | ............................. 2003-379008 |
| Nov. 13, 2003 | (JP) | ............................. 2003-384191 |

(51) Int. Cl.
G06F 3/12 (2006.01)
G06F 9/28 (2006.01)
G06F 13/00 (2006.01)
H04N 1/40 (2006.01)
G06K 9/46 (2006.01)
G06K 9/36 (2006.01)

(52) U.S. Cl. ........................ 358/1.9; 358/1.15; 358/443; 358/444; 382/232; 382/234; 382/276; 382/304

(58) Field of Classification Search .................. 358/1.9, 358/514, 1.16, 444, 1.17, 1.1, 1.13, 1.15, 358/474, 461, 409, 482, 483, 443; 382/304, 382/252, 234, 247, 238, 276, 232; 712/11; 713/375, 401; 348/316, 321; 250/208.1
See application file for complete search history.

(56) References Cited

U.S. PATENT DOCUMENTS

| 5,297,220 | A | * | 3/1994 | Nomizu ....................... 382/247 |
| 5,701,505 | A | * | 12/1997 | Yamashita et al. ............ 712/11 |
| 5,864,652 | A | * | 1/1999 | Murahashi ................. 358/1.16 |
| 6,307,978 | B1 | * | 10/2001 | Metaxas ...................... 382/252 |

(Continued)

FOREIGN PATENT DOCUMENTS

JP    61-133771 A    6/1986

(Continued)

*Primary Examiner*—Edward L Coles
*Assistant Examiner*—Charlotte M Baker
(74) *Attorney, Agent, or Firm*—Sughrue Mion, PLLC

(57) ABSTRACT

When image processing is performed, the present invention increases the speed of processing for an individual scanning line constituting an image, and improves the throughput while suppressing the required memory area. The present invention is an image processor for performing image processing in parallel using a plurality of processors, wherein when an individual scanning line is divided into a plurality of partial areas, at least one of the plurality of processors is allocated to each of the partial areas for at lest one scanning line constituting an image, and image processing is performed in parallel. As a memory area for storing the image processing result, the image processor comprises memory areas for the number of scanning lines, which is less than the number of the plurality of processors.

26 Claims, 70 Drawing Sheets

U.S. PATENT DOCUMENTS

| | | | |
|---|---|---|---|
| 6,529,289 B1 * | 3/2003 | Konno et al. | 358/1.17 |
| 6,683,703 B1 * | 1/2004 | Iwai | 358/461 |
| 7,239,423 B2 | 7/2007 | Toda | |
| 2004/0196483 A1 * | 10/2004 | Jacobsen | 358/1.13 |

FOREIGN PATENT DOCUMENTS

| | | | |
|---|---|---|---|
| JP | 01-282965 A | 11/1989 |
| JP | 07-184060 A | 7/1995 |
| JP | 07-256936 A | 10/1995 |
| JP | 8-324020 A | 12/1996 |
| JP | 9-214748 A | 8/1997 |
| JP | 9-214955 A | 8/1997 |
| JP | 11-138920 A | 5/1999 |
| JP | 2000-207141 A | 7/2000 |
| JP | 2000-244736 A | 9/2000 |
| JP | 2000-335014 A | 12/2000 |
| JP | 2000-351242 A | 12/2000 |
| JP | 2001-246793 | 9/2001 |
| JP | 2003-51019 A | 2/2003 |
| JP | 2003-191539 A | 7/2003 |
| JP | 2003-204435 A | 7/2003 |
| JP | 2003-208607 A | 7/2003 |
| JP | 2003-234879 A | 8/2003 |
| JP | 2003-264690 A | 9/2003 |

* cited by examiner

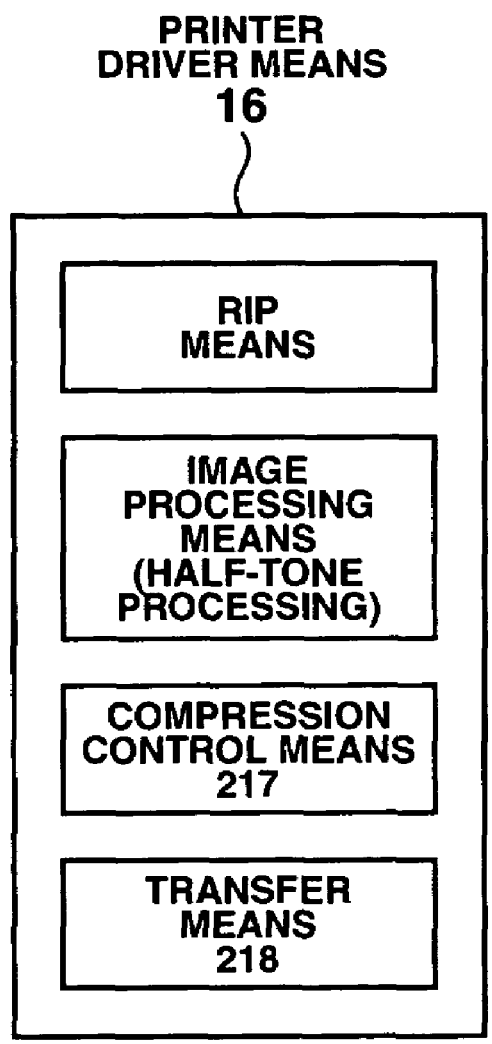
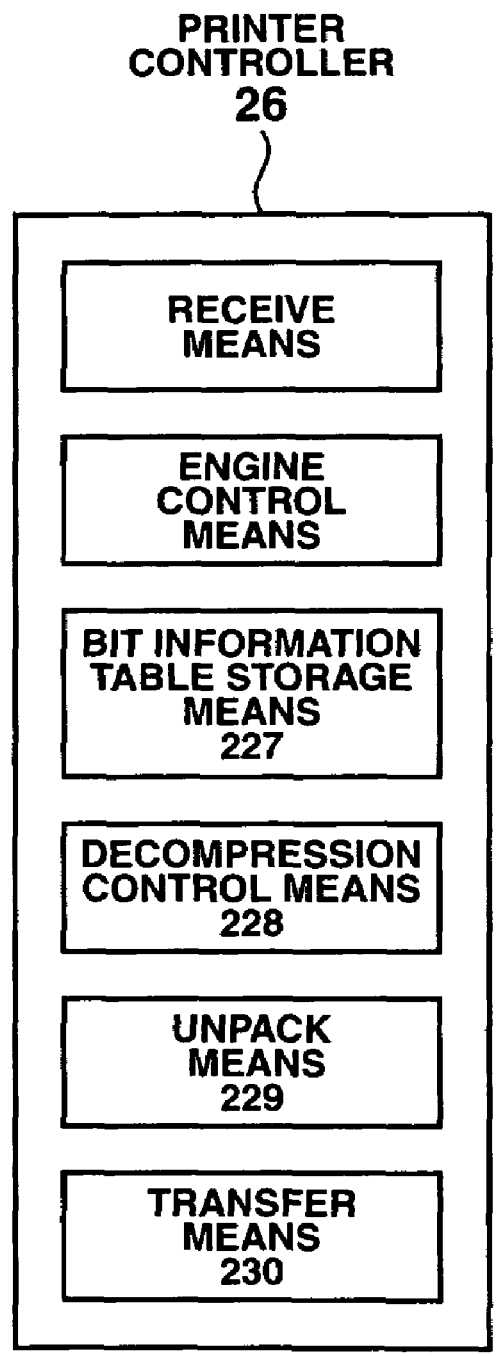

FIG.12A

| 9 | 8 | 7 | 6 | 5 | 4 | 3 | 2 | 1 |
|---|---|---|---|---|---|---|---|---|
| 2 | 1 | 9 | 8 | 7 | 6 | 5 | 4 | 3 |
| 4 | 3 | 2 | 1 | 9 | 8 | 7 | 6 | 5 |
| 6 | 5 | 4 | 3 | 2 | 1 | 9 | 8 | 7 |
| 8 | 7 | 6 | 5 | 4 | 3 | 2 | 1 | 9 |
| 1 | 9 | 8 | 7 | 6 | 5 | 4 | 3 | 2 |
| 3 | 2 | 1 | 9 | 8 | 7 | 6 | 5 | 4 |
| 5 | 4 | 3 | 2 | 1 | 9 | 8 | 7 | 6 |
| 7 | 6 | 5 | 4 | 3 | 2 | 1 | 9 | 8 |

— REFERENCE NUMBER

FIG.12B

| 1 | 1 | 2 | 2 | 2 | 2 | 2 | 3 | 3 |
|---|---|---|---|---|---|---|---|---|
| 3 | 3 | 1 | 1 | 2 | 2 | 2 | 2 | 2 |
| 2 | 2 | 3 | 3 | 1 | 1 | 2 | 2 | 2 |
| 2 | 2 | 2 | 2 | 3 | 3 | 1 | 1 | 2 |
| 1 | 2 | 2 | 2 | 2 | 2 | 3 | 3 | 1 |
| 3 | 1 | 1 | 2 | 2 | 2 | 2 | 2 | 3 |
| 2 | 3 | 3 | 1 | 1 | 2 | 2 | 2 | 2 |
| 2 | 2 | 2 | 3 | 3 | 1 | 1 | 2 | 2 |
| 2 | 2 | 2 | 2 | 2 | 3 | 3 | 1 | 1 |

— BIT LENGTH

FIG.13

| INPUT GRADATION VALUE | OUTPUT GRADATION VALUE | | | | | | | | |
|---|---|---|---|---|---|---|---|---|---|
| | REFERENCE NUMBERS 1 | REFERENCE NUMBERS 2 | REFERENCE NUMBERS 3 | REFERENCE NUMBERS 4 | REFERENCE NUMBERS 5 | REFERENCE NUMBERS 6 | REFERENCE NUMBERS 7 | REFERENCE NUMBERS 8 | REFERENCE NUMBERS 9 |
| 0 ↕ 255 | 0,1,2,3,4,5,6,7 | 0,1,2,3,4,5,6,7 | 0,1,2,3 | 0,1,2,3 | 0,1,2,3 | 0,1,2,3 | 0,1,2,3 | 0,1 | 0,1 |

BIT LENGTH = 3   BIT LENGTH = 2   BIT LENGTH = 1

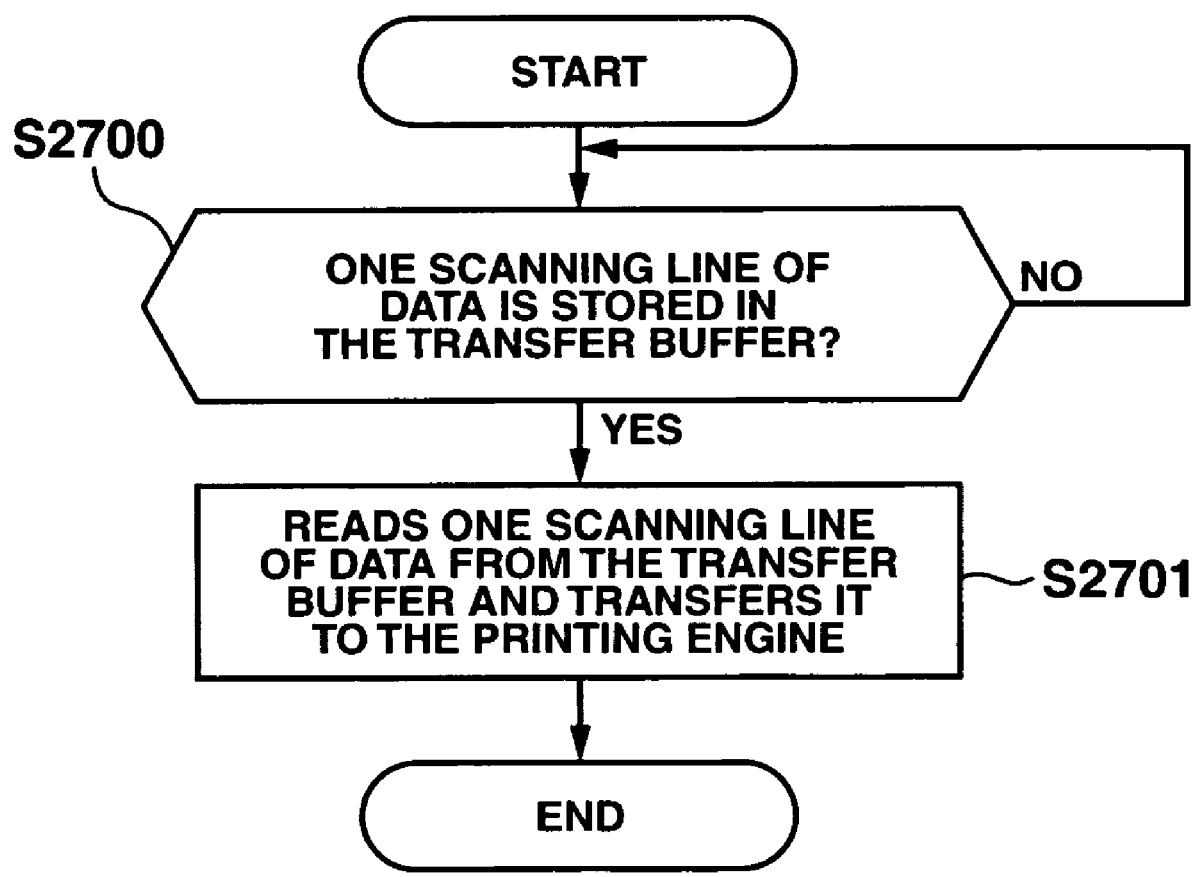

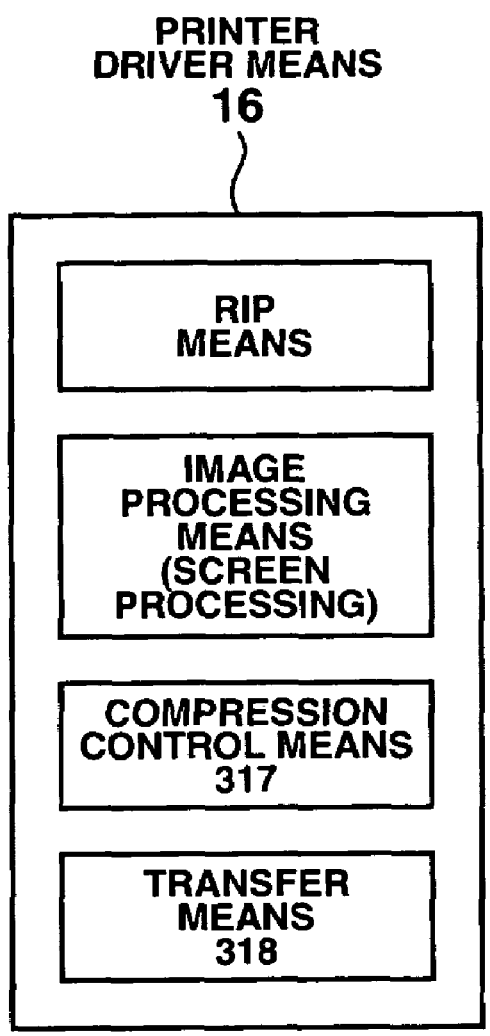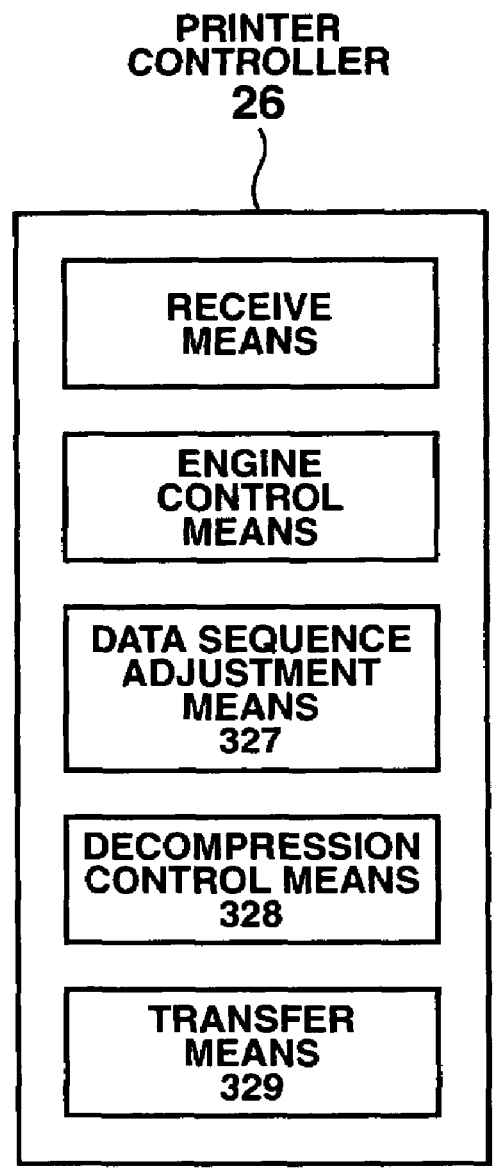

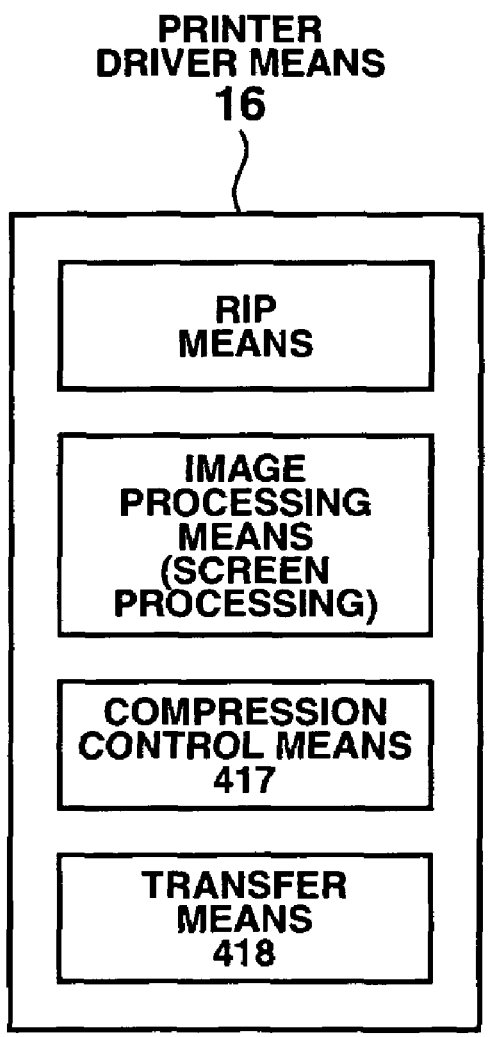
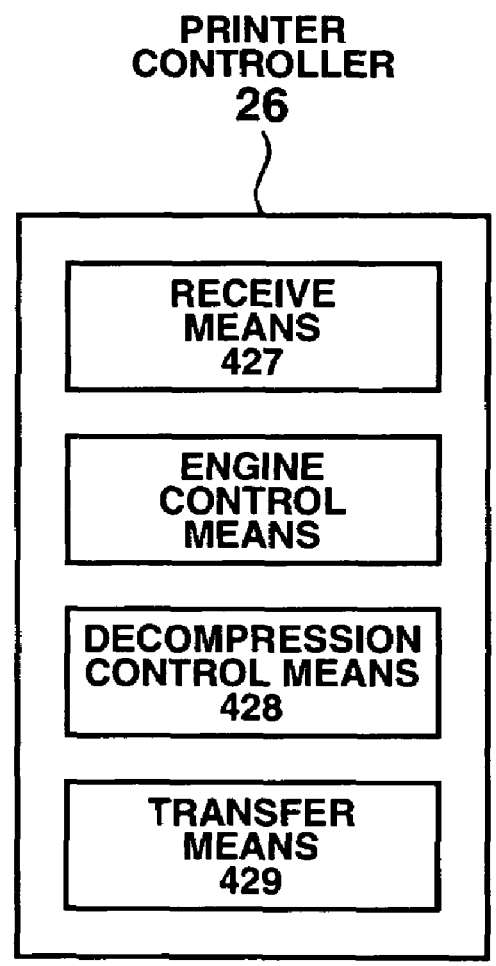

FIG.44

DATA SET TO BE TRANSFERRED BY A ONE BURST-TRANSFER

| | 00 | 01 | 02 | 03 | 04 | 05 | 06 | 07 | |
|---|---|---|---|---|---|---|---|---|---|
| PROCESSORS 11 (CHANNELS 1) | 1-1 -1 | 1-1 -2 | 1-1 -3 | 1-1 -4 | 1-1 -5 | 1-1 -6 | 1-1 -7 | 2-1 -1 | FIRST BURST-TRANSFER |
| | 08 | 09 | 10 | 11 | 12 | 13 | 14 | 15 | |
| PROCESSORS 12 (CHANNELS 2) | 1-2 -1 | 1-2 -2 | 1-2 -3 | 1-2 -4 | 1-2 -5 | 1-2 -6 | 1-2 -7 | 1-2 -8 | |
| | 16 | 17 | 18 | 19 | 20 | 21 | 22 | 23 | |
| PROCESSORS 13 (CHANNELS 3) | 1-3 -1 | 1-3 -2 | 1-3 -3 | 1-3 -4 | 1-3 -5 | 1-3 -6 | 2-3 -1 | 2-3 -2 | |
| | 24 | 25 | 26 | 27 | 28 | 29 | 30 | 31 | |
| PROCESSORS 14 (CHANNELS 4) | 1-4 -1 | 1-4 -2 | 1-4 -3 | 1-4 -4 | 1-4 -5 | 1-4 -6 | 1-4 -7 | 1-4 -8 | |

| | 32 | 33 | 34 | 35 | 36 | 37 | 38 | 39 | |
|---|---|---|---|---|---|---|---|---|---|
| PROCESSORS 11 (CHANNELS 1) | 2-1 -2 | 2-1 -3 | 2-1 -4 | 2-1 -5 | 2-1 -6 | 2-1 -7 | 2-1 -8 | 2-1 -9 | SECOND BURST-TRANSFER |
| | 40 | 41 | 42 | 43 | 44 | 45 | 46 | 47 | |
| PROCESSORS 12 (CHANNELS 2) | 1-2 -9 | 2-2 -1 | 2-2 -2 | 2-2 -3 | 2-2 -4 | 2-2 -5 | 2-2 -6 | 2-2 -7 | |
| | 48 | 49 | 50 | 51 | 52 | 53 | 54 | 55 | |
| PROCESSORS 13 (CHANNELS 3) | 2-3 -3 | 2-3 -4 | 2-3 -5 | 2-3 -6 | 2-3 -7 | 3-3 -1 | 3-3 -2 | 3-3 -3 | |
| | 56 | 57 | 58 | 59 | 60 | 61 | 62 | 63 | |
| PROCESSORS 14 (CHANNELS 4) | 2-4 -1 | 2-4 -2 | 3-4 -1 | 3-4 -2 | 3-4 -3 | 3-4 -4 | 3-4 -5 | 3-4 -6 | |

•
•
•

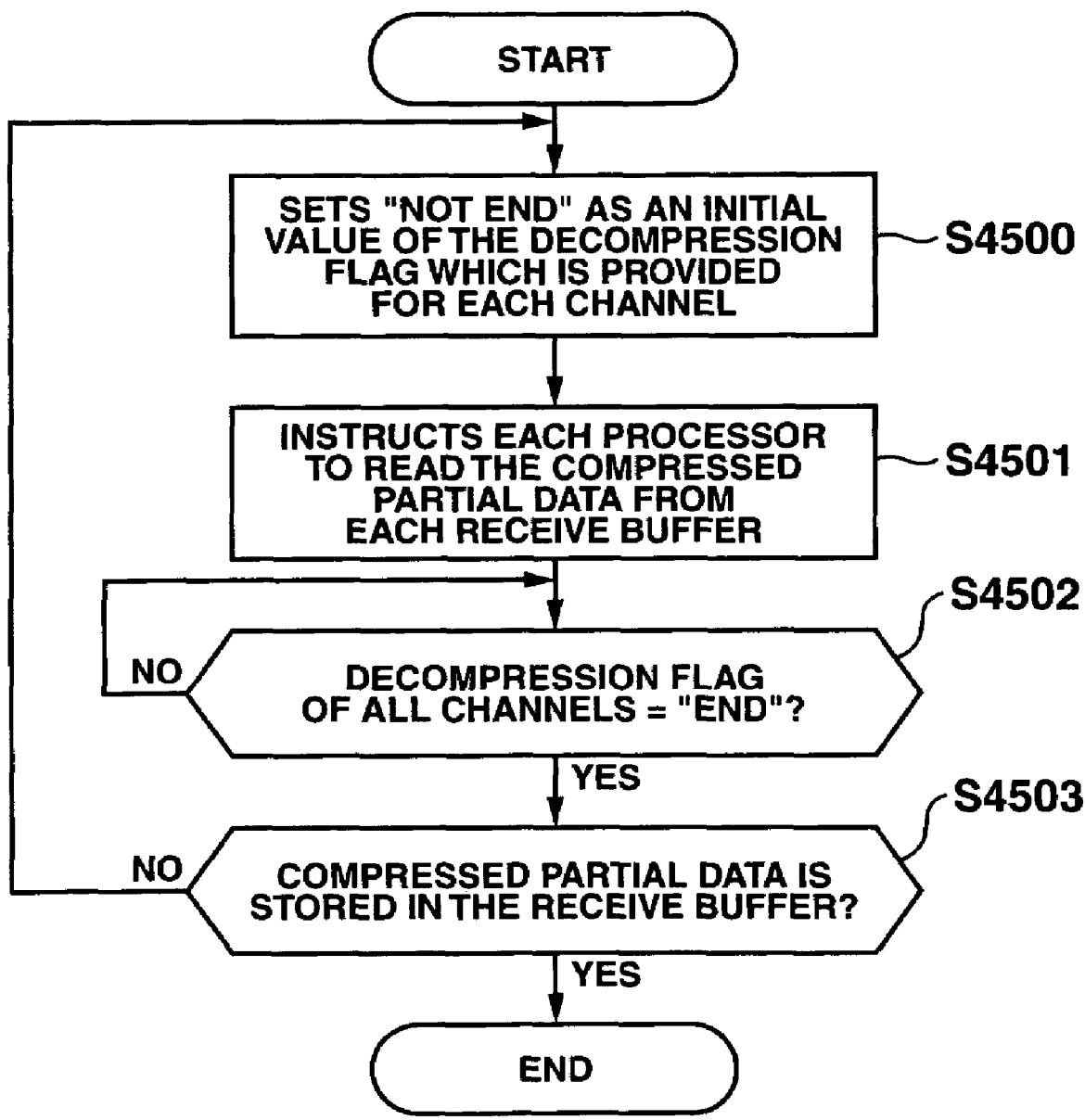

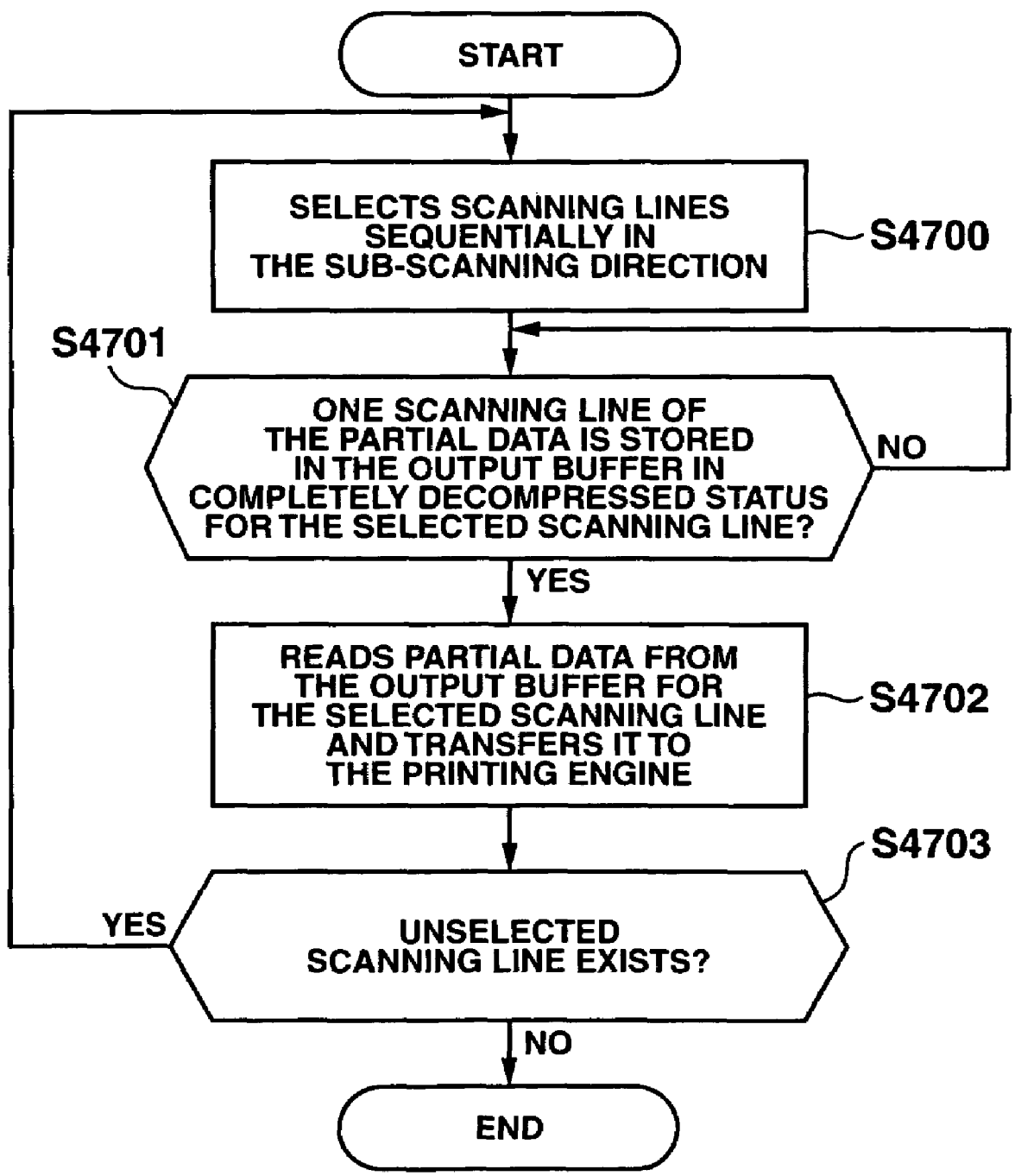

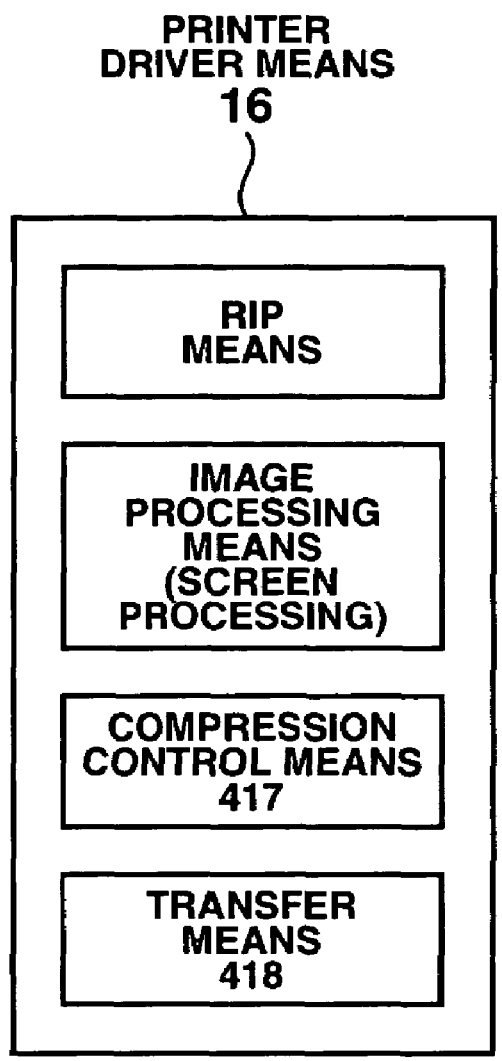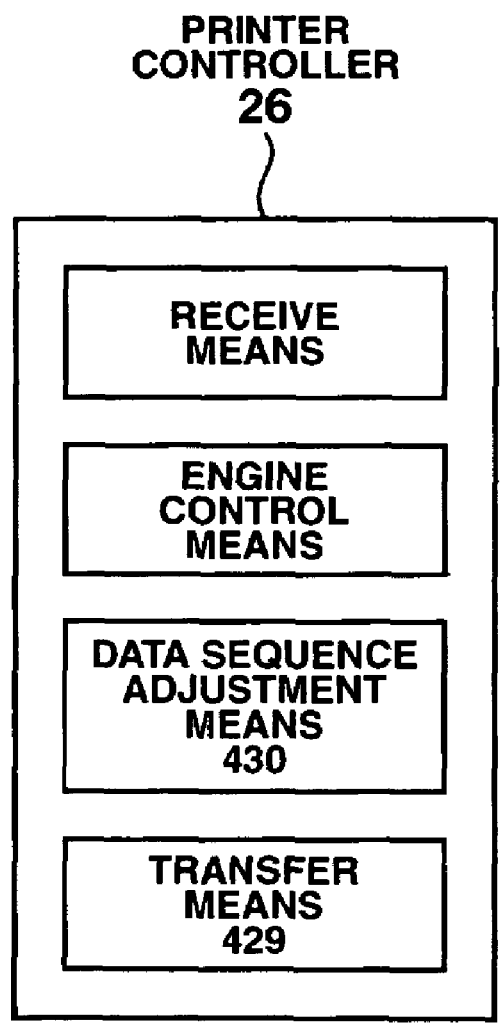

<DECOMPRESSION PROCESSING>

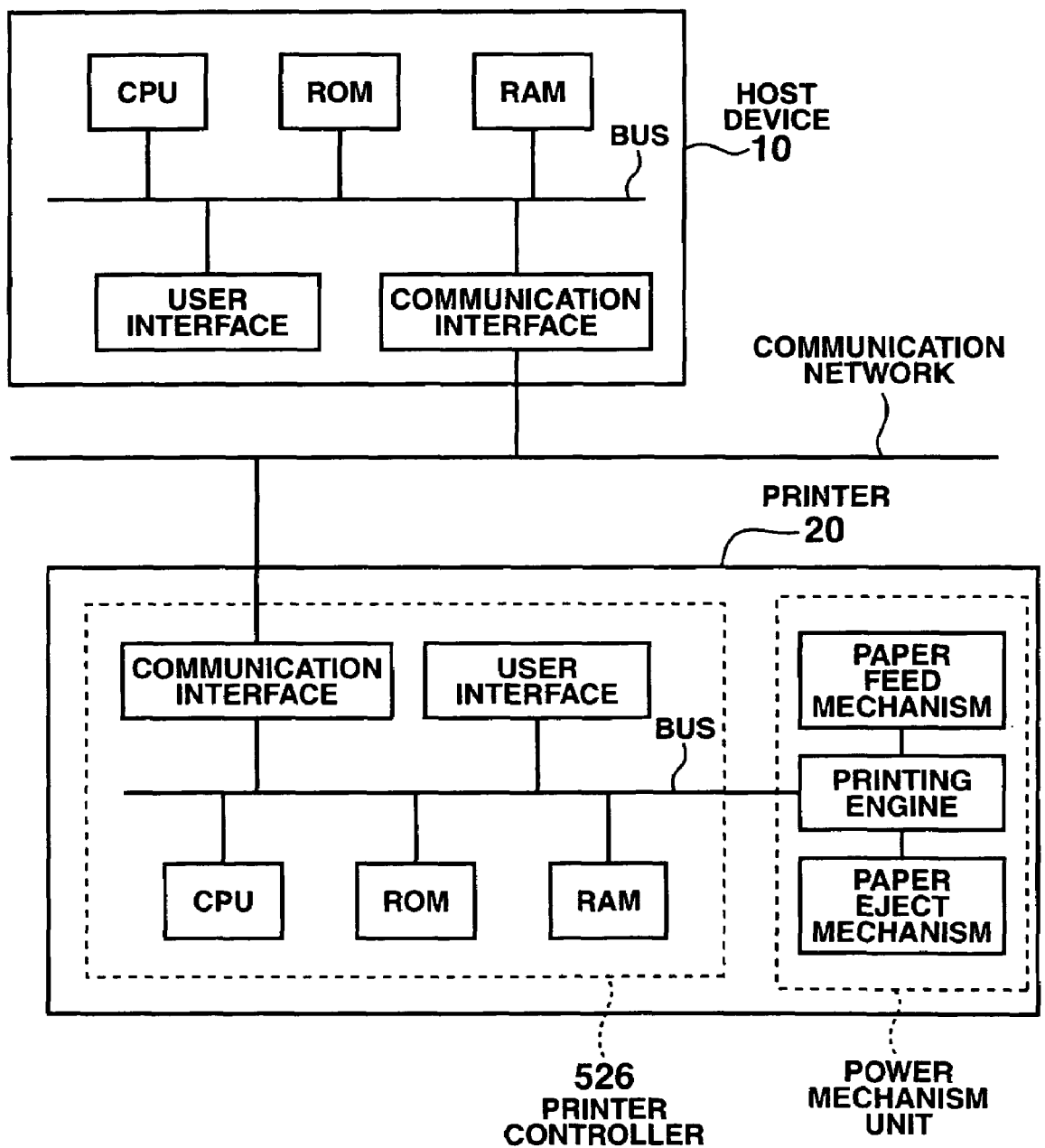

SCREEN TABLE

BIT INFORMATION TABLE

BIT LENGTH

PRINTER SYSTEM 1

FIG.66A

| GRADATION VALUE OF TARGET PIXEL | GRADATION VALUE OF PREVIOUS PIXEL | INTRA-DOT POSITION OF PREVIOUS PIXEL | INTRA-DOT POSITION OF TARGET PIXEL |
|---|---|---|---|
| 0 or 3 | ANY | ANY | RIGHT SHIFT |
| 1 or 2 | 1 or 3 | ANY | RIGHT SHIFT |
| 1 or 2 | 1 or 2 | RIGHT SHIFT | LEFT SHIFT |
| 1 or 2 | 1 or 2 | LEFT SHIFT | RIGHT SHIFT |

FIG.66B

| GRADATION VALUE OF TARGET PIXEL | GRADATION VALUE OF PREVIOUS PIXEL | INTRA-DOT POSITION OF PREVIOUS PIXEL | GRADATION VALUE OF PREVIOUS PIXEL IS LESS THAN THRESHOLD 3 | LATENT IMAGE OF PREVIOUS PIXEL CAN BE INTEGRATED | INTRA-DOT POSITION OF TARGET PIXEL |
|---|---|---|---|---|---|
| 1 or 2 | 0 | ANY | YES | NO | RIGHT SHIFT |
| 1 or 2 | 3 | ANY | NO | YES | RIGHT SHIFT |
| 1 or 2 | 1 or 2 | RIGHT SHIFT | YES | YES | LEFT SHIFT |
| 1 or 2 | 1 or 2 | LEFT SHIFT | YES | NO | RIGHT SHIFT |

INTEGRATION POSSIBILITY PATTERN IN PRIOR ART

INTEGRATION POSSIBILITY PATTERN OF PRESENT INVENTION

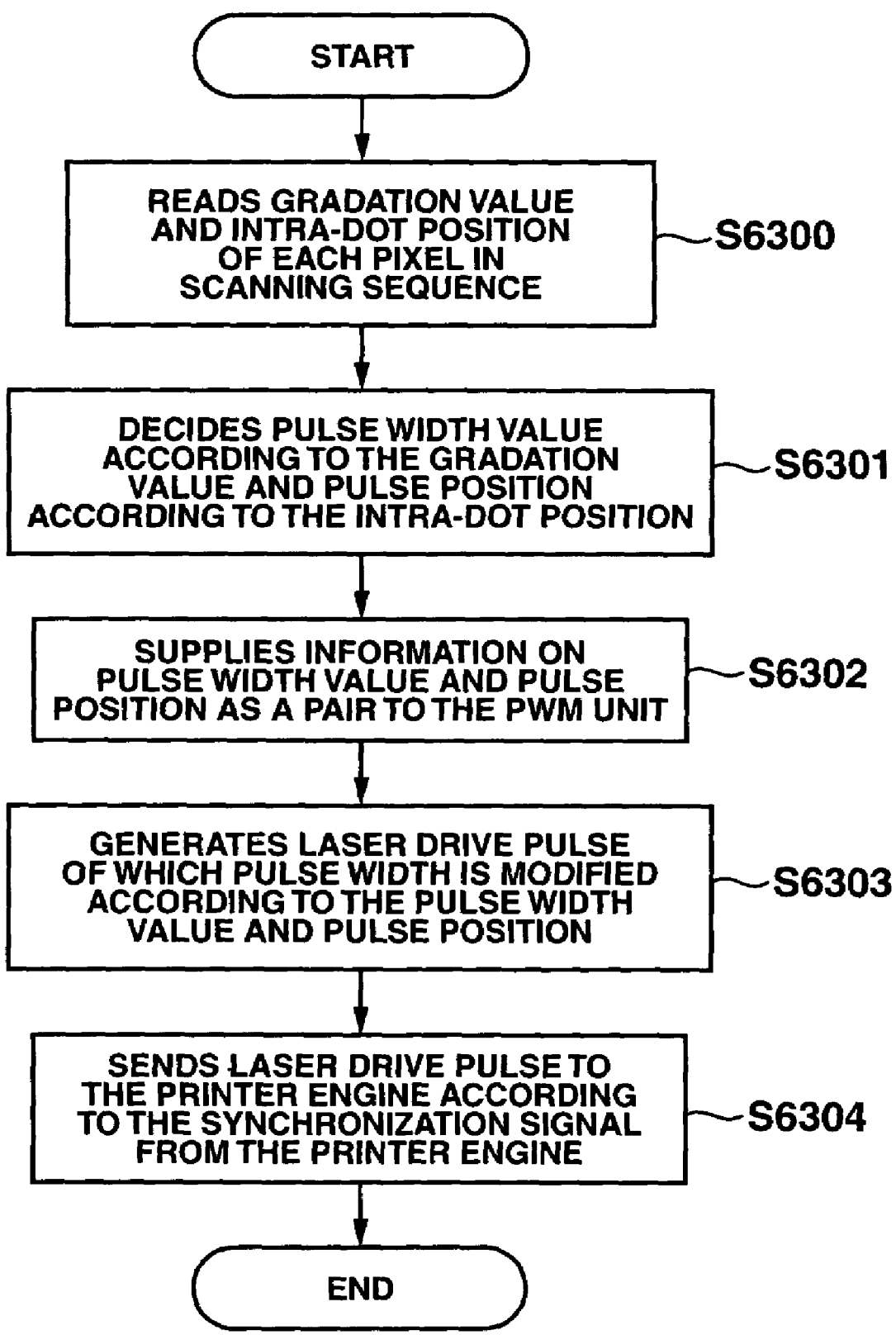

IMAGE PROCESSING SYSTEM AND METHOD, PRINTING SYSTEM

BACKGROUND

The present invention relates to a technology for processing images in parallel using a plurality of processors.

Generally in a laser printer system, a printing target written in PDL (Page Description Language) is developed into a printing image by an RIP (Raster Image Processor), and is subsequently sent to a printing engine to execute printing.

An enormous memory area is required if a complete one page of a printing image is developed and stored. Normally one page is divided into bands comprised of a plurality of scanning lines, and the printing image is developed in these units.

In order to execute this development processing in band units at high-speed, a configuration where each band is assigned to a plurality of processors respectively and development processing is executed in parallel has been proposed (Japanese Patent Application Laid-Open No. 2003-51019).

SUMMARY (1) When a host device has an RIP, it is necessary to send the developed printing image to the printer. In this case, the printing image has a huge data volume, so normally the host device executes compression processing before transmission, and the printer side decompresses the data.

If a host device or a printer comprises a plurality of processors, a possible configuration is that each band is assigned to the plurality of processors respectively, and compression processing and decompression processing are executed in parallel, as shown in Japanese Patent Application Laid-Open No. 2003-51019.

With this method of parallel processing in band units, however, individual scanning line (individual band) data is not parallel-processed. Therefore the time required for receiving the processing result on the first one scanning line (one band) is no different from the case of processing by a single processor. In other words, despite parallel processing by the plurality of processors, no advantage is acquired for startup time until printing is actually executed.

Also in the case of the method of parallel processing in band units, memory areas for storing the processing result are required for the number of processors, so that each processor can execute in parallel for the respective band assigned to each processor. Therefore if the degree of parallel processing is increased by increasing the number of processors, the memory areas required for processing also increases accordingly, which is the first problem.

With the foregoing in view, it is the first object of the present invention to increase the processing speed for each scanning line, and in particular to decrease the time required to receive the initial processing result (startup time).

It is also the first object of the present invention to implement an improvement of throughput while suppressing the required memory areas when processing is performed in parallel by a plurality of processors.

(2) As a result of examining the first problem, the present inventors concluded that the first object could be achieved by image processing to be received in parallel, wherein when an individual scanning line is divided into a plurality of partial areas, at least one of the plurality of processors is allocated to each of the partial areas for at least one scanning line constituting an image.

In other words, it was concluded that when each scanning line (each band) is divided into a plurality of partial areas (hereafter called "channel") perpendicular to the direction of the scanning line, the first object could be achieved by allocating at least one of the plurality of processor to each of the channels and performing image processing (compression processing, decompression processing) in parallel.

Here in the image processing of an individual processor, the following second problem occurs, not only in the case when the image processing is executed by a single processor, but also in the case when parallel processing is performed by a plurality of processors.

In other words, conventionally when image processing is executed, generally it is configured such that each pixel is expressed as 1-byte (or m-bytes) since memory access is based on access in byte units, and image processing is performed on the data in byte units, such as, N bytes (or N×m bytes) are processed if N pixels are processed.

For example, when there are 18 pixels of an image having gradation values, as shown in FIG. 24A, image processing is performed targeting the 18 bytes of the data shown in FIG. 24B according to the conventional configuration. In such a conventional configuration, even if each pixel of the image is expressed by a bit length smaller than 1-byte, this is carried over to 1-byte first, so more memory areas than the capacity of the actual image are required for execution of image processing. Also the portion carried over (remaining 7 bits if the pixel is 1 bit length) is originally unnecessary data (unused bits), but is handled as operation target data in processing, therefore the processing time increases by the operation of this originally unnecessary data.

With the foregoing in view, it is the second object of the present invention to solve the second problem, and to improve the memory efficiency and to decrease the processing time when image processing is executed.

(3) As a result of examining various configurations to achieve the second object, the present inventors concluded that the second problem could be solved by generating a data string (bit string) where the plurality of pixels of gradation data are continuously arrayed, and performing image processing for this generated data string, rather than expressing the gradation data for each pixel in byte units and performing image processing.

Here specific image compression processing/image decompression processing is assumed to mean image processing. In this case, a data string with a plurality of pixels, which are packed in byte units, becomes the target of image compression, and becomes the image decompression result, therefore in order to use the individual pixel data, it is necessary to extract each pixel data (unpack) individually from the image decompression result in packed status.

If the bit length of each pixel is a predetermined value, for example, the data of each pixel can be extracted if the data with the predetermined bit length is extracted sequentially from the beginning of the decompressing result.

Even in the case when each pixel takes one of a plurality of types of bit lengths, if the image decompression processing is performed by a single processor, a table specifying the arrangement of the bit length of each bit (hereafter called "bit information table") is referred to, and the data of each pixel can be extracted by extracting the data with the bit length written in the table sequentially from the beginning of the decompression result.

However in the case when the image decompression processing is performed in parallel, by allocating at least one of the plurality of processors for each of the partial areas, as mentioned above, the start position of each partial area and the start position of the cycle pattern of the lineup of the bit lengths do not always match, so each processor cannot obtain the correct bit length of each pixel (cannot appropriately unpack) by the method of applying the cycle pattern sequentially from the beginning of its own partial area, which is the third problem.

With the foregoing in view, it is the third object of the present invention to solve the third problem, and to provide a framework to appropriately unpack, in the case when at least one of the plurality of processors is allocated to each of the partial areas, and image decompression processing is performed in parallel.

(4) When compressed data of each channel is transferred from the host device to the printer side, it is preferable to have a configuration to perform a burst-transfer in data set units, which includes the compressed data with the same capacity (e.g. n bytes) for each channel, so as to transfer data at high-speed. In particular, by storing parallel compression data in an SDRAM (Synchronous Dynamic Random Access Memory) in advance at the host device side, the burst-transfer can be performed at a higher speed.

When parallel decompression is performed at the printer side using a plurality of processors, on the other hand, it is preferable to have a configuration which allows each processor to always read the compressed data from a same location using an FIFO (First-In-First-Out) memory, so as to simplify the processing of each processor.

However simply combining a burst-transfer and FIFO memory, that is performing decompression processing by storing the burst-transferred compressed data in a single FIFO memory, generates the fourth problem described below.

Normally the size of compressed data for one channel differs depending on the compression status, so if a burst-transfer is performed in data set units with the same capacity for each channel, compressed data, of which the scanning lines (bands) are different depending on the channel, is included in the data sets to be transferred in one burst-transfer.

This situation will be described with reference to FIG. 36 to FIG. 38, using the case of dividing a scanning line into four channels as an example. Now it is assumed that the compressed data is stored in the host device, as FIG. 36 shows, and a burst-transfer is performed in 4-byte data set units, including one byte of compressed data per channel, as FIG. 37 shows. In this case, in the, data sets to be transferred in a $1^{st}$-$6^{th}$ burst-transfer, compressed data on the first scanning line is included for each channel. However in the case of the data set to be transferred by the $7^{th}$ burst-transfer, the $1^{st}$, $2^{nd}$ and $4^{th}$ channels are compressed data on the first scanning line, and the $3^{rd}$ channel is compressed data on the second scanning line, that is compressed data on a different scanning line is included depending on the channel.

In this way, if the result after the burst-transfer is directly stored in the FIFO memory, the lineup of the scanning lines are not maintained (that is, the lineup of a scanning line is partially reversed) in the stored data, as shown in FIG. 38. If data is read from the FIFO memory in this status and the operation of each processor is attempted to be synchronized in scanning line units, the processor in-charge of the $3^{rd}$ channel ends the decompression processing on the first scanning line and stops at the point when the data at the $6^{th}$ byte of the $3^{rd}$ channel in the first scanning line (code 1-3-6) is read, and waits for the start of decompression processing for the second scanning line. In this case, the data at the $1^{st}$ byte of the $3^{rd}$ channel in the second scanning line (code 2-3-1) is not read and remains in the FIFO memory, so the processor in-charge of the $4^{th}$ channel cannot read the data at the $7^{th}$ byte of the $4^{th}$ channel in the first scanning line (code 1-4-7).

Therefore in the case of a configuration where the compressed data after a burst-transfer is directly stored in an FIFO memory and decompression processing is performed, the decompression processing cannot be performed in parallel with synchronizing the operation of each processor in scanning line units (or band units), which is the fourth problem.

With the foregoing in view, it is the fourth object of the present invention to solve the fourth problem and to provide a framework to synchronize the operation of each processor in scanning line units or band units, and execute the parallel processing at high-speed, while implementing the compatibility of the configuration of receiving burst-transferred compressed data and the configuration of reading the compressed data from the FIFO memory and decompressing it in parallel.

(5) To solve the first problem, the image processor of the present invention is an image processor for performing image processing in parallel using a plurality of processors, wherein when an individual scanning line is divided into a plurality of partial areas, at least one of the plurality of processors is allocated to each of the partial areas for at least one scanning line constituting an image, and image processing is performed in parallel.

According to this configuration, the image processing time for an individual scanning line can be decreased. In particular, the image processing time for the first one scanning line is decreased, so the time required, from the start of the image processing of the image to the end of the image processing of the first scanning line when the processing result thereof becomes available, can be decreased, and the flow of image processing with a quick startup can be implemented.

It is preferable that the image processing is image compression processing or image decompression processing.

It is also preferable that the image processor comprises memory areas for the number of scanning lines, less than the plurality of processors, as memory areas for storing an image processing result.

It is also preferable that the image processor further comprises means of transferring the corresponding image processing result to a processor (a unit) in the subsequent stage in the lineup sequence of the partial areas in the scanning line.

It is also preferable that the image processor further comprises means of transferring the image processing result to a processor (a unit) in the subsequent stage when the image processing result for one scanning line is collected.

According to this configuration of the present invention, only a memory area with a capacity for storing at least one scanning line of an image processing result is available, and the throughput of image processing can be improved by parallel processing.

The printer control unit according to the present invention is a printer control unit comprising a function to perform image processing in parallel using a plurality of processors, wherein when an individual scanning line is divided into a plurality of partial areas, at least one of the plurality of processors is allocated to each of the partial areas for at least one scanning line constituting an image, and image compression processing is performed in parallel, and compressed data corresponding to each partial area is transmitted to a printer.

The printer of the present invention is a printer comprising a function to perform image processing in parallel using a plurality of processors, wherein when an individual scanning line is divided into a plurality of partial areas, compressed partial data corresponding to each of the partial areas is received from the host device for at least one scanning line constituting an image, and at least one of the plurality of processors is allocated to the compressed partial data, and image decompression processing is performed in parallel.

The printer system of the present invention is a printer system comprising a host device and a printer that can communicate with the host device, in which the host device and the printer have a function to perform image processing in parallel using a plurality of processors respectively, wherein when an individual scanning line is divided into a plurality of partial areas, the host device allocates at least one of the plurality of processors to each of the partial areas for at least one scanning line constituting an image, and performs compression processing in parallel, and transmits the compressed data corresponding to each partial area (hereafter called "compressed partial data") to the printer, and when an individual scanning line is divided into a plurality of partial areas, the printer receives the compressed partial data corresponding to each of the partial areas from the host device, and allocates at least one of the plurality of processors to the compressed partial data for at least one scanning line constituting an image, and performs image decompression processing in parallel.

The image processing method of the present invention is an image processing method for performing image processing in parallel using a plurality of processors, wherein when an individual scanning line is divided into a plurality of partial areas, at least one of the plurality of processors is allocated to each of the partial areas for at least one scanning line constituting an image, and image processing is performed in parallel.

According to the present invention, the processing speed for an individual scanning line constituting an image can be increased, and the throughput can be improved while suppressing the size of the required memory area.

(6) To solve the second problem, the image processor of the present invention is characterized in that when the bit length of each pixel of a scanning line constituting an image is L1-LN respectively, image processing for at least one of the scanning lines is performed targeting at least the (L1+ - - - +LN) length data string in which the data of each pixel is lined up.

According to the configuration of the present invention, compared with a conventional configuration where the gradation data of each pixel of the image is carried over in byte units and image processing is performed, image processing can be executed efficiently with suppressing the capacity required for the execution of image processing and the operation target data amount.

The image processor of the present invention is an image processor for performing image processing in parallel using a plurality of processors, comprising control means by which an individual scanning line is divided into a plurality of partial areas, at least one of the plurality of processors is allocated to each of the partial areas for at least one scanning line constituting an image, and image processing is performed in parallel, wherein when the bit length of each pixel of a partial areas corresponding to a processor is L1-LN respectively, the control means controls the processor to perform image processing of the partial area targeting at least the (L1+ - - - +LN) length data string in which the data of each pixel is lined up.

It is preferable that the lineup of the bit length of each pixel in an image has a periodic pattern, and the boundary of the partial area matches at least one of the boundaries of the periodic pattern. In this case, the image processor may further comprise means of storing said periodic pattern, wherein the control means acquires the bit length of each pixel by applying the periodic pattern to (L1+ - - - +LN) length data string, and extracts information for each pixel.

According to this configuration, the start position of each partial area and the start position of the periodic pattern always match, and pixels with bit lengths matching the periodic pattern from the beginning are stored in the data string. Therefore for any partial area, the gradation data of each pixel can be extracted if data with a bit length is extracted sequentially according to the periodic pattern from the beginning of the data string.

It is preferable that at least one of the bit lengths L1-LN of each pixel is different from the other bit lengths.

It is also preferable that the image processing is image compression processing or image decompression processing.

The printer control unit of the present invention is a printer control unit having a function for performing image processing in parallel using a plurality of processors, comprising control means by which when an individual scanning line is divided into a plurality of areas, at least one of the plurality of processors is allocated to each of the partial areas for at least one scanning line constituting an image, and image compression processing is performed in parallel, and compressed data corresponding to each partial area is transmitted to a printer, wherein when the bit length of each pixel of a partial area corresponding to a processor is L1-LN respectively, the control means controls the processor to perform image compression processing of the partial area targeting at least the (L1+ - - - +LN) length data string in which the data of each pixel is lined up.

The printer of the present invention is a printer having a function for performing image processing in parallel using a plurality of processors, comprising storage means for storing a periodic pattern for specifying a lineup of a bit length of each pixel, and control means by which when an individual scanning line is divided into a plurality of areas, compressed partial data corresponding to each of the partial areas is received from a host device, and at least one of the plurality of processors is allocated to the compressed partial data for at least one scanning line constituting an image, and image decompression processing is performed in parallel, and when the bit length of each pixel of a partial area corresponding to a processor is L1-LN respectively, the control means acquires the bit length of each pixel by applying the periodic pattern, and extracts information for each pixel targeting at least the (L1+ - - - +LN) length data string in which the data of each pixel, output by the processor as the result of image decompression processing, is lined up.

The printer system of the present invention is a printer system comprising a host device and a printer that can communicate with the host device, in which the host device and the printer have a function to perform image processing in parallel using a plurality of processors respectively, wherein, the host device comprises first control means for allocating, when an individual scanning line is divided into a plurality of partial areas, at least one of the plurality of processors to each of the partial areas for at least one scanning line constituting an image, performing image compression processing in parallel, and transmitting the compressed data corresponding to each partial data (hereafter called "compressed partial data") to the printer, and when the bit length of each pixel of a partial area corresponding to a processor is L1-LN respectively, the first control means controls the processor to perform image compression processing of the partial area targeting at least the (L1+ - - - +LN) length data string in which the data of each pixel is lined up, and the printer further comprises storage means for storing a periodic pattern for specifying the lineup of the bit length of each pixel, and second control means by which when an individual scanning line is divided into a plurality of partial areas, compressed partial data corresponding to each of thee partial areas is received from the host device, and at least one of the plurality of processors is allocated to the compressed partial data for at least one scanning line constituting an image, and image decompression processing is performed in parallel, and when the bit length of each pixel of a partial area corresponding to a processor is L1-LN respectively, the second control means acquires the bit length of each pixel by applying the periodic pattern, and extracts information for each pixel targeting at least the (L1+ - - - +LN) length data string in which the data of each pixel, output by the processor as a result of image decompression processing, is lined up.

The image processing method of the present invention is an image processing method wherein when the bit length of each pixel of a scanning line constituting an image is L1-LN respectively, image processing for the scanning line is performed for at least one scanning line targeting at least the (L1+ - - - +LN) length data string in which the data of each pixel is lined up.

According to the present invention, the memory efficiency, when image processing is executed, can be improved, and the processing time can be decreased. Also when image decompression processing is performed with allocating at least one of the plurality of processors to each of the partial areas, a framework to appropriately unpack can be provided.

(7) To solve the third problem, the image processor of the present invention is an image processor for decompressing data in parallel targeting data compressed for each partial area when scanning lines (or bands) constituting an image are divided into a plurality of partial areas perpendicular to the direction of the scanning lines, comprising means of reading compressed data of each partial area from a first memory for storing burst-transferred data in data set units including a same capacity of compressed data for each partial area so as to maintain the lineup sequence of the scanning lines (or bands), and transferring the compressed data to an FIFO type second memory; means of allocating at least one of a plurality of processors to the partial areas respectively; and a parallel processor unit in which each processor reads compressed data in the partial area where the processor itself is allocated from the second memory, and executes decompression processing in parallel, synchronizing in scanning line (or band) units.

According to this configuration, when compressed data is decompressed in parallel using a plurality of processors, both the configuration of receiving burst-transferred compressed data and the configuration of reading the compressed data from the FIFO memory and decompressing it in parallel can be compatibly implemented, and parallel processing can be executed at high-speed while synchronizing the operation of each processor in scanning line (or band) units.

The printer of the present invention is a printer comprising the image processor of the present invention.

The image processing system of the present invention is an image processing system comprising an image compression unit and an image decompression unit, each of which has a function to perform image processing in parallel using a plurality of processors, wherein the image compression unit allocates at least one of the plurality of processors to each of the partial areas when a scanning line (or band) constituting an image is divided into a plurality of partial areas perpendicular to the direction of the scanning line, and performs image compression processing in parallel, and burst-transfers the data in data set units including compressed data of which capacity is the same for each partial area, and the image decompression unit receives the burst-transferred data from the image compression unit and stores it in a first memory, reads the compressed data of each partial area from the first memory and transfers it to a second memory so as to maintain the lineup sequence of the scanning lines (or bands), allocates at least one of the plurality of processors to each of the partial areas, and controls each processor to read the compressed data of the partial area where the processor itself is allocated from the second memory, and to perform image decompression processing in parallel synchronizing in scanning line (or band) units.

The image processing method of the present invention is an image processing method for decompressing the data in parallel targeting the data compressed for each partial area when a scanning line (or band) constituting an image is divided into a plurality of partial areas perpendicular to the direction of the scanning line, comprising steps of: receiving burst-transferred data in data set units that include compressed data of which capacity is the same for each partial area and storing it in a first memory; reading the compressed data of each partial area from the first memory and storing it in a second memory so as to maintain the lineup sequence of the scanning lines (or bands); allocating at least one of the plurality of processors to each of the partial areas, and controlling each processor to read the compressed data in the partial area where the processor itself is allocated from a second memory, and controlling to perform image decompression processing in parallel with synchronizing in scanning line (or band) units.

According to the present invention, when compressed data is decompressed in parallel using a plurality of processors, both the configuration of receiving burst-transferred compressed data and the configuration of reading the compressed data from the FIFO memory and decompressing it in parallel can be compatibly implemented, and parallel processing can be executed at high-speed while synchronizing the operation of each processor in scanning line units or in band units.

(8) To solve the fourth problem, the image processor of the present invention is an image processor for decompressing the data in parallel targeting the data compressed for each partial area when a scanning line (or band) constituting an image is divided into a plurality of partial areas perpendicular to the direction of the scanning line, comprising: a plurality of FIFO type memories installed corresponding to each partial area respectively; storage means for distributing burst-transferred data in data set units including the compressed data of which capacity is the same for each partial area, to the compressed data of each area and storing the distributed data in the corresponding memory; and a parallel processor unit in which each processor reads the compressed data of each partial data from a memory corresponding to the allocated partial area respectively, and executes decompression processing in parallel synchronizing in scanning line (or band) units.

The printer of the present invention is a printer comprising the above image processor.

The image processing system of the present invention is an image processing system comprising an image compression unit and an image decompression unit, each of which has a function to perform image processing in parallel using a plurality of processors, wherein the image compression unit allocates at least one of the plurality of processors to each of the partial areas when a scanning line (or band) constituting an image is divided into a plurality of partial areas perpendicular to the direction of the scanning line, and performs image processing in parallel, and burst-transfers the data in data set units including compression data of which capacity is the same for each partial area, and the image decompression unit receives the burst-transferred data from the image compression unit and distributes this received data to the compression data for each partial data, and stores it in an FIFO type memory installed corresponding to each partial area respectively, and each processor reads the compression data of the partial area from each memory allocated respectively, and controls to perform image decompression processing in parallel synchronizing in scanning line (or band) units.

The image processing method of the present invention is an image processing method for decompressing the data in parallel targeting the data compressed for each partial area using a plurality of processors when a scanning line (or band) constituting an image is divided into a plurality of partial areas perpendicular to the direction of the scanning line, comprising steps of: receiving burst-transferred data in data set units including compressed data of which capacity is the same for each partial area, and distributing this received data to the compressed data for each partial area, and storing the distributed data in an FIFO memory installed corresponding to each partial area; and each processor reading the compressed data of the partial areas from a memory allocated to each processor, and controlling to perform image decompression processing in parallel synchronizing in scanning line (or band) units.

According to the present invention, when compressed data is decompressed in parallel using a plurality of processors, both the configuration of receiving the burst-transferred compressed data and the configuration of reading the compressed data from the FIFO memory and decompressing it in parallel can be compatibly implemented, and parallel processing can be executed at high-speed while synchronizing the operation of each processor in scanning line units or band units.

The image processing method of the present invention can be executed by a computer, and the computer program for this can be installed or loaded onto the computer through various medium, such as a CD-ROM, magnetic disk, semiconductor memory and communication network. This includes the case when the computer program is recorded on a card for a printer or an optional board for a printer, and distributed.

DESCRIPTION OF THE DRAWINGS

FIG. 11 is a block diagram depicting the functional configuration of the printer driver means 16 and printer controller 26;

FIG. 12 is a diagram depicting the screen table and bit information table;

FIG. 13 is a diagram depicting the gradation conversion table;

FIG. 22 is a flow chart depicting the processing content of the transfer means 230;

FIG. 25 is a block diagram depicting the functional configuration of the printer driver means 16 and printer controller 26;

FIG. 39 is a block diagram depicting the functional configuration of the printer system;

FIG. 44 is a diagram depicting a data set to be burst-transferred;

FIG. 47 is a flow chart depicting the processing content of the decompression control means 428;

FIG. 49 is a flow chart depicting the processing content of the transfer means 429;

FIG. 50 is a block diagram depicting another functional configuration of the printer controller 26;

FIG. 53 is a block diagram depicting the hardware configuration of the printer system according to the sixth embodiment;

FIG. 66 is a diagram depicting an example of the positional decision rule;

FIG. 69 is a flow chart depicting the processing content of the engine control means 624.

DETAILED DESCRIPTION

First Embodiment

Figure 1:
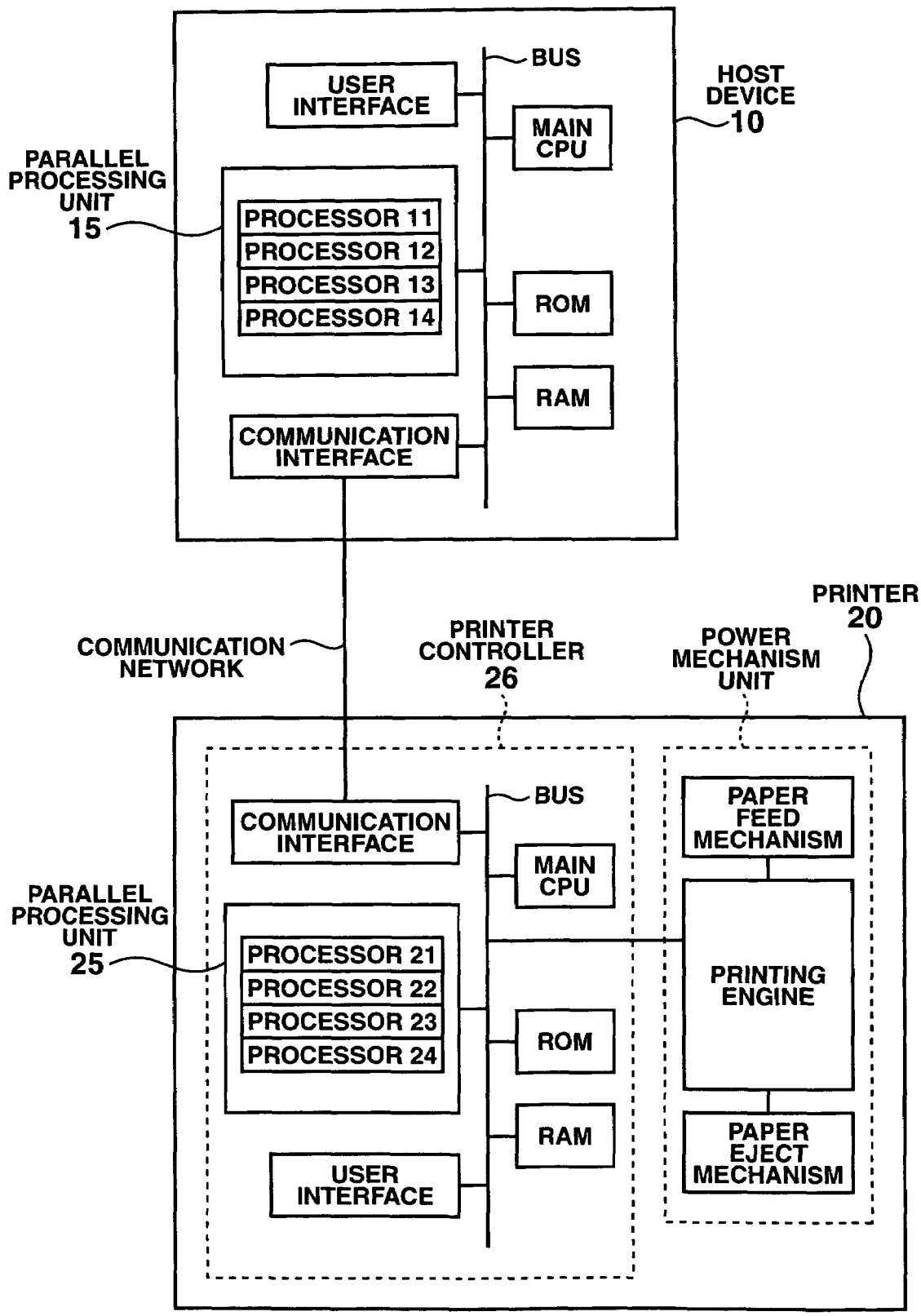
FIG. 1 is a block diagram depicting the hardware configuration of the printer system according to an embodiment of the present invention.

FIG. 1 is a block diagram depicting the hardware configuration of the printer system 1 according to the first embodiment of the present invention. As FIG. 1 shows, the printer system 1 comprises a host device 10 and a printer (image creation device) 20 that can communicate with the host device 10 via a communication network (any one of LAN, Internet, dedicated line, packet communication network, and combination thereof, including both cable and radio).

The host device 10 is comprised of a main CPU, parallel processing unit 15 further comprising parallel processors 11-14, ROM, RAM, user interface, communication interface and other hardware. According to the first embodiment, the parallel processing unit 15 has four processors 11-14, but the number of processors can be 2 or a higher arbitrary number (e.g. 8) according to the design.

The host device 10 is comprised of printer driver means 16 as a standard control function required for the printer 20 to execute printing.

The printer driver means 16 has a similar functional configuration as a standard printer driver, and comprising RIP means for generating a raster image based on the printing target data written in a predetermined printer control language, such as PostScript®, according to the printing request from the application program running on the host device 10, image processing means for creating a printing image by performing a predetermined image processing (e.g. screen processing) on the raster image, and other means.

Figure 2A:
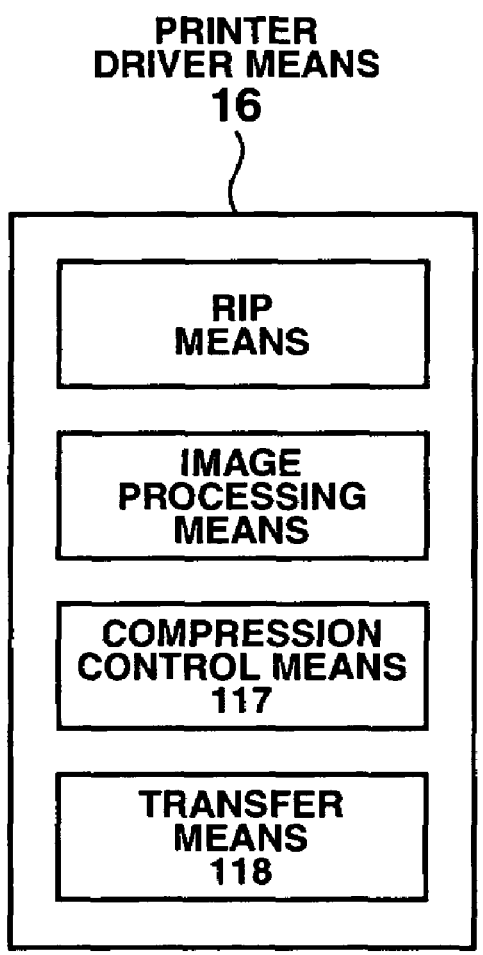
FIG. 2 is a block diagram depicting a functional configuration of the printer driver means 16 and printer controller 26.

The printer driver means 16 of the first embodiment comprises compression control means 117 for executing image compression processing in parallel for an individual scanning line constituting a printing image using a parallel processing unit 15, and transfer means 118 for transferring the compression processing result by the parallel processing unit 15 to the printer 20, which is different from the conventional configuration, as described later (see FIG. 2A).

Each of these means is functionally implemented by the main CPU executing the programs stored in the ROM or RAM of the host device 10 or external storage medium.

The printer 20 comprises a power mechanism unit and printer controller 26.

The power mechanism unit further comprises a paper feed mechanism for supplying paper to the printer, printing engine for performing printing and paper eject mechanism for ejecting paper from the printer. For the printing engine, various printing engines corresponding to a serial printer which prints data in one character units, such as an inkjet printer and thermal transfer printer, a line printer which prints data in one line units, and a page printer which prints data in one page units, can be used.

The printer controller 26 comprises a main CPU, a parallel processing unit 25 further comprising processors 21-24, ROM, RAM, user interface and communication interface. In the first embodiment, the parallel processing unit 25 has four processors 21-24, but the number of processors can be 2 or a higher arbitrary number (e.g. 8) according to the design. The power mechanism unit may have an independent CPU, and in this case, the CPU of the power mechanism unit communicates with the main CPU of The printer controller 26 via a predetermined communication path, to control the printing engine and perform the printing operation.

The printer controller 26 has a similar functional configuration as a printer controller of a standard printer, and comprises, for example, receive means for receiving commands and data from the host device 10 and storing them in the receive buffer, and engine control means for controlling the power mechanism unit to execute printing.

Figure 2B:
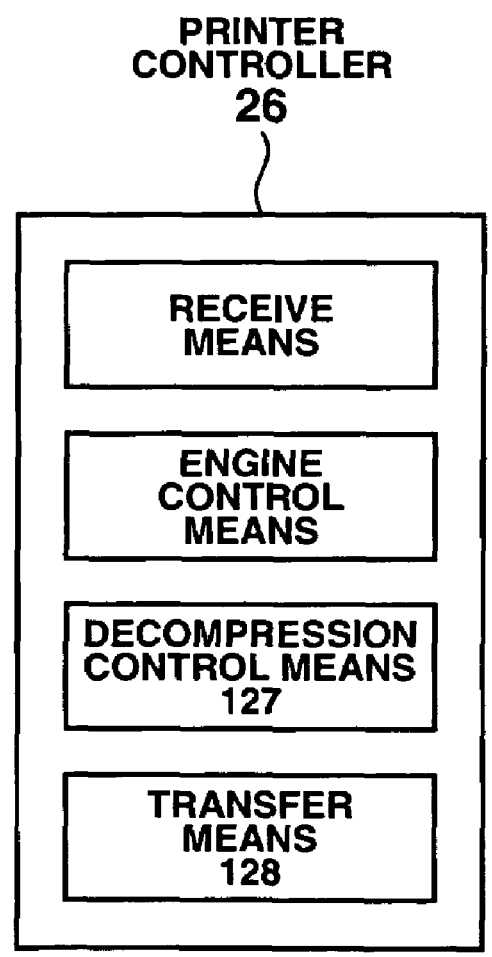

The difference of the printer controller 26 of the first embodiment from the conventional configuration, however, is that it comprises decompression control means 127 for executing decompression processing on an individual scanning line in parallel using the parallel processing unit 25, and transfer means 128 for transferring the decompression processing result by the parallel processing unit 25 to the printing engine in the sequence to be used for printing, as described later (see FIG. 2B).

Each of these means is implemented by the main CPU executing the programs stored in the ROM or RAM in the printer 20 or external storage medium.

Now the printing processing of the printer system 1 will be described with reference to FIG. 3-FIG. 9. Each step (including the partial steps not denoted with reference numerals) can be executed in any sequence or in parallel within the scope where no inconsistency occurs regarding processing content.

Figure 3:
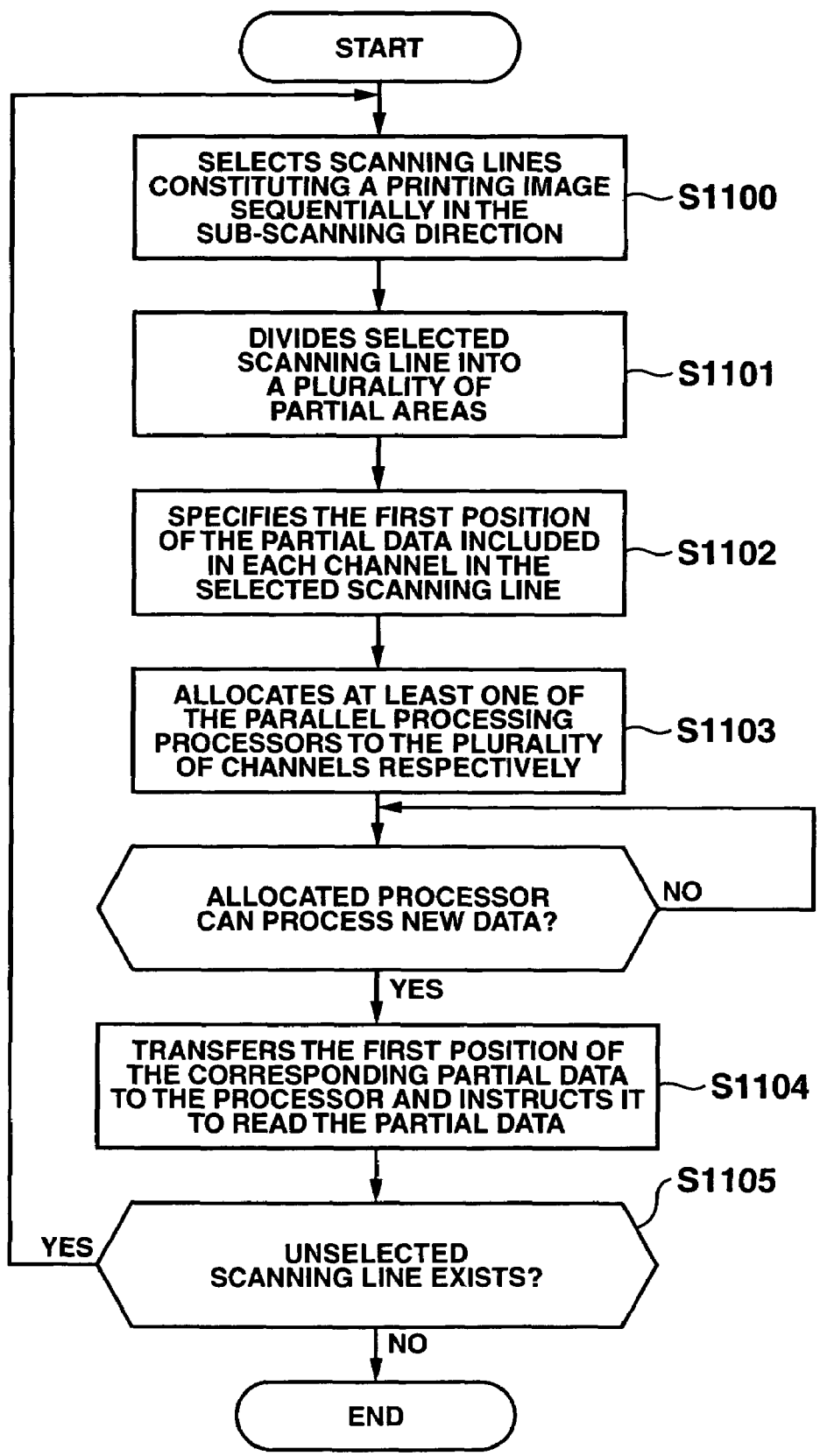
FIG. 3 is a flow chart depicting the processing content of the compression control means 117.
Figure 4:
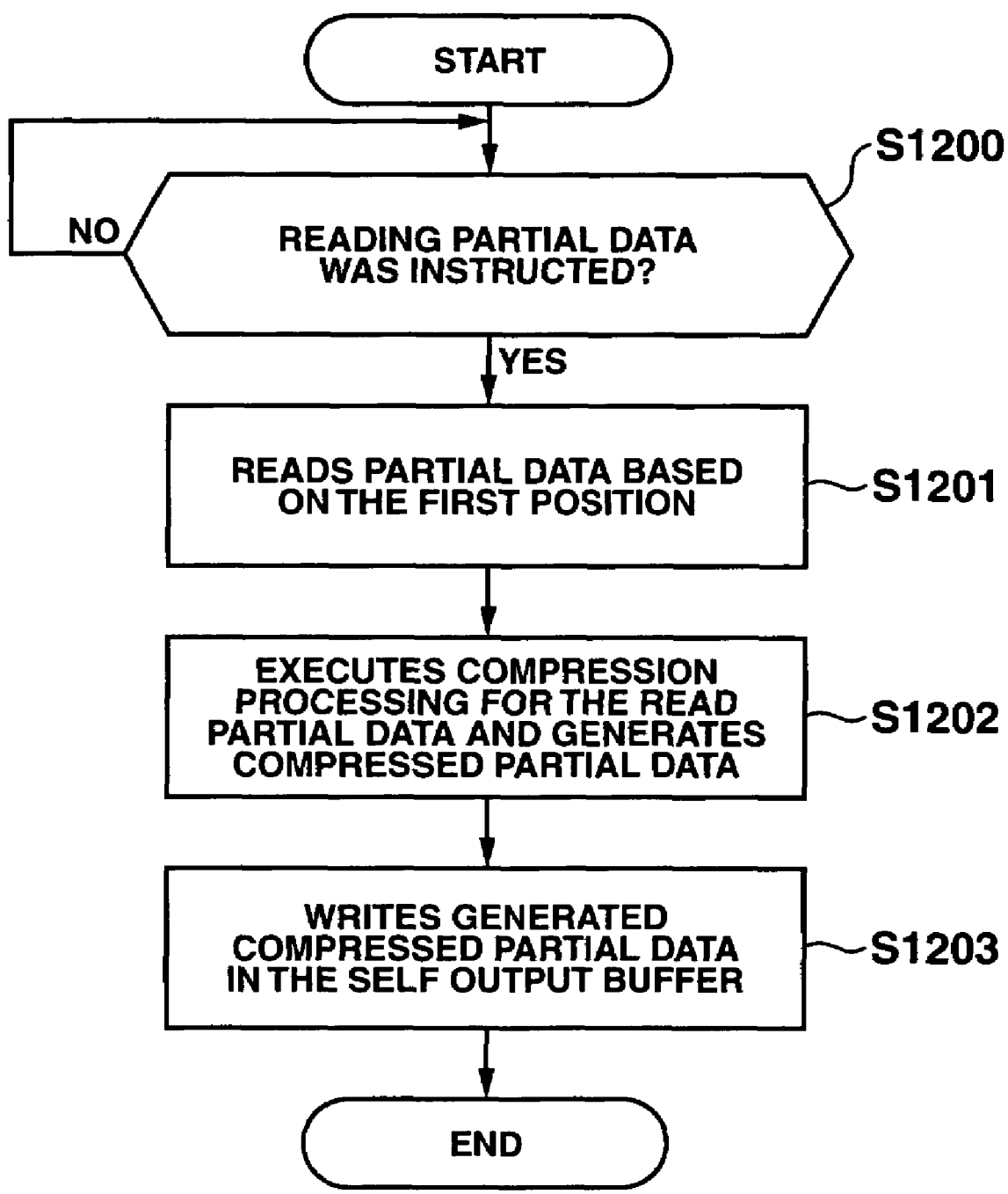
FIG. 4 is a flow chart depicting the processing content of the parallel processing unit 15.
Figure 5:
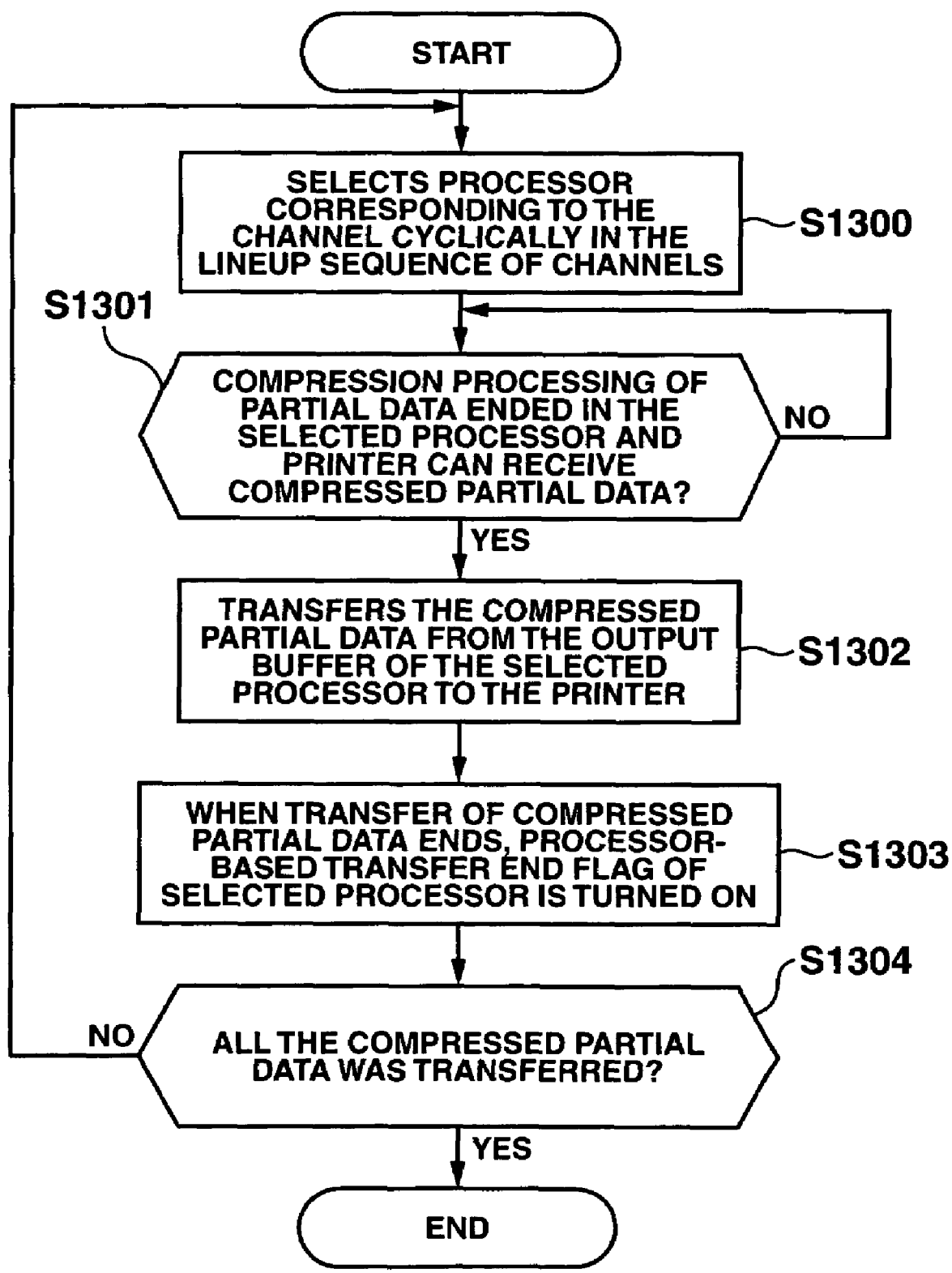
FIG. 5 is a flow chart depicting the processing content of the transfer means 118.

(Processing in Host Device: FIG. 3-FIG. 5)

The printer driver means 16 accepts a printing request from an application program running externally or on the host device 10, and sends the printing instruction command to the printer 20 (printer controller 26), and instructs the RIP means to start processing.

The RIP means receives the instruction to start processing, and generates a raster image based on the printing target data written by a predetermined printer control language, such as PostScript®, received from the application program. If the printing target data can be received in the raster image format from the application program, the processing by the RIP means can be omitted.

The image processing means performs a predetermined image processing (e.g. screen processing) on the generated raster image, and stores the generated printing image in a predetermined area of the RAM.

The compression control means 117 selects the lines in the main scanning direction constituting the generated printing image (hereafter called "scanning lines") sequentially in the sub-scanning direction (step S1100). The main scanning direction and sub-scanning direction are determined based on the scanning in the printer 20.

Figure 10:
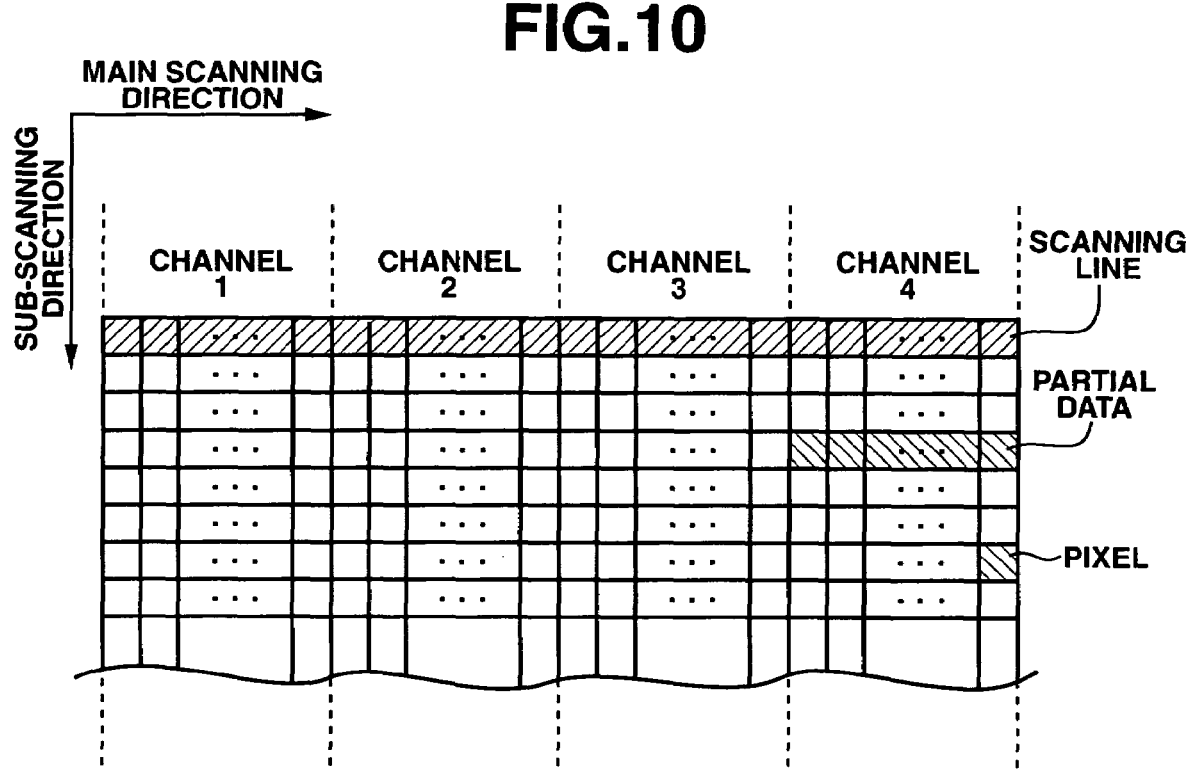
FIG. 10 is a diagram depicting channels.

Now the compression control means 117 divides the selected scanning lines into a plurality of partial areas (S1101). Hereafter such a partial area is called "channel", and each channel is identified by assigning a channel number in the lineup sequence in a scanning line (see FIG. 10).

Then the compression control means 117 specifies the first position of the printing image included in each channel in the selected scanning lines (hereafter called "partial data") (step S1102). For example, when one scanning line is 2048 pixels, one scanning line is divided equally into four partial areas according to the number of processors, and the first pixel, $512^{nd}$ pixel, $1024^{th}$ pixel and $1536^{th}$ pixel are specified as the first positions of the respective partial data.

If channels are defined commonly for all the scanning lines, and the first position of the partial data in each channel is specified in advance, the steps S1101-S1102 can be omitted.

Now the compression control means 117 allocates at least one of the processors 11-14 to the plurality of channels respectively (step S1103). Specifically a combination of a channel and processor is fixed for allocation, such as processor 11 to channel 1 and processor 12 to channel 2.

Then the compression control means 117 judges whether the allocated processor can process the new data, and if it can process, the first position of the corresponding partial data is transferred to the allocated processor and the reading of this partial data is instructed (step S1104).

Here the case when the processor can process new data is the case when this processor can newly write the next processing result. An example of the judgment method is that in the case when the output buffer, which can be written by the processors 11-14 respectively, has a capacity corresponding to the processing result of one partial data, whether the processor can write new data is determined depending on whether the processing result was transferred, so a transfer end flag to indicate whether the processing result has been transferred is provided for each processor, and whether the processor can process new data is judged based on this flag.

Now the compression control means 117 returns to step S1100 if unselected scanning lines exist among the scanning lines constituting the generated printing image (step S1105).

When the information on the first position of the partial data and the read instruction are received from the compression control means 117 (step S1200: YES), each processor 11-14 of the parallel processing unit 15 reads the partial data from the predetermined area of the RAM where the generated printing image is stored based on the information on the first position (step S1201).

And the compressed partial data is generated by executing the predetermined compression processing on the read partial data (step S1202), and this compressed partial data is written to its own output buffer of each processor 11-14 (step S1203). For the predetermined compression processing, various conventional compression algorithms can be used according to the design, and in the case when the printing image is binary data, for example, it is possible to use a JBIG (Joint Bi-level Image experts Group) algorithm.

The transfer means 118 selects a processor corresponding to this channel cyclically in the lineup sequence of the channels (step S1300).

Now the transfer means 118 transfers the compressed partial data from the output buffer of this processor to the printer 20 (printer controller 26) (step S1302) when the compression processing of the partial data ends in the selected processor, and the printer 20 (printer controller 26) can receive the compressed partial data (step S1301: YES). At this transfer time, a predetermined boundary information is added to the end (or beginning) of the compressed partial data so that the boundary of the compressed partial data can be detected.

Then when the transfer of the compressed partial data ends, the transfer means 118 turns ON the processor-based transfer end flag of this processor (step S1303). The processor-based transfer end flag of this processor is turned OFF again when the compression control means 117 sends the reading instruction to the processor.

If all the compressed partial data has not been transferred for the generated printing image, the transfer means 118 returns to step S1300 here (S1304).

According to this configuration, compression processing is executed in parallel for each channel constituting one scanning line (that is for each partial data), so the compressing processing time for an individual scanning line can be decreased. In particular, a decrease in the compression processing time of the first one scanning line makes it possible to decrease the time from the start of the compression processing of the printing image to the end of the compression processing of the first scanning line, and to the timing when the processing result is transferred to the printer 20 (printer controller 26), and a compression processing (and printing processing) which starts up quickly can be implemented.

Figure 6:
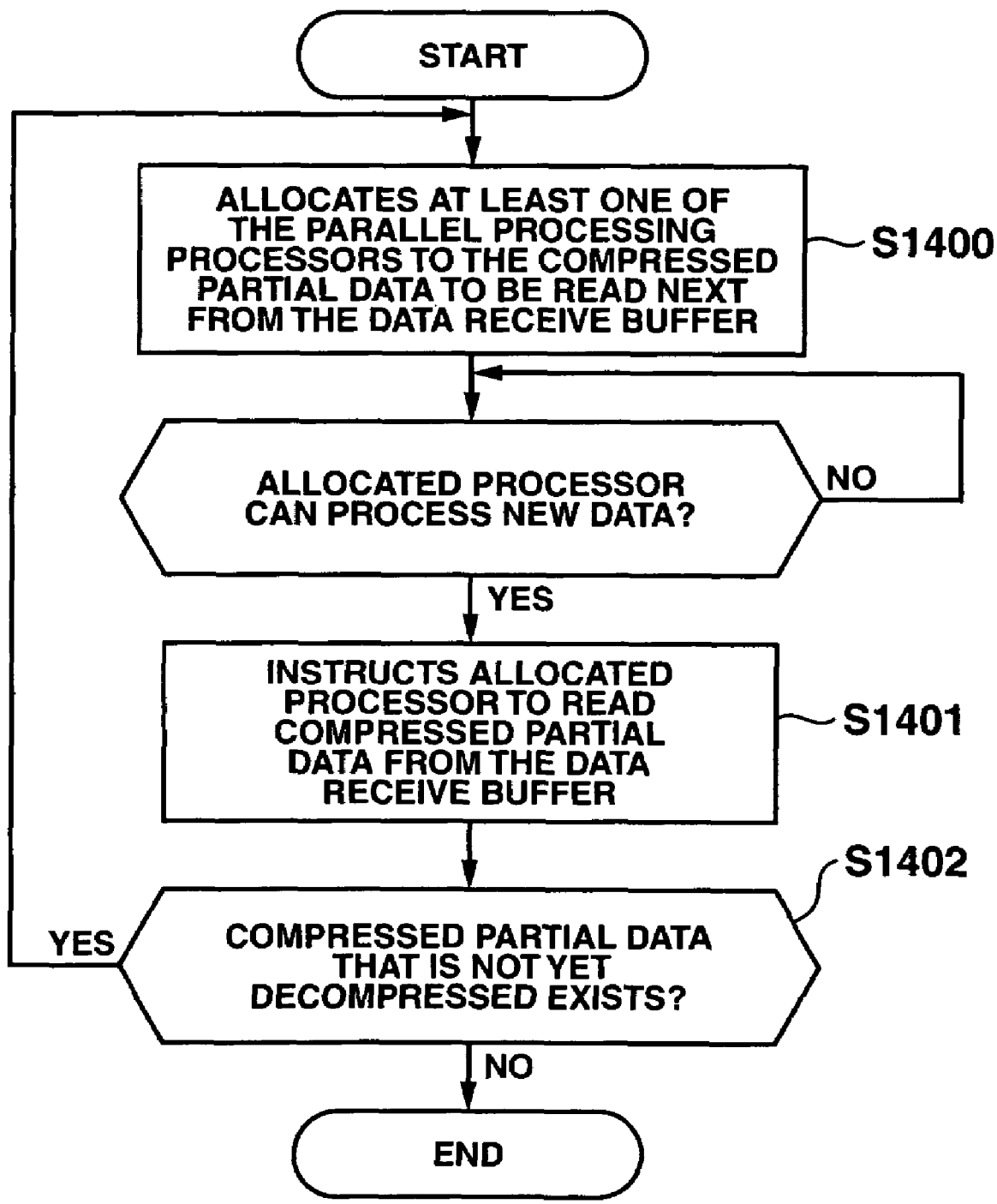
FIG. 6 is a flow chart depicting the processing content of the decompression control means 127.
Figure 7:
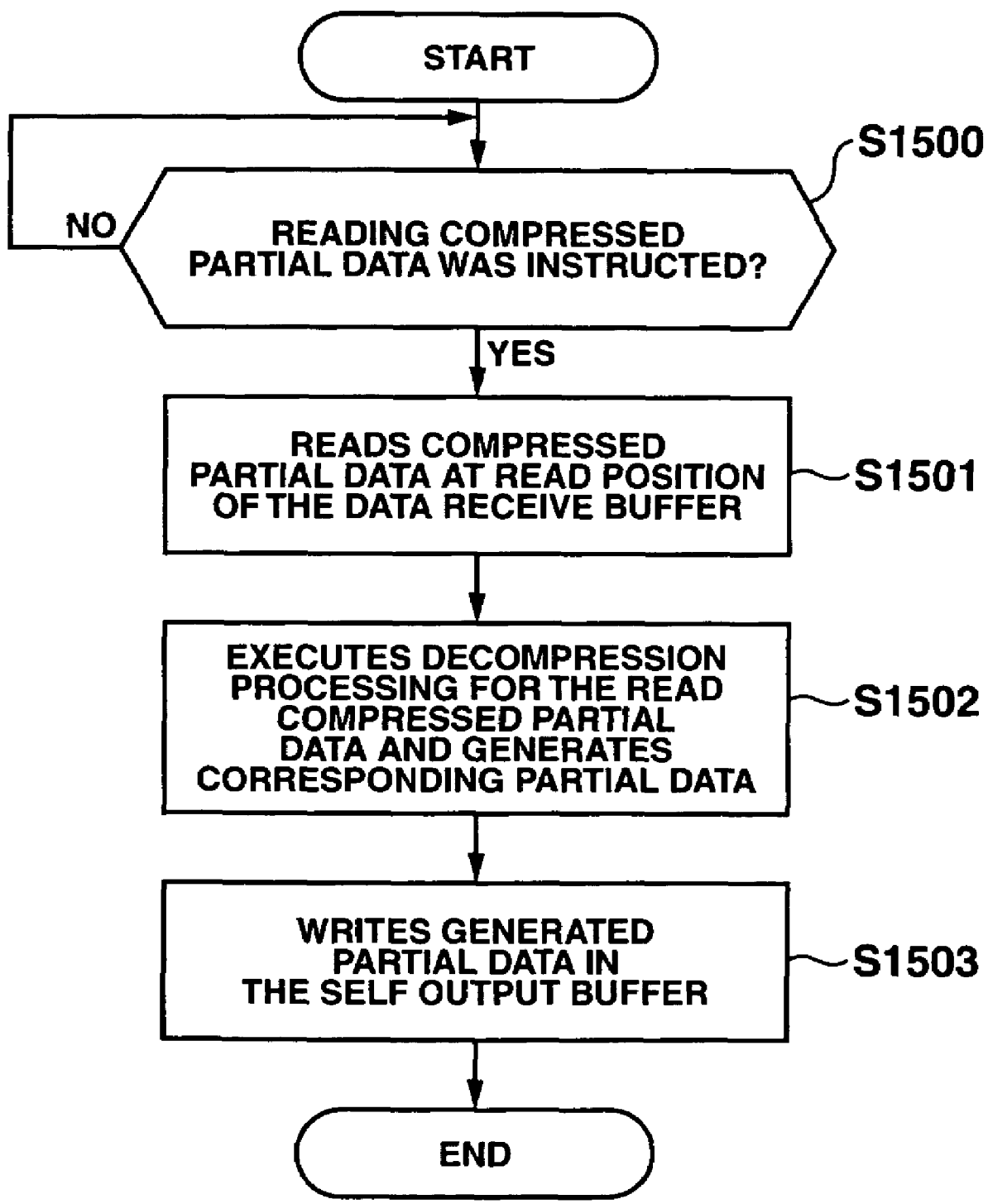
FIG. 7 is a flow chart depicting the processing content of the parallel processing unit 25.
Figure 8:
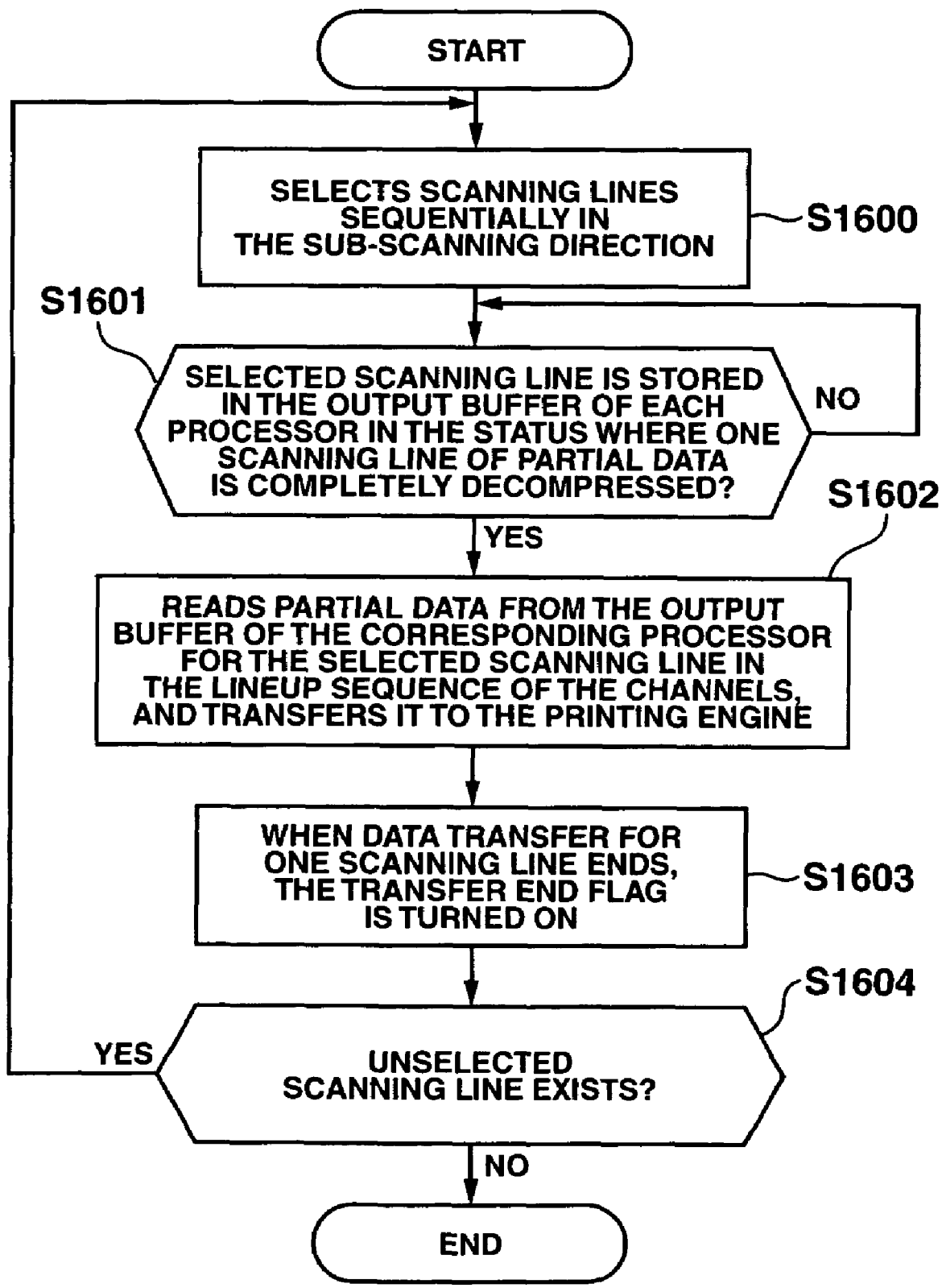
FIG. 8 is a flow chart depicting the processing content of the transfer means 128.

(Processing in Printer 20: FIG. 6-FIG. 8)

When the command received by the receive means is a printing instruction command, the printer controller 26 prepares for printing by controlling the power mechanism unit by the engine control means, and instructs the decompression control means 127 to start processing.

When the instruction to start processing is received, the decompression control means 127 allocates at least one of the processors 21-24 to the compressed partial data (channel) to be read next from the data receive buffer (S1400).

Specifically a combination of a channel and a processor is fixed for the allocation, such as processor 21 to the compressed partial data of channel 1 and the processor 22 to the compressed partial data of channel 2.

Here it is preferable to construct the data receive buffer as an FIFO type buffer on the RAM (or as an FIFO type memory). In this case, as described above, the transfer means 118 of the host device 10 transfers the compressed partial data to the printer 20 (printer controller 26) in the lineup sequence of the channels, so the read/write of the compressed partial data in the data receive buffer is also executed in the lineup sequence of the channels. Therefore the decompression control means 127 can specify a channel to which the compressed partial data to be read next corresponds to, and can allocate the processors with a combination of a processor and a channel as fixed.

Then the decompression control means 127 judges whether the allocated processor can process new data, and if possible, instructs the processor to read the compressed partial data from the data receive buffer (step S1401).

If the output buffer, that can be written to by each one of the processors 21-24, has a capacity corresponding to one partial data, for example, the above judgment can be made based on the transfer end flag, just like the case of the compression control means 17. However it is unnecessary to provide a transfer end flag for each processor, since transfer processing is executed in scanning line units by the operation of the transfer means 128, as described later, so the above judgment can be made only for the processor allocated to the first channel of the scanning line.

Now the decompression control means 127 returns to step S1400 if there exists compressed partial data which is not yet decompressed (step S1402).

When the instruction to read the compressed partial data is received from the decompression control means 127 (step S1500: YES), each processor 21-24 of the parallel processing unit 25 reads the compressed partial data at the reading portion of the data receive buffer (step S1501). Each processor can specify the reading start/end position of the compressed partial data by detecting the boundary information added to the compressed partial data.

Then each processor 21-24 executes a predetermined decompression processing to the read compressed partial data and generates the corresponding partial data (step S1502), and stores this partial data to its own output buffer (step S1503). For the decompression processing, the decompression processing, corresponding to the compression algorithm used in the parallel processing unit 15 of the host device 10, must be used.

The transfer means 128 selects the scanning lines sequentially in the sub-scanning direction so as to transfer data in the sequence to be used for printing (S1600).

Now the transfer means 128 judges whether all the partial data for the selected one scanning line is stored in the output buffer of each processor in decompressed status (S1601).

If judged that the partial data is all stored in decompressed status, the transfer means 128 reads the partial data from the output buffer of the corresponding processor and transfers it to the printing engine in the lineup sequence of the channels for the selected scanning line, so as to send the data in the sequence to be used for printing (S1602).

When the transfer of one scanning line of data ends, the transfer means 128 turns ON the transfer end flag (S1603). The transfer end flag is turned OFF again when the printing control means sends the read instruction to the processor of channel 1 for the next line.

And if unselected scanning lines exist for the generated printing image, processing returns to S1600 (S1604).

According to this configuration, decompression processing is executed for each channel constituting one scanning line (that is each compressed partial data) in parallel, so the decompression time required for an individual scanning line can be decreased.

In particular, a decrease in the decompression processing time of the first one scanning line makes it possible to decrease the time, from the start of the decompression processing of the compressed printing image to the end of the decompression processing of the first scanning line, and to the timing when the processing result is transferred to the printing engine and the decompression processing (and printing processing), which starts up quickly, can be implemented.

Also the partial data is transferred to the printing engine when all the partial data for one scanning line is collected in the output buffer of each processor, and when this transfer ends, decompression processing for the next line is executed, that is the decompression processing, and transfer processing are executed synchronizing in scanning line units, so if a memory area with a capacity of at least one scanning line is available as a memory area for storing partial data, (specifically, if the capacity of an output buffer of each processor≧memory capacity for one scanning line/number of processor), that is the decompression result, then throughput can be improved by parallel processing.

In other words, if one processor is allocated to one scanning line (or one band) and parallel processing is performed, as in the case of prior art, the effect of parallel processing according to the number of processors cannot be acquired unless at least there are memory areas for the number of scanning lines (or number of bands) that is the same number of processors as memory areas for storing the decompression processing result, but if one processor is allocated to one partial data and parallel processing is performed, as in the case of the first embodiment, it is sufficient if there are memory areas corresponding to the partial data for each processor, and it is unnecessary to provide one scanning line of memory area for each processor, therefore the effect of parallel processing according to the number of processors can be implemented even if only memory areas for the number of scanning lines, which is less than the number of processors, can be used as memory areas for storing the decompression processing result, since it is unnecessary to provide one scanning line of a memory area for each processor.

For example, (decompression processing time of one scanning line)≈max {decompression processing time of compressed partial data of each processor} is established by parallel decompression processing, so (decompression processing time of one scanning line)<(time required for printing of one scanning line in printing engine) can be implemented by providing an appropriate number of processors, and therefore even in the case of a laser printer, which must continue supplying printing data in line units at a predetermined speed, real-time processing is possible.

Figure 9A:
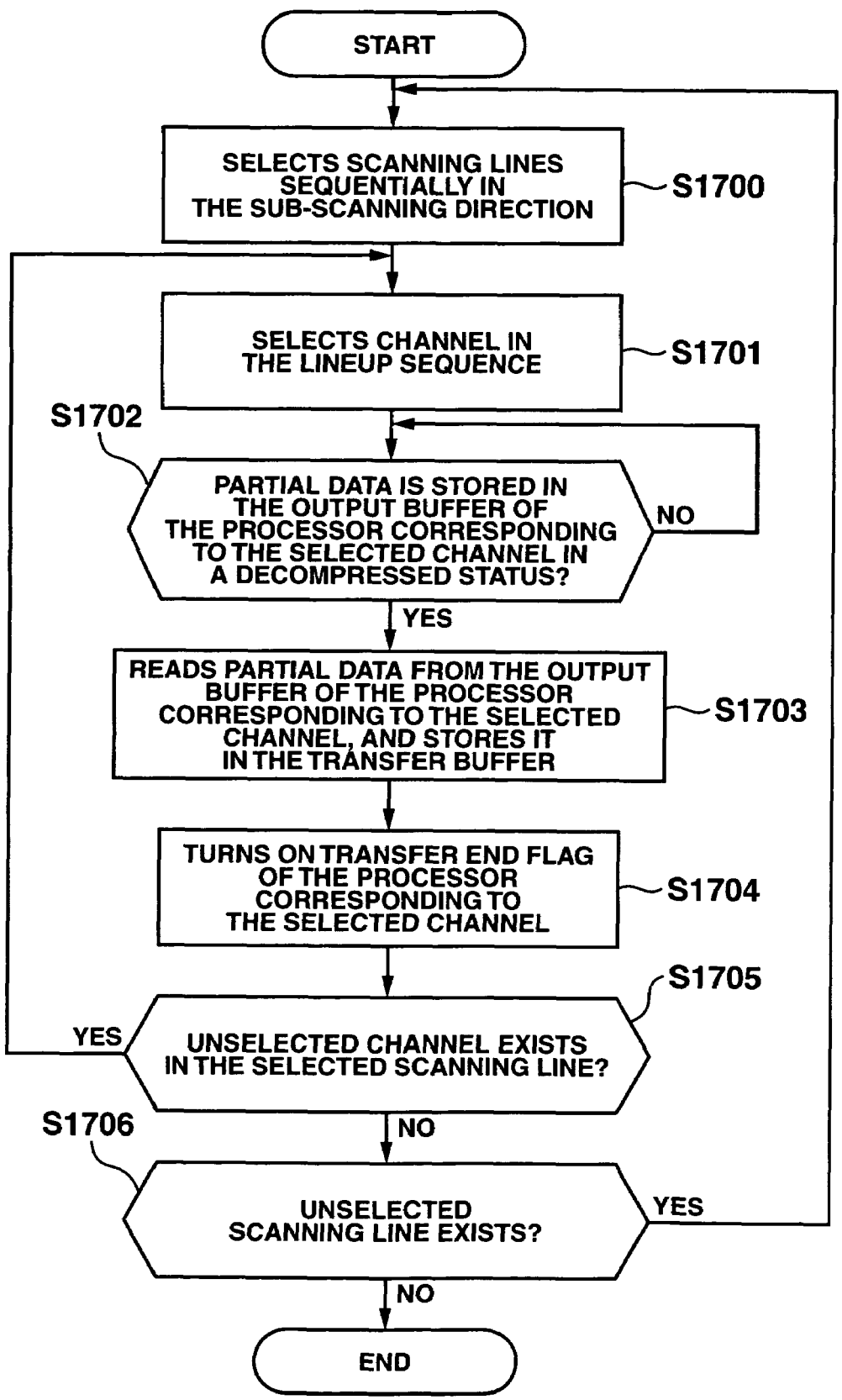
FIG. 9 is a flow chart depicting the processing content of a variant form of the transfer means 128.
Figure 9B:
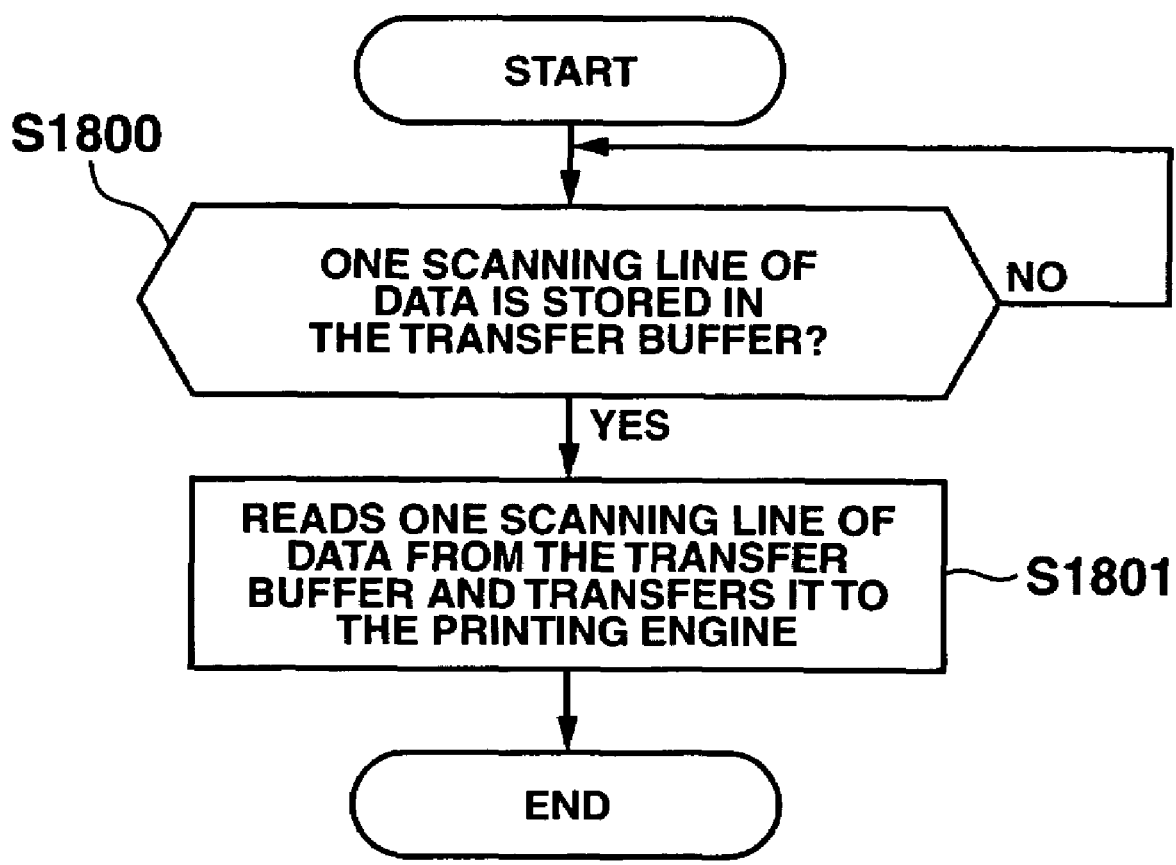

(Variant Form of Transfer Means 128: FIG. 9A, FIG. 9B)

In the configuration of the transfer means 128, each processor cannot perform decompression processing for the next scanning line unless one scanning line of data is collected, so the effect of parallel processing according to the number of processors can be implemented for decompression processing, but the decompression processing and transfer processing to the printing engine cannot be executed in parallel.

Therefore the present variant form comprises an FIFO type transfer buffer, a first transfer means 128-1 for transferring the data from the output buffer of each processor to the transfer buffer, and a second transfer means 128-2 for transferring the data from the transfer buffer to the printing engine, instead of the transfer means 128, so that the decompression processing and transfer processing to the printing engine can be executed in parallel. The transfer buffer can be constructed on a RAM or as a dedicated FIFO type memory, for example. Each transfer means 128-1 and 128-2 is implemented by the main CPU executing the programs stored in the ROM or RAM in the printer 20 or on an external storage medium.

Specifically, the first transfer means 128-1 selects the scanning lines sequentially in the sub-scanning direction, so as to transmit the data in the sequence to be used for printing (S1700).

Then the first transfer means 128-1 selects the channels in the sequence to be used for printing, that is in the lineup sequence, for the selected scanning lines (S1701).

Then the first transfer means 128-1 judges whether the partial data in decompressed status is stored in the output buffer of the processor corresponding to the selected channel (S1702). If it is judged that the partial data is stored, the partial data is read from the output buffer of the processor corresponding to the selected channel, and is stored in the transfer buffer (S1703), and turns ON the transfer end flag of the processor corresponding to the selected channel (S1704). The transfer end flag of each processor is turned OFF again when the decompression control means instructs reading to the processor.

Now the first transfer means 128-1 returns to S1701 if an unselected channel exists among the selected scanning lines (S1705), or returns to S1700 if not and if unselected scanning lines exist, so as to select the next scanning line (S1706).

The second transfer means 128-2, on the other hand, judges whether one scanning line of data is stored in the transfer buffer (S1800), and reads the one scanning line of data and transfers it to the printing engine if judged that the data is stored (S1801). In the FIFO type transfer buffer, partial data has been stored in the sequence to be used for printing by the first transfer means 128-1, therefore the second transfer means 128-2 can transfer the data to the printing engine in the sequence to be used for printing only if the data is sequentially read and transferred from the transfer buffer.

In the configuration of this variant form, each processor can start decompression processing of the next compressed partial data in the stage when the partial data that is the processing result of the processor itself is transferred to the transfer buffer, and therefore can execute the decompression processing in parallel with the transfer processing from the transfer buffer to the printing engine (processing by the second transfer means).

(Other)

The present invention is not limited to the first embodiment, but can be modified in various ways and applied. For example, the present invention can be applied to a system other than a printer system, only if the system is for compressing/decompressing images.

In the first embodiment, the printer 20 comprises the parallel processing unit 25 and printer controller 26, but the present invention is not limited to this configuration. For example, the parallel processing unit 25 and printer controller 26 can be constructed as external devices that can be connected to the printer 20. Also the parallel processing unit 25 and printer controller 26 may be constructed as devices that can be connected to the host device 10 according to PCI bus standards and so like. In the case of connecting the parallel processing unit 25 to the host device 10, each function of the printer controller 26 may be implemented by the main CPU of the host device 10.

Also in the first embodiment, the configuration where one scanning line is equally divided into partial areas according to the number of processors was described, but a scanning line need not always be divided equally, but the size of the partial areas to be allotted may be different according to processor specifications, for example. The number of partial areas to be divided (number of channels) need not always be the same as the number of processors.

Also in the first embodiment, the configuration where a combination of a channel and a processor is fixed for allocation was described, but a processor which finished processing may be allocated to the next channel, for example. In this case, the correspondent relationship between a processor and a channel may be different depending on the scanning line. A channel may be allocated not only to the processors of the parallel processing units 15 and 25, but also to the main CPU, and parallel processing is executed in this configuration.

Also in the first embodiment, the configuration where the processors 11-14 read the partial data from the RAM was described, but if the host device 10 comprises means of transferring the partial data from the RAM to the processors 11-14 (e.g. DMA transfer means), for example, the compression control means may instruct the transfer to this means. In this case, the processors 11-14 execute processing after receiving a transfer from this means. In the same way, if the printer 20 comprises means of transferring the compressed partial data from the data receive buffer to the processors 21-24 (e.g. DMA transfer means), the decompression control means can instruct the transfer to this means, and the processors 21-24 execute processing after transfer from this means.

Also in the first embodiment, the case when the output buffer, that can be written by each of the processors 11-14 (processors 21-24) have a capacity corresponding to the processing result of one partial data, was described, but each processor may be able to write an output buffer with the above capacity or more respectively. In this case, each processor can execute compression processing (decompression processing) sequentially, as long as the capacity of the output buffer allows it. The output buffer of each processor may be installed in the parallel processing unit, but also may be constructed using a part of the RAM of the host device 10 or printer 20.

Also in the first embodiment, the configuration where parallel processing is performed for all the scanning lines of the printing image was described, but if the present invention is applied to at least one scanning line constituting the printing image, the compression processing time/decompression processing time can be decreased for this scanning line.

Also in the first embodiment, the configuration where the transfer means 18 sequentially transfers the compressed partial data to the printer 20 was described, but the compressed partial data may be burst-transferred after waiting until all the data for one scanning line is collected. In this case, the compressed partial data may be stored in the RAM once, then be transferred, for example.

Also in the first embodiment, the configuration where the transfer means 18 transfers the data in the lineup sequence of the channels, but the data may be transferred in a sequence that is different from the lineup sequence by adding the channel identification information to the compressed partial data before transfer. In this case, the decompression control means 27 can judge the processor to be allocated based on the identification information.

Also in the first embodiment, the configuration, where the transfer means 128 (or the second transfer means 128-2)

transfers the data to the printing engine when one scanning line of data is collected, was described, but the data may be transferred to the printing engine without waiting for the one scanning line of data to be collected or for a plurality of scanning lines of data to be collected depending on the type of the printing engine.

Second Embodiment

The hardware configuration of the printer system 1 according to the second embodiment of the present invention is as a rule the same as the first embodiment (see FIG. 1).

In other words, the host device 10 is comprised of a main CPU, parallel processing unit 15 further comprising parallel processors 11-14, ROM, RAM, user interface, communication interface and other hardware. According to the second embodiment, the parallel processing unit 15 has four processors 11-14, but the number of processors can be 2 or a higher arbitrary number (e.g. 8) according to the design, just like the first embodiment.

The host device 10 is comprised of printer driver means 16 as a standard control function for the printer 20 to execute printing.

The printer driver means 16 comprises RIP means for generating a raster image based on the printing target data written by a predetermined printer control language, such as PostScript®, according to the printing request from the application program running on the host device 10, image processing means for creating a printing image by performing a predetermined image processing (e.g. half-tone processing) on the raster image, and other means.

The printer driver means 16 of the second embodiment, however, comprises compression control means 217 for executing pack processing for generating a data string where the gradation data of each pixel is continuously arrayed for an individual scanning line constituting the printing image, and executing the image compression processing in parallel using the parallel processing unit 15, and the transfer means 218 for transferring the compression processing result by the parallel processing unit 15 to the printer 20, as described later, which is different from the conventional configuration (see FIG. 11A).

Each of these means is functionally implemented by the main CPU executing programs stored in the ROM or RAM of the host device 10 or an external storage medium.

The printer 20 comprises a power mechanism unit and printer controller 26.

The power mechanism unit further comprises a paper feed mechanism for supplying paper to the printer, printing engine for performing printing, and paper eject mechanism for ejecting paper from the printer. For the printing engine, various printing engines corresponding to a serial printer which prints data in one character units, such as an inkjet printer and thermal transfer printer, a line printer which prints data in one line units, and a page printer which prints data in one page units, can be used.

The printer controller 26 is comprised of a main CPU and a parallel processing unit 25 further comprising processors 21-24, ROM, RAM, user interface and communication interface. In the second embodiment, the parallel processing unit 25 has four processors 21-24, the number of processors can be 2 or a higher arbitrary number (e.g. 8) according to the design. The power mechanism unit may have an independent CPU, and in this case, the CPU of the power mechanism unit communicates with the main CPU of the printer controller 26 via a predetermined communication path to control the printing engine, and performs the printing operation.

The printer controller 26 has a similar functional configuration as a printer controller of a standard printer, and comprises, for example, receive means for receiving commands and data from the host device 10, and storing them in the receive buffer, and engine control means for controlling the power mechanism unit to execute printing.

The difference of the printer controller 26 of the second embodiment from a conventional configuration, however, is that it comprises storage means 227 for storing the bit information table, decompression control means 228 for executing decompression processing on an individual scanning line in parallel using the parallel processing unit 25, unpack means 229 for extracting data for each pixel from the decompressed data, and transfer means 230 for transferring the printing image acquired as a result of decompression processing/unpack processing to the printing engine in the sequence to be used for printing, as described later (see FIG. 11B).

Each of these means is implemented by the main CPU executing the programs stored in the ROM or RAM of the printer 20 or external storage medium.

Now the printing processing in the printer system 1 will be described with reference to the flow charts and diagrams shown in FIG. 12 and other drawings. Each step (including partial steps not denoted with reference numerals) can be executed in any sequence, or in parallel within the scope where inconsistencies do not occur in the processing contents.

(Processing in Host Device 10)

The printer driver means 16 accepts a printing request from an application program running externally or on the host device 10, and sends the printing instruction command to the printer 20 (printer controller 26), and instructs the RIP means to start processing.

The RIP means receives the instruction to start processing, and generates a raster image based on the printing target data written in a predetermined printer control language, such as PostScript®, received from the application program. If the printing target data can be received in the raster image format from an application program, the processing by the RIP means can be omitted.

The image processing means performs a predetermined image processing (e.g. half-tone processing) on the generated raster image, and stores the generated printing image in a predetermined area of the RAM.

Here the half-tone processing to be used in the second embodiment will be described.

In the second embodiment, half-tone processing is performed using the screen table, and a table where a plurality of correspondent relationship between the input gradation value on the raster image and the output gradation value on the printing image (hereafter called "gradation conversion table").

FIG. 12A shows an example of the screen table. In this example, the reference numbers 1-9 (identifiers) are assigned in a 9×9 sized matrix, and each reference number uniquely specifies each correspondence relationship stored in the gradation conversion table. Reference numbers may be assigned without overlapping according to the design, or a screen table with another shape and size may be used.

FIG. 13 shows an example of the gradation conversion table. In the example in FIG. 13, there are three types of correspondence relationships where the bit length (number of expressed bits) of the output gradation value is 3 bits, 2 bits or 1 bit, and in the correspondence relationship specified by the reference numbers 1-2, the bit length is 3 bits, in reference numbers 3-7 the bit length is 2 bits, and in reference numbers 8-9 the bit length is 1 bit.

As FIG. 13 shows, the bit length is uniquely determined if the correspondence relationship (reference number) is determined, and the correspondence relationship (reference number) is uniquely determined by the element position in the screen table, therefore it is regarded that the bit length is determined by the element position in the screen table. FIG. 12B shows a table where the bit length is corresponded to the element position in the screen table. Such a table is the above mentioned bit information table.

In this half-tone processing, 1 pixel on a raster image is converted into 9×9 pixels on the printing image by applying the screen table to an individual pixel of the raster image. At this time, the gradation value of each of 9×9 pixels on the printing image is determined by converting the gradation value of 1 pixel on the raster image into a gradation value with a predetermined bit length respectively using the gradation conversion table, which is specified according to the position in the screen table. In the printing image acquired in this way, the lineup of the bit length creates a periodic pattern with the screen table (that is the bit information table) as a basic pattern.

When half-tone processing is performed in this way and the printing image is generated, the compression control means 217 executes the parallel compression processing as follows. The following processing may be sequentially executed when one or more scanning lines are generated for the printing image.

Figure 14:
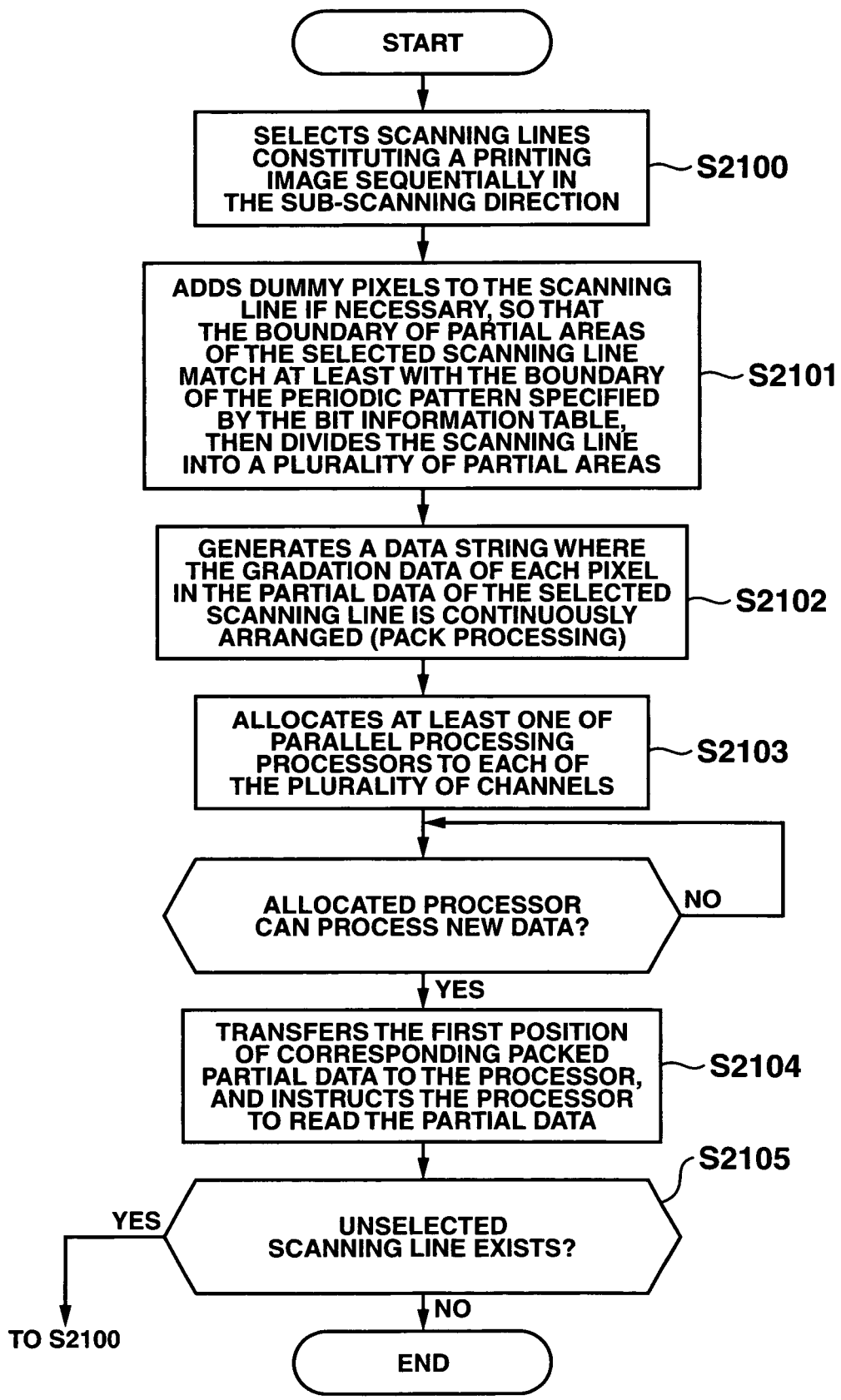
FIG. 14 is a flow chart depicting the processing content of the compression control means 217.

The compression control means 217 selects the lines in the main scanning direction constituting the generated printing image (hereafter called "scanning lines") sequentially in the sub-scanning direction (FIG. 14: step S2100). The main scanning direction and the sub-scanning direction are determined based on the scanning in the printer 20.

Figure 15:
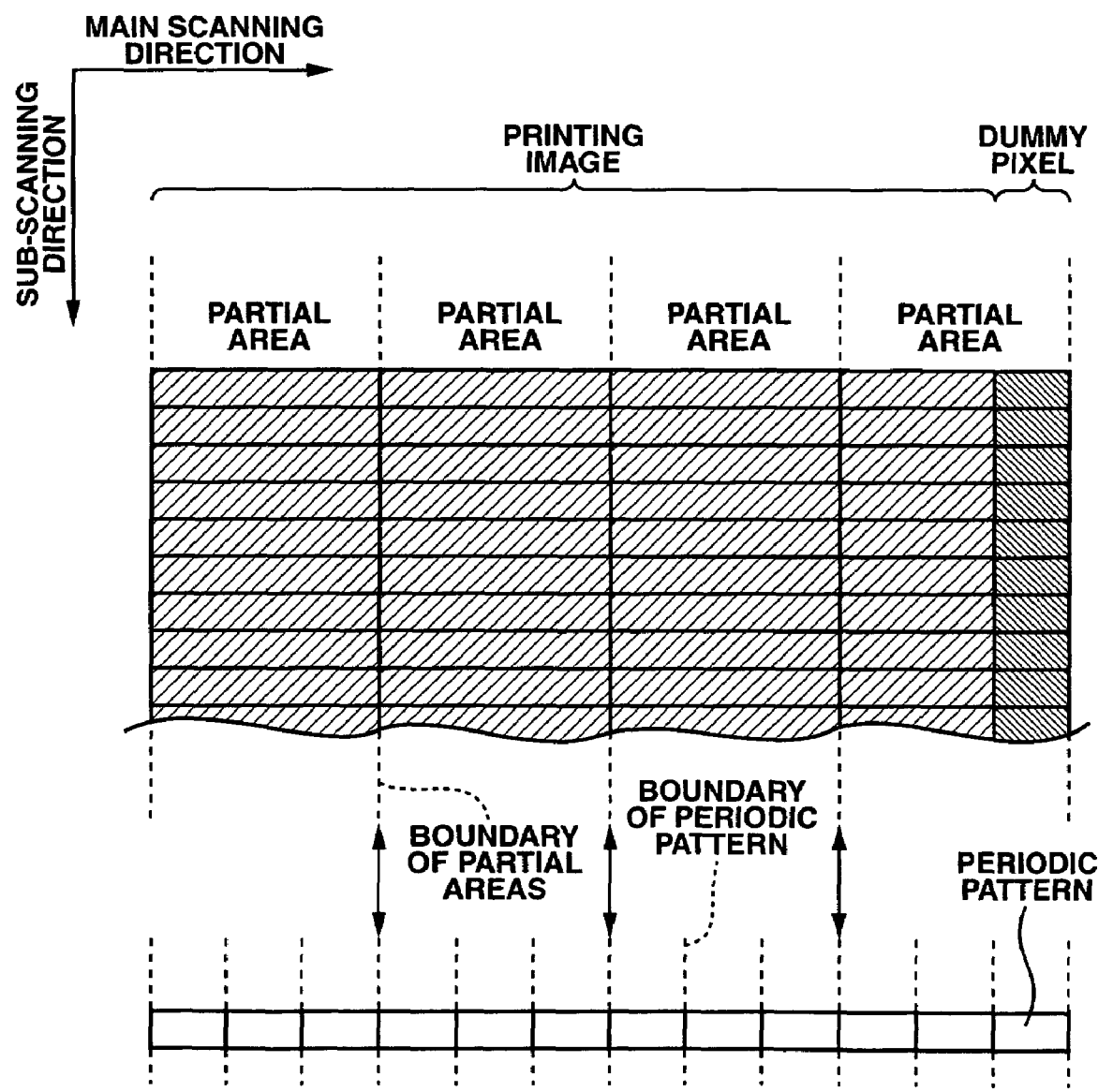
FIG. 15 is a diagram depicting the status of dividing into partial areas by padding.

The compression control means 217 divides the selected scanning lines into a plurality of partial areas (FIG. 14: S2101). At this time, the compression control means 217 divides the selected scanning lines after dummy pixels are added to the printing image (that is after padding is performed) if necessary, so that the boundaries of the partial area match at least one boundary of the periodic pattern specified by the bit information table (See FIG. 15).

The specific method of padding will be described. If the number of processors is P, the number of pixels of one scanning line of the printing image is M, and the horizontal size of the bit information table is Q, then the number of dummy pixels X to be added in padding is decided as follows.

if {M mod (PxQ)=0}
then X=0
else X=PxQ−(M mod (PXQ))

After adding X number of dummy pixels at the end of the scanning line, the scanning line is equally divided into P number of partial areas. The pixels to be added by padding (dummy pixels), which will be removed later, can be added at any position only if the position is in memory, but it is assumed here that the necessary number of 1 bit dummy pixels are added to the end of the scanning line. When padding is performed in this way, the number of pixels in each partial area always become a multiple of the horizontal size Q of the bit information table, therefore the boundaries of the partial areas match at least one of the boundaries of the periodic pattern.

Figure 16:
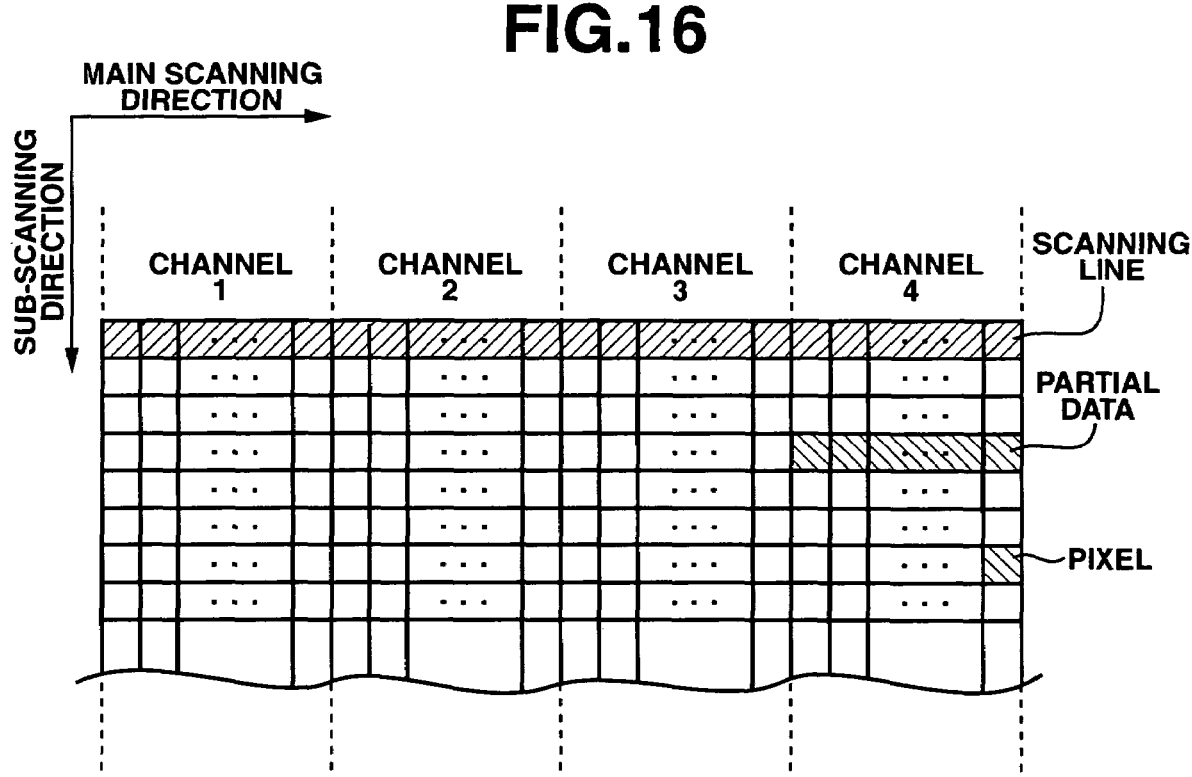
FIG. 16 is a diagram depicting channels.

Hereafter a partial area divided in this way is called "channel", and each channel is identified by assigning a channel number in the lineup sequence in the scanning line direction (see FIG. 16).

If channels are defined commonly for all the scanning lines in advance, then step S2101 can be omitted.

Then for each partial area of the selected scanning line, the compression control means 217 generates a data string where the gradation data of each pixel with this partial data are continuously lined up, (performs pack processing) (FIG. 14: step S2102). In other words, if the number of pixels of the partial data is N and the bit length of each pixel is L1-LN respectively, a data string which includes at least the (L1+---+LN) length data string, where the data of each pixel is lined up (hereafter called "packed partial data"), is generated and stored in a predetermined area of the RAM.

Figure 24A:
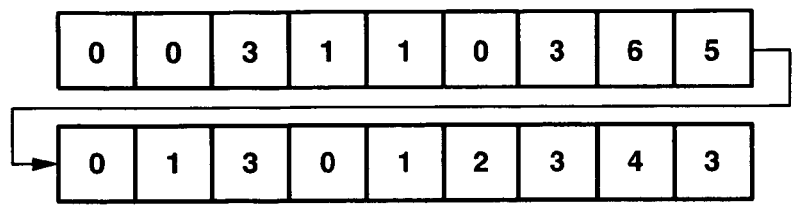
FIG. 24 is a diagram depicting the status of storing the pixel data according to the conventional configuration and second embodiment.
Figure 24B:
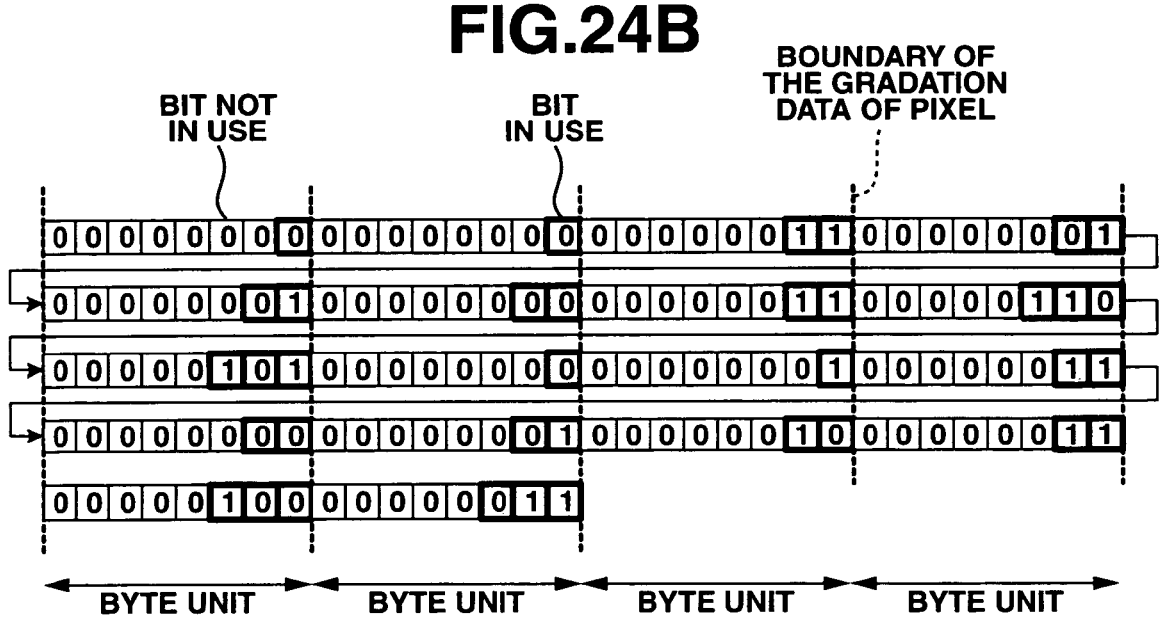
Figure 24C:
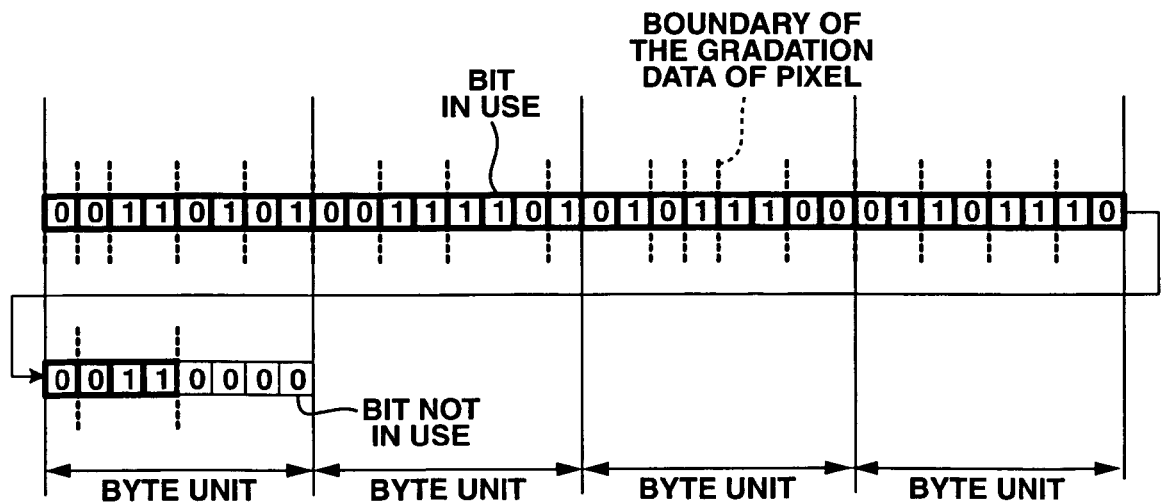

For example, where there is an 18 pixel image having the gradation values shown in FIG. 24A, and the bit length of each pixel is (L1, - - -, L18)=(1, 1, 2, 2, 2, 2, 2, 3, 3, 1, 1, 2, 2, 2, 2, 2, 3, 3,), the compression control means 217 generates a 5 byte data string which includes at least a (1+1+2+2+2+2+2+3+3+1+1+2+2+2+2+2+3+3)=36 bit length packed partial data when the gradation data of the 9 pixels are lined up, as shown in FIG. 24C. In the packed partial data generated in this way, a plurality of pixels of gradation value are stored continuously (in packed status) in 1-byte, excluding the last byte, so unused bits, which are generated when data is handled by carrying each pixel in byte units, as the case of prior art, do not exist.

Now the compression control means 217 allocates at least one of the processors 11-14 to each of the plurality of channels (FIG. 14: step S2103). Specifically, the combination of a channel and a processor is fixed for allocation, such as processor 11 to channel 1 and processor 12 to channel 2.

Then the compression control means 217 judges whether the allocated processor can process the new data, and if it can process, the first position of the corresponding packed partial data is transferred to the allocated processor, and reading of this packed partial data is instructed (FIG. 14: step S2104).

Here the case when the processor can process new data is the case when this processor can newly write the next processing result. An example of the judgment method is when the output buffer, which can be written by the processors 11-14 respectively, has a capacity corresponding to the processing result of one partial data, whether the processor can write new data is determined depending on whether the processing result was transferred, so a transfer end flag to indicate whether the processing result has been transferred is provided for each processor, and whether the processor can process new data is judged based on this flag.

Now the compression control means 217 returns to step S2100 if unselected scanning lines exist among the scanning lines constituting the generated printing image (FIG. 14: step S2105).

Figure 17:
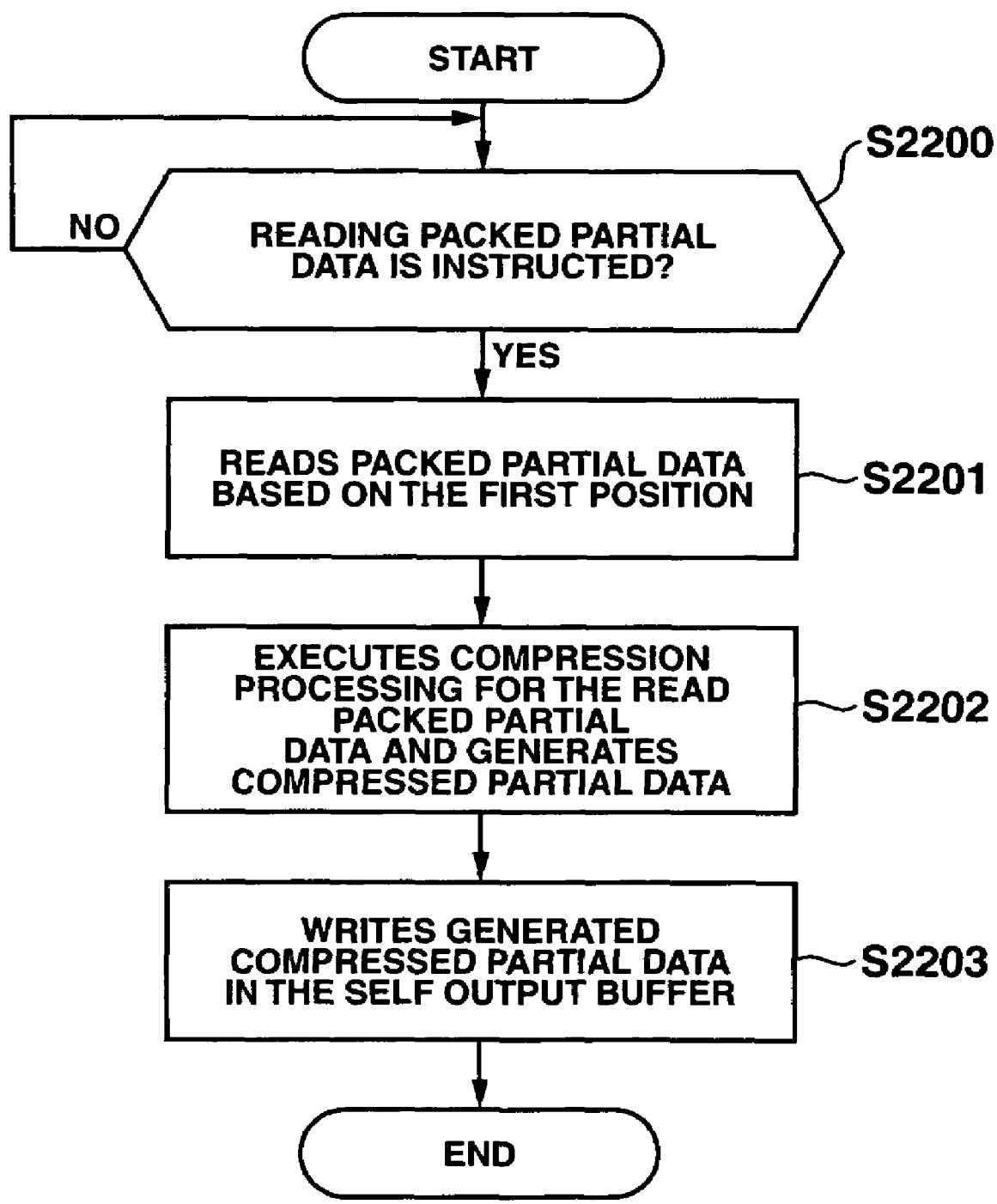
FIG. 17 is a flow chart depicting the processing content of the parallel processing unit 15.

When the information on the first position of the packed partial data and the read instruction are received from the compression control means 217 (FIG. 17: step S2200: YES), each processor 11-14 of the parallel processing unit 15 reads the packed partial data from the predetermined area of the RAM based on the information on the first position (FIG. 17: step S2201).

And the compressed partial data is generated by executing the predetermined compression processing on the read packed partial data (FIG. 17: step S2202), and this compressed partial data is written to its own output buffer of each processor 11-14 (FIG. 17: step S2203). For the predetermined compression processing, various conventional compression algorithms can be used according to the design, and in the case when the printing image is binary data, for example, it is possible to use a JBIG (Joint Bi-level Image experts Group) algorithm.

Figure 18:
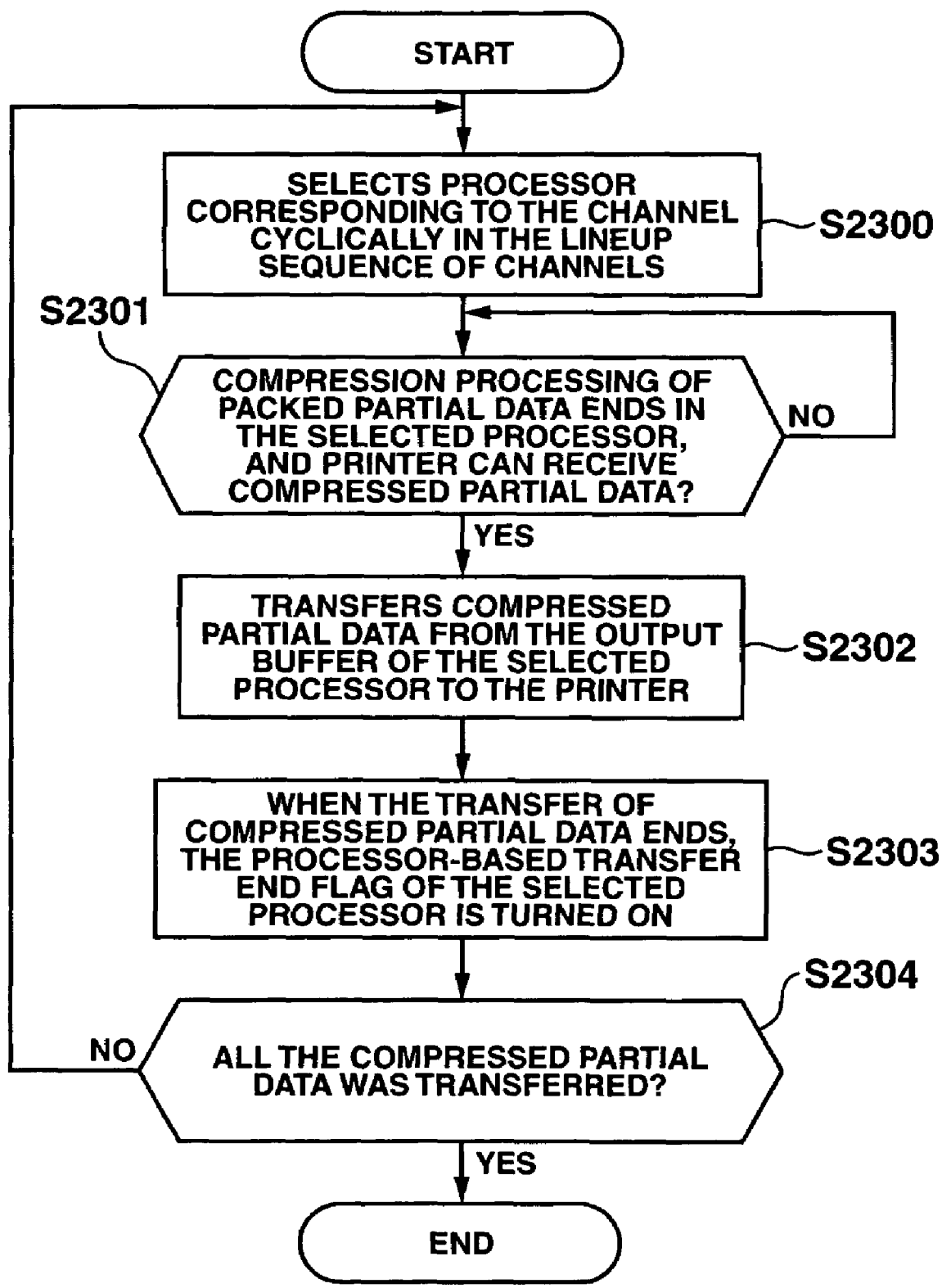
FIG. 18 is a flow chart depicting the processing content of the transfer means 218.

The transfer means 218 selects a processor corresponding to this channel cyclically in the lineup sequence of the channels (FIG. 18: step S2300).

Now the transfer means 218 transfers the compressed partial data from the output buffer of this processor to the printer 20 (printer controller 26) (FIG. 18: step S2302) when the compression processing of the packed partial data ends in the selected processor, and the printer 20 (printer controller 26) can receive the compressed partial data (FIG. 18: step S2301: YES). At this transfer time, a predetermined boundary information is added to the end (or beginning) of the compressed partial data so that the boundary of the compressed partial data can be detected.

Then when the transfer of the compressed partial data ends, the transfer means 218 turns ON the processor-based transfer end flag of this processor (FIG. 18: step S2303). The processor-based transfer end flag of this processor is turned OFF again when the compression control means 217 sends the reading instruction to the processor.

If all the compressed partial data has not been transferred for the generated printing image, the transfer means 218 returns to step S2300 (FIG. 18: step S2304).

According to this configuration, compression processing is executed in parallel for each channel constituting one scanning line (that is for each partial data), so the compression processing time for an individual scanning line can be decreased. In particular, the decrease in the compression processing time of the first one scanning line makes it possible to decrease the time required from the start of compression processing of a printing image to the end of compression processing of the first scanning line, and to the timing when the processing result thereof is transferred to the printer 20 (printer controller 26), and compression processing (and printing processing) which starts up quickly can be implemented.

Also a data string where the gradation data of a plurality of pixels are continuously arrayed is generated for each partial data (that is packed) first, then compression processing is performed targeting this data string, so compared with the configuration of prior art where image processing is performed after the gradation data of each pixel of the image is carried in byte units, the capacity of the memory area required for execution of image processing and the data amount to be the operation target can be suppressed, and efficient compression processing can be executed.

(Processing in Printer 20)

When the command received by the receive means is a printing instruction command, the printer controller 26 prepares for printing by controlling the power mechanism unit using the engine control means, and instructs the decompression control means 228 to start processing.

Figure 19:
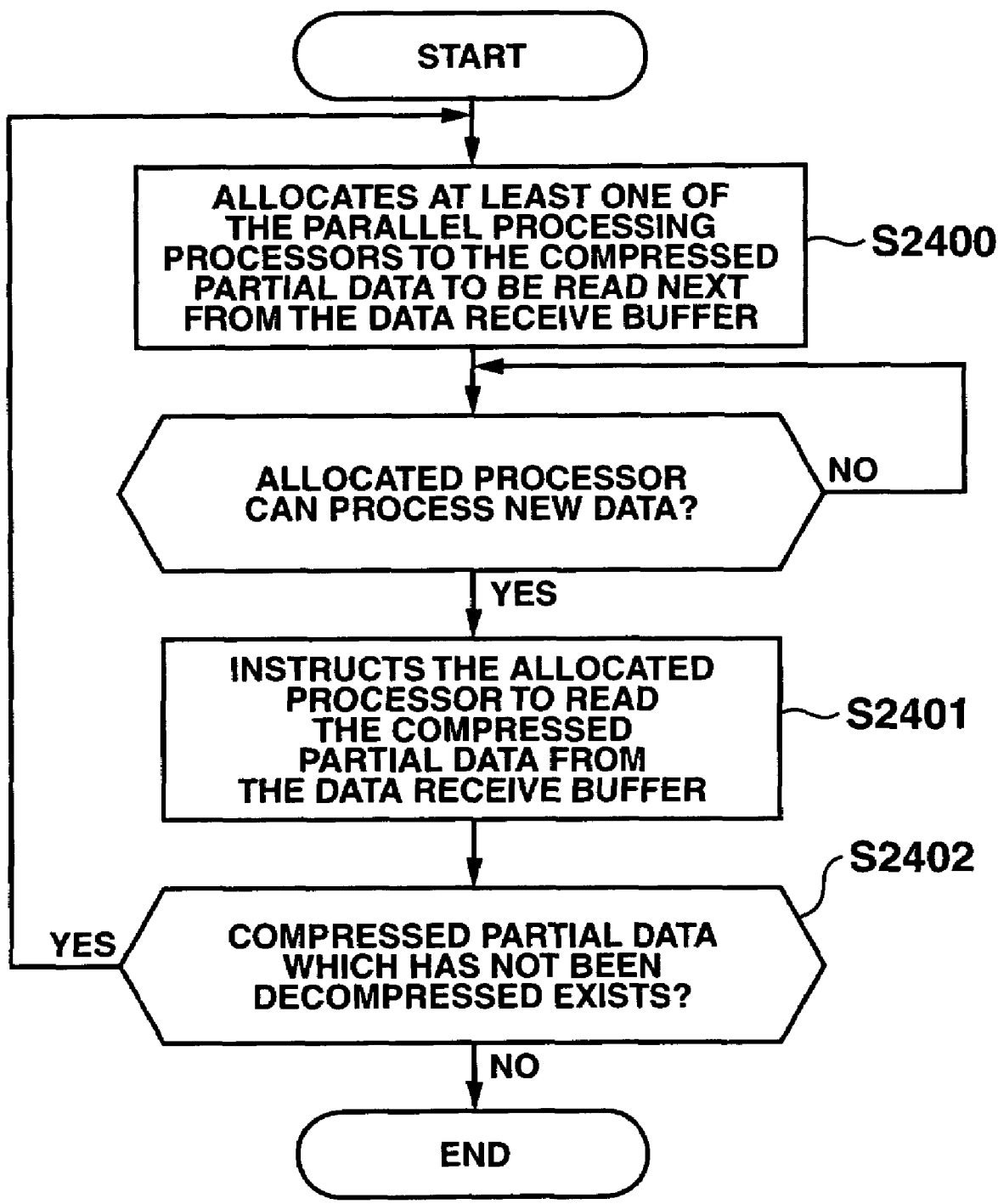
FIG. 19 is a flow chart depicting the processing content of the decompression control means 228.

When the instruction to start processing is received, the decompression control means 228 allocates at least one of the processors 21-24 to the compressed partial data (channel) to be read next from the data receive buffer (FIG. 19: S2400).

Specifically a combination of a channel and processor is fixed for allocation, such as the processor 21 to the compressed partial data of channel 1 and the processor 22 to the compressed partial data of channel 2.

Here it is preferable to construct the data receive buffer as an FIFO type buffer on the RAM (or FIFO type memory). In this case, as described above, the transfer means 218 of the host device 10 transfers the compressed partial data to the printer 20 (printer controller 26) in the lineup sequence of the channels, so the read/write of the compressed partial data in the data receive buffer is also executed in the lineup sequence of the channels. Therefore the decompression control means 227 can specify a channel to which the compressed partial data to be read next corresponds, and allocate with the fixed combination of a processor and a channel.

Then the decompression control means 228 judges whether the allocated processor can process new data, and if possible, instructs the processor to read the compressed partial data from the data receive buffer (FIG. 19: step S2401).

If the output buffer that can be written to by each one of the processors 21-24 has a capacity corresponding to one partial data, for example, the above judgment can be made based on the transfer end flag, just like the case of the compression control means 217.

Now the decompression control means 228 returns to step S2400 if there is compressed partial data which is not yet decompressed (FIG. 19: step S2402).

Figure 20:
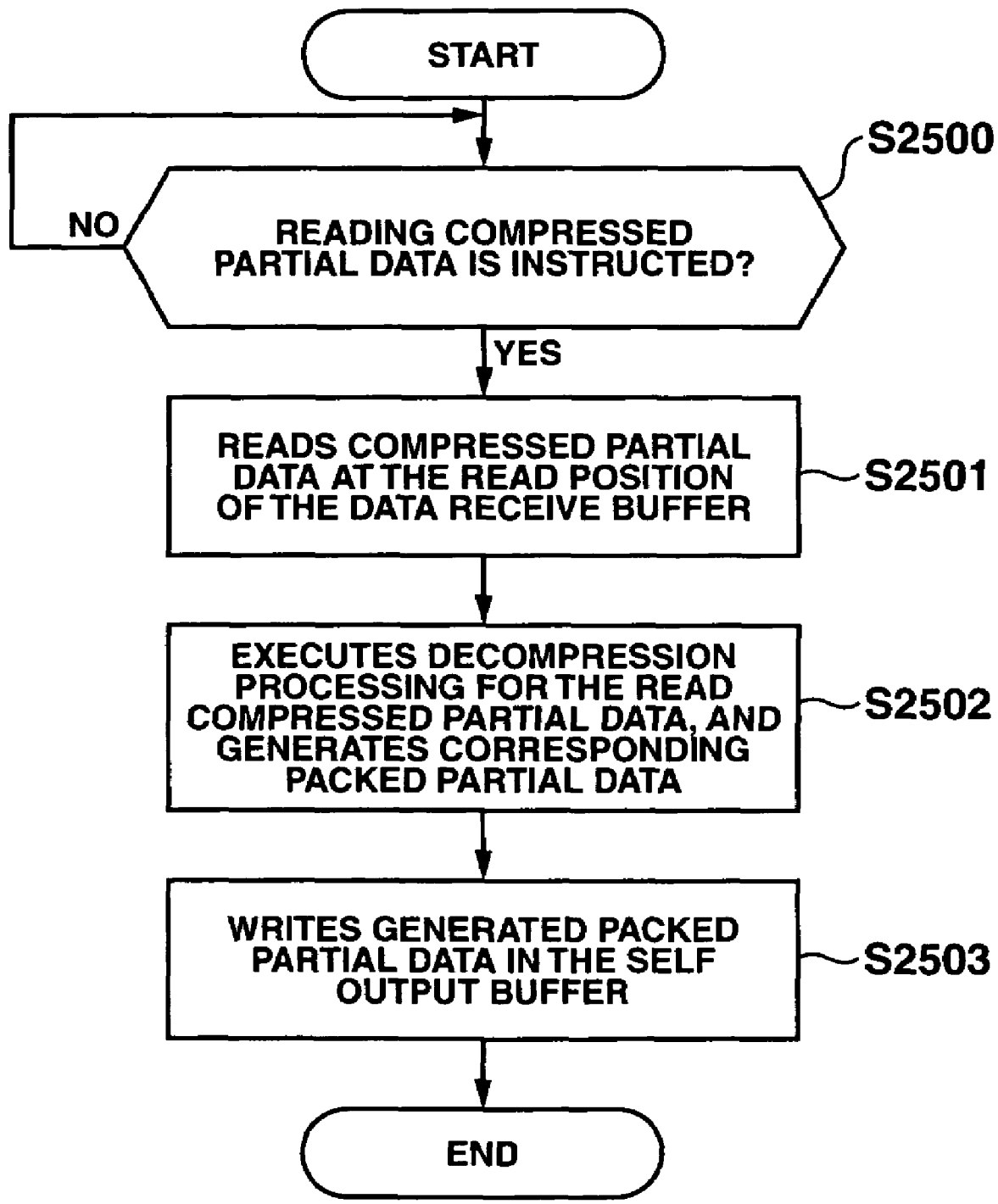
FIG. 20 is a flow chart depicting the processing content in the parallel processing unit 25.

When the instruction to read the compressed partial data is received from the decompression control means 227 (FIG. 20: step S2500: YES), each processor 21-24 of the parallel processing unit 25 reads the compressed partial data at the reading position of the data receive buffer (FIG. 20: step S2501). Each processor can specify the reading start/end position of the compressed partial data by detecting the boundary information added to the compressed partial data.

Then each processor 21-24 executes a predetermined decompression processing to the read compressed partial data, generates the corresponding packed partial data (FIG. 20: step S2502), and stores this packed partial data to its own output buffer (FIG. 20: step S2503). For the decompression processing, the decompression processing, corresponding to the compression algorithm used in the parallel processing unit 15 of the host device 10, must be used.

Figure 21:
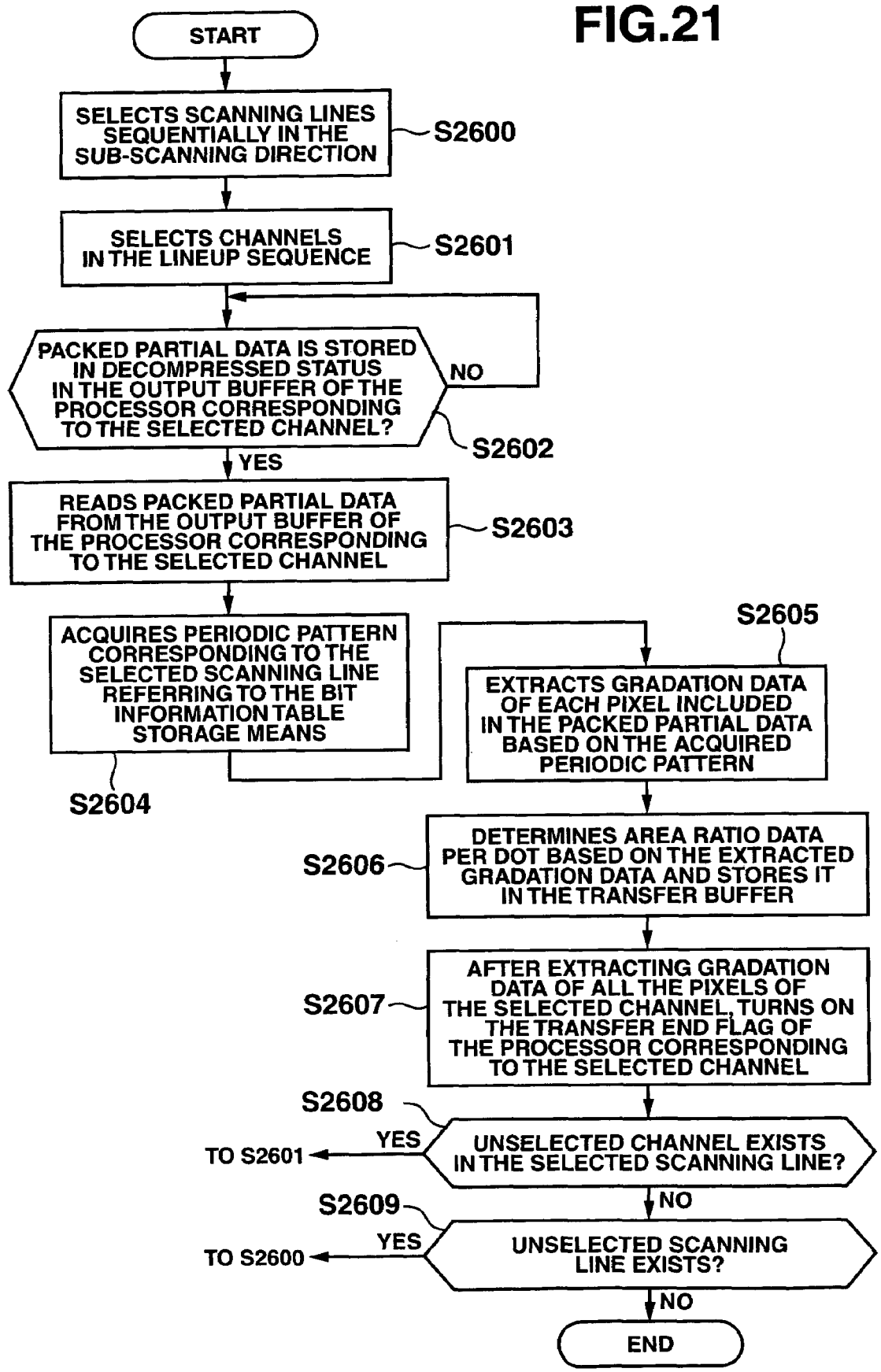
FIG. 21 is a flow care depicting the processing content of the unpack means 229.
Figure 23A:
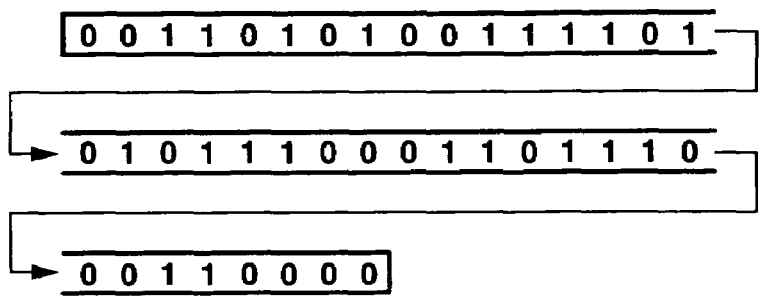
FIG. 23 is a diagram depicting the status of unpacking.
Figure 23B:
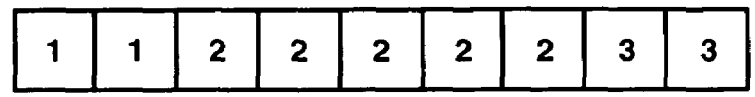
Figure 23C:
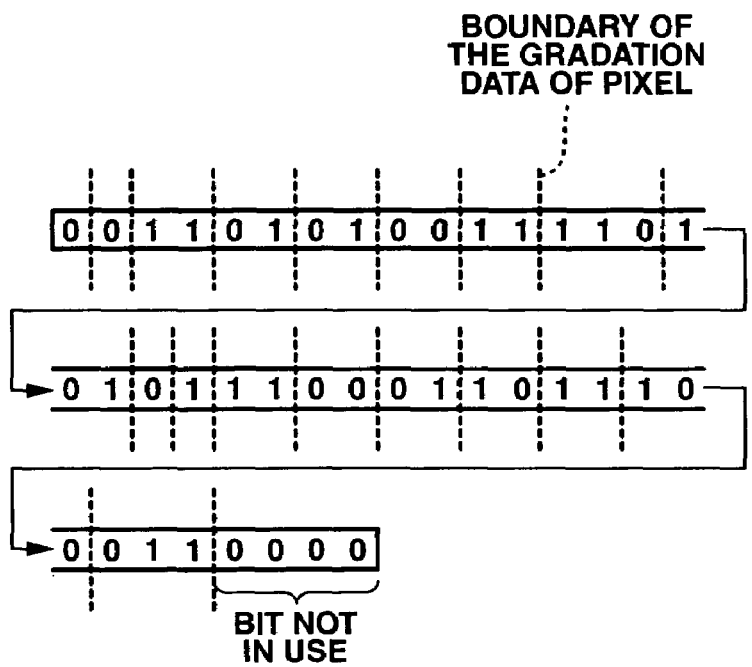
Figure 23D:
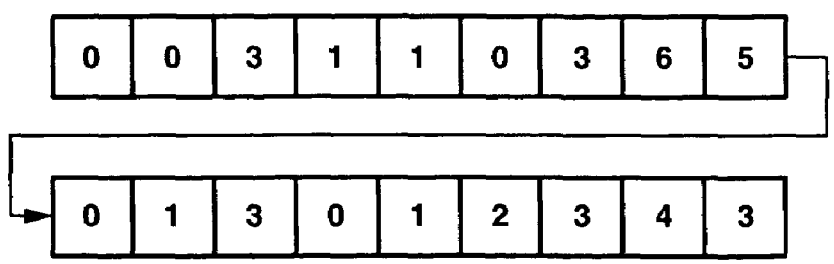

The unpack means 229 selects the scanning lines sequentially in the sub-scanning direction so as to unpack data in the sequence to be used for printing (FIG. 21: step S2600).

Now the unpack means 229 selects the channel for the selected scanning line in the sequence to be used for printing, that is in the lineup sequence (FIG. 21: step S2601).

Then the unpack means 229 judges whether the packed partial data is stored in the output buffer of the processor corresponding to the selected channel in decompressed status (FIG. 21: step S2602). If judged that the packed partial data is stored, the unpack means 229 reads this packed partial data (FIG. 21: step S2603).

Here the read packed partial data is in a status where the gradation data of pixels, of which the bit lengths are different, is mixed and packed, so the boundaries of the gradation data for each pixel must be known in order to extract the gradation data of each pixel from this packed partial data. According to the second embodiment, the printer controller 26 comprises the bit information table storage means 227 for storing a bit information table specified by the half-tone processing executed by the host device 10, and the boundaries of the gradation data of each pixel can be known by referring to this storage means 227.

The unpack means 229 refers to the bit information table storage means 227, and acquires the periodic pattern (lineup pattern of the bit lengths) corresponding to the selected scanning line (FIG. 21: step S2604). For example, if the size of the bit information table in the vertical direction is P, then the periodic pattern of the Q-th scanning line has the bit length of the (Q mod P)-th line of the bit information table.

And based on the acquired periodic pattern, the gradation data of each pixel included in the packed partial data is extracted (FIG. 21: step S2605). For the dummy pixels added by padding, gradation data need not be extracted. For example, if 1-bit dummy pixels were added to the end of the scanning line, the value of the number of dummy pixels X is received from the host device 10, and extraction of the packed partial data of the final channel of remaining X bits is ended.

As mentioned above, according to the compression control processing executed in the host device 10, packed partial data is generated by dividing such that the boundary of the channels match with at least one of the boundaries of the periodic pattern specified by the bit information table, and then packing the partial data of each channel. In this case, the start position of each channel and the start position of the periodic pattern of the lineup of the bit lengths always match, and pixels with a bit length matching with the periodic pattern are packed from the beginning of the packed partial data. Therefore the unpack means 229 can extract the gradation data of each pixel included in this packed partial data by extracting data with a bit length according to the sequence of the periodic pattern corresponding to the selected scanning line from the beginning of the packed partial data for any channel.

FIG. 23 is a diagram depicting the status of unpacking. For example, if the packed partial data has the data string shown in FIG. 23A, and the periodic pattern has the values shown in FIG. 23B, the gradation data of each pixel is extracted from the packed partial data in the sequence of 1 bit, 1 bit, 2 bit, 2 bit, 2 bit, 2 bit, 2 bit, 3 bit, 3 bit, - - -, as shown in FIG. 23C, and the values shown in FIG. 23D are acquired.

If the printing engine is a type that can print by area gradation, the unpack means 229 determines the area ratio data per dot (=gradation value of this pixel/maximum gradation value of the bit length of this pixel) based on the extracted gradation data of this pixel, and stores it in the FIFO type transfer buffer onboard the RAM, for example, in the lineup sequence of the pixels (FIG. 21: step S2606).

After the gradation data of all the pixels is extracted for the selected channel, the unpack means 229 turns ON the transfer end flag of the processor corresponding to the selected channel (FIG. 21: step S2607). The transfer end flag of each processor is turned OFF again each time the decompression control means 228 instructs reading to the processor.

If unselected channels exist for the selected scanning line, the unpack means 229 returns to S2601 (FIG. 21: step S2608), and if not and if unselected scanning lines exist, processing returns to S2600 to select the next scanning line (FIG. 21: step S2609).

The transfer means 230 judges whether one scanning line of data is stored in the transfer buffer (FIG. 22: step S2700), and if it judges as stored, the transfer means 230 reads the one scanning line of data and transfer it to the printing engine (FIG. 22: step S2701). Since partial data is stored in the FIFO type transfer buffer in the sequence to be used for printing by the unpack means 229, the transfer means 230 can transfer the partial data to the printing engine in the sequence to be used for printing only if the partial data is sequentially read from the transfer buffer and transferred.

According to this configuration, decompression processing is executed for each channel constituting one scanning line (that is each compressed partial data) in parallel, so the decompression processing time required for an individual scanning line can be decreased.

In particular, a decrease in the decompression processing time of the first one scanning line makes it possible to decrease the time required from the start of decompression processing of the compressed printing image to the end of decompression processing of the first scanning line, and to the timing when the processing result thereof is transferred to the printing engine, and decompression processing (and printing processing) which starts up quickly can be implemented.

Also the partial data is transferred to the printing engine when all the partial data for one scanning line is collected in the output buffer of each processor, and when this transfer ends, decompression processing for the next line is executed, that is the decompression processing and transfer processing are executed synchronizing in scanning line units, so if a memory area with a capacity of at least one scanning line is available as a memory area for storing partial data, that is the decompression result (specifically, if the capacity of the output buffer of each processor≧memory capacity for one scanning line/number of processors), then throughput can be improved by parallel processing.

In other words, if one processor is allocated to one scanning line (or one band) and parallel processing is performed, as in the case of prior art, the effect of parallel processing according to the number of processors cannot be acquired unless at least there are memory areas for the number of scanning lines (or number of bands), that is the same number of processors, as the memory areas for storing the decompression processing result, but if one processor is allocated to one partial data and parallel processing is performed as the case of the second embodiment, then it is sufficient if there are memory areas corresponding to the partial data for each processor, and it is unnecessary to provide one scanning line of a memory area for each processor, therefore the effect of parallel processing according to the number of processors can be implemented even if only memory areas for the number of scanning lines, which is less than the number of processors, can be used as the memory area for storing the decompression result.

For example, (decompression processing time of one scanning line)≈MAX {decompression processing time of compressed partial data of each processor} is established by parallel decompression processing, so (decompression processing time of one scanning line)<(time required for printing of one scanning line in printing engine) can be implemented by providing an appropriate number of processors, and therefore even in the case of a laser printer which must continuously supply printing data in line units at a predetermined speed, real-time processing is possible.

Each processor can start decompression processing of the next compressed partial data when the packed partial data, which has its own decompression processing result of the processor, is unpacked and transferred to the transfer buffer, therefore decompression processing can be executed in parallel with the transfer processing from the transfer buffer to the printing engine.

In the above configuration, a data string, where the gradation data of a plurality of pixels are continuously arrayed (that is packed partial data), is the output target of the decompression processing, so compared with the configuration of prior art where the decompression result is output in a status in which the gradation data of each pixel of the image is carried in byte units, the capacity of a memory area required for execution of image processing and the data volume to be the operation target can be suppressed, and efficient decompression processing can be executed.

(Other)

The present invention is not limited to the second embodiment, but can be modified in various ways and applied. For example, the present invention can be applied to a system other than a printer system, and to processing other than compression/decompression processing.

For example, in the second embodiment, the case when an individual scanning line is divided into a plurality of partial areas for at least one scanning line constituting an image wherein at least one of the plurality of processors is allocated to each of the partial areas and image processing is performed in parallel was described, but the present invention is not limited to this configuration, but may be used for the case when the bit lengths of each pixel of at least one scanning line constituting an image are L1-LN respectively, and the image processing of the scanning lines is performed without assuming parallel processing targeting at least an (L1+ - - - +LN) length data string where the data of each pixel is lined up.

Also in the second embodiment, the printer 20 comprises the parallel processing unit 25 and printer controller 26, but the present invention is not limited to this configuration. For example, the parallel processing unit 25 and printer controller 26 can be constructed as external devices that can be connected to the printer 20. Also the parallel processing unit 25 and the printer controller 26 may be constructed as devices that can be connected to the host device 10 according to PCI bus standards, for example. In the case of connecting the parallel processing unit 25 to the host device 10, each function of the printer controller 26 may be implemented by the main CPU of the host device 10.

Also in the second embodiment, the half-tone processing for converting one pixel on the raster image into 9×9 pixels on the printing image was described, but such half-tone processing as converting one pixel on the raster image into 1 pixel on the printing image, for example, may be used.

Also in the second embodiment, the configuration where one scanning line is equally divided into partial areas according to the number of processors was described, but the scanning line need not always be equally divided, but the size of the partial areas to be allocated may be different according to the specifications of the processor, for example. The number of partial areas to be divided (number of channels) need not always be the same as the number of processors.

Also in the second embodiment, the configuration where a combination of a channel and a processor is fixed for allocation was described, but a processor which has completed processing may be allocated to the next channel, for example. In this case, the correspondence relationship between a processor and a channel may be different depending on the scanning line. A channel may be allocated not only to the processors of the parallel processing units 15 and 25 but also to the main CPU, and parallel processing is executed in this configuration.

Also in the second embodiment, the configuration where the processors 11-14 read the partial data from the RAM was described, but if the host device 10 comprises means of transferring the partial data from the RAM to the processors 11-14 (e.g. DMA transfer means), for example, the compression control means may instruct the transfer to this means. In this case, the processors 11-14 execute processing after receiving the transfer from this means. In the same way, if the printer 20 comprises means of transferring the compressed partial data from the data receive buffer to the processors 21-24, the decompression control means can instruct the transfer to this means, and the processors 21-24 execute processing after receiving the transfer from this means.

Also in the second embodiment, the case when the output buffer that can be written by each of the processors 11-14 (processors 21-24) has a capacity corresponding to the processing result of one partial data was described, but each processor may be able to write an output buffer with the above capacity or more respectively. In this case, each processor can execute compression processing (decompression processing) sequentially as long as the capacity of the output buffer allows. The output buffer of each processor may be installed in the parallel processing unit, but also may be constructed using a part of the RAM of the host device 10 or printer 20.

Also in the second embodiment, the configuration where parallel processing is performed for all the scanning lines of the printing image was described, but if the present invention is applied to at least one scanning line constituting the printing image, the compression processing time/decompression processing time can be decreased for this scanning line.

Also in the second embodiment, the configuration where the transfer means 218 sequentially transfers the compressed partial data to the printer 20 was described, but the compressed partial data may be burst-transferred after waiting until all the data for one scanning line is collected. In this case, the compressed partial data may be stored in the RAM once, then transferred, for example.

Also in the second embodiment, the configuration where the transfer means 218 transfers the data in the lineup sequence of the channels was described, but the data may be transferred in a sequence different from the lineup sequence by adding the channel identification information to the compressed partial data before transfer. In this case, the decompression control means 227 can judge the processor to be allocated based on the identification information.

Also in the second embodiment, the configuration where the transfer means 230 transfers the data to the printing engine when one scanning line of data is collected was described, but the data may be transferred to the printing engine without waiting for the one scanning line of data to be collected or when a plurality of scanning lines of data (e.g. one band of data) is collected depending on the type of printing engine.

Also in the second embodiment, the scanning line is divided so as to satisfy the boundary matching conditions in the main scanning direction (conditions where the boundary of the channels match at least one of the boundaries of the periodic pattern), assuming the configuration where compression/decompression processing is performed in parallel in channel units for each scanning line, but the present invention is not limited to this configuration. For example, a band is formed by a plurality of scanning lines, and compression/decompression processing may be performed in parallel in channel units for each band. In this case, a band may be divided so as to satisfy the boundary matching conditions in the sub-scanning direction (conditions where the boundary of the bands match at least one of the boundaries of the periodic pattern).

Third Embodiment

The hardware configuration of the printer system 1 according to the third embodiment of the present invention is, as a rule, the same as the first embodiment (see FIG. 1).

In other words, the host device 10 is comprised of the main CPU, parallel processing unit 15 further comprising parallel processors 11-14, ROM, RAM, user interface, communication interface and other hardware. According to the third embodiment, the parallel processing unit 15 has four processors 11-14, just like the first embodiment, but the number of processors can be two or a higher arbitrary number (e.g. 8) according to the design.

The host device 10 is comprised of printer driver means 16 as a standard control function for the printer 20 to execute printing.

The printer driver means 16 has a similar functional configuration as a standard printer driver, and comprises RIP means for generating a raster image based on the printing target data written by a predetermined printer control language, such as PostScript®, according to the printing request from the application program running on the host device 10, image processing means for creating a printing image by performing a predetermined image processing (e.g. screen processing) on the raster image, and other means.

The printer drive means 16 of the third embodiment, however, comprises compression control means 317 for executing image compression processing for an individual scanning line (or individual band) in parallel using the parallel processing unit 15, and a transfer means 318 for burst-transferring the data compressed by the parallel processing unit 15 to the printer 20, as described later, which is different from a conventional configuration (see FIG. 25A).

The functions of these means are implemented by the main CPU executing programs stored in ROM or RAM in the host device 10 or external storage medium.

The printer 20 comprises a power mechanism unit and printer controller 26.

The power mechanism unit further comprises a paper feed mechanism for supplying paper to the printer, printing engine for performing printing and paper eject mechanism for ejecting paper from the printer. For the printing engine, various printing engines corresponding to a serial printer which prints data in one character units, such as an inkjet printer and thermal transfer printer, a line printer which prints data in one line units and a page printer which prints data in one page units can be used.

The printer controller 26 is comprised of a main CPU, parallel processing unit 25 further comprising processors 21-24, ROM, RAM, user interface and communication interface. In the third embodiment, the parallel processing unit 25 has four processors 21-24, but the number of processors can be two or a higher arbitrary number (e.g. 8) according to the design, just like the first embodiment. The power mechanism unit may have an independent CPU, and in this case, the CPU of the power mechanism unit communicates with the main CPU of the information processing unit via a predetermined communication path to control the printing engine, and performs printing operation.

The printer controller 26 has a similar functional configuration as a printer controller of a standard printer, and comprises, for example, receive means for receiving commands and data from the host device 10 and storing them in the receive buffer, and engine control means for controlling the power mechanism unit to execute printing.

The difference of the printer controller 26 of the third embodiment from a conventional configuration, however, is that it comprises data sequence adjustment means 327 for reading compressed data from the data receive buffer for storing the burst-transferred compressed data in the sequence to allow parallel processing, and transferring it to the intermediate buffer, decompression control means 328 for executing decompression processing on an individual scanning line (or an individual band) in parallel using the parallel processing unit 25 based on compressed data stored in the intermediate buffer, and transfer means 329 for transferring the decompression processing result by the parallel processing unit 25 to the printing engine in the sequence to be used for printing, as described later (see FIG. 25B).

Each of these means is implemented by the main CPU executing the programs stored in ROM or RAM in the printer 20 or external storage medium.

Now the printing processing in the printer system 1 will be described with reference to the flow charts and diagrams shown in FIG. 26-FIG. 34. Each step (including partial steps not denoted with reference numerals) can be executed in any sequence or in parallel within the scope where no inconsistency occurs regarding processing content.

(Processing in Host Device 10)

The printer driver means 16 accepts a printing request from an application program running externally or on the host device 10, and sends the printing instruction command to the printer 20 (printer controller 26), and instructs the RIP means to start processing.

The RIP means receives the instruction to start processing, and generates a raster image based on the printing target data written in a predetermined printer control language, such as PostScript®, received from the application program. If the printing target data can be received in raster image format from an application program, the processing by the RIP means can be omitted.

The image processing means performs a predetermined image processing (e.g. screen processing) on the generated raster image, and stores the generated printing image in a predetermined area of the RAM.

Figure 26:
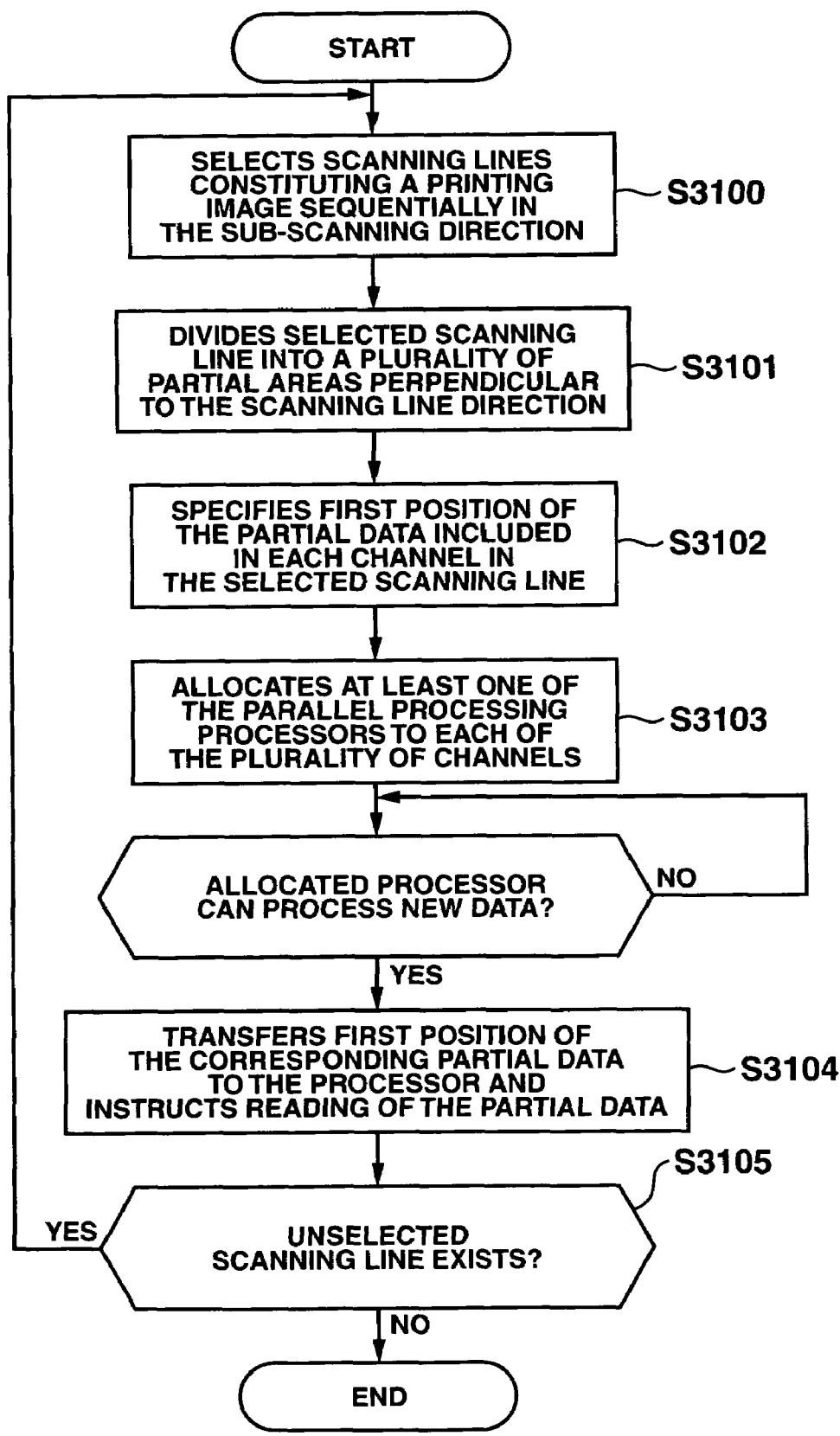
FIG. 26 is a flow chart depicting the processing content of the compression control means 317.
Figure 27:
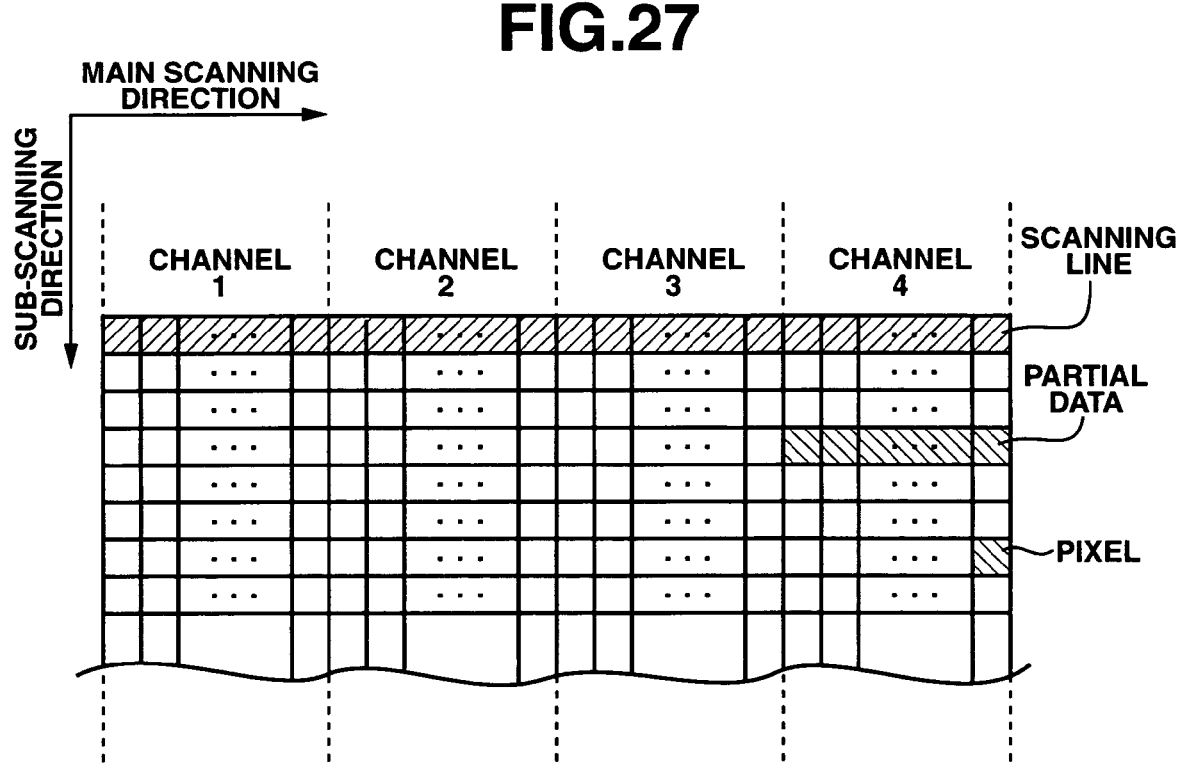
FIG. 27 is a diagram depicting channels.

The compression control means 317 selects the lines in the main scanning direction constituting the generated printing image (hereafter called "scanning lines") sequentially in the sub-scanning direction (FIG. 26: step S3100). The main scanning direction and sub-scanning direction are determined based on the scanning in the printer 20.

Then the compression control means 317 divides the selected scanning lines into a plurality of partial areas in a direction perpendicular to the scanning line direction (FIG. 26: step S3101). Hereafter the partial data divided in this way is called "channel", and each channel is identified by assigning a channel number in the lineup sequence in the scanning line direction, that is sequentially from the left (see FIG. 27). In the third embodiment, the concept of left and right is used assuming that the scanning lines are horizontally scanned from left to right.

Then the compression control means 317 specifies the first position of the printing image included in each channel (hereafter called "partial data") in the selected scanning lines (FIG. 26: step S3102). For example, if one scanning line has 2048 pixels, one scanning line is equally divided into four partial areas according to the number of processors, and the $1^{st}$ pixel, $512^{nd}$ pixel, $1024^{th}$ pixel and $1536^{th}$ pixel are specified as the first positions of the respective partial data.

If channels are defined commonly for all the scanning lines and the first position of the partial data of each channel is specified in advance, steps S3101-3102 can be omitted.

Now the compression control means 317 allocates at least one of the processors 11-14 to each of the plurality of channels (FIG. 26: step S3103). Specifically, the combination of a channel and a processor is fixed for allocation, such as processor 11 to channel 1 and processor 12 to channel 2.

Then the compression control means 317 judges whether the allocated processor can process the new data, and if it can process, the first position of the corresponding partial data is transferred to the allocated processor, and reading of this partial data is instructed (FIG. 26: step S3104).

Figure 36:
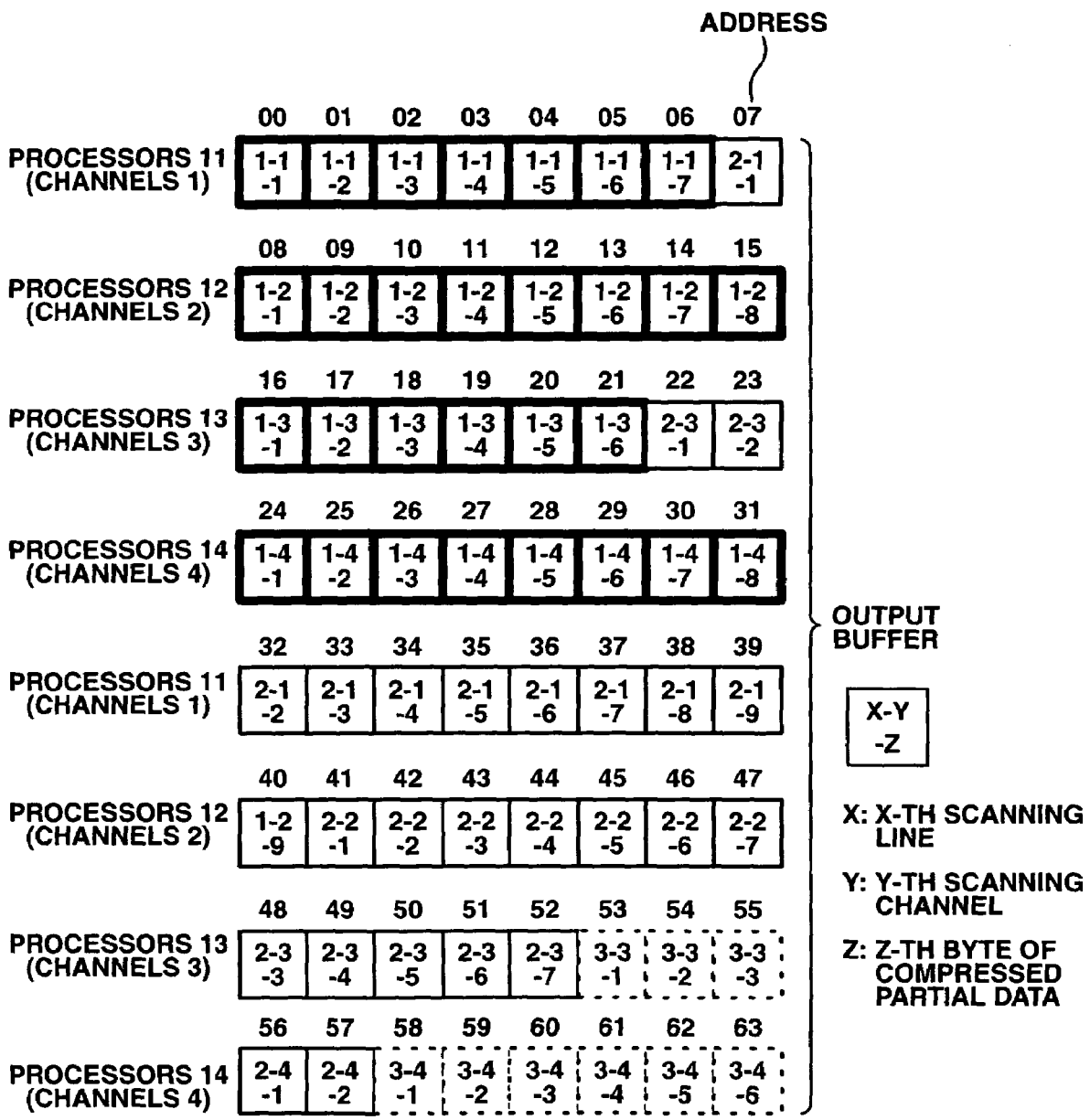
FIG. 36 is a diagram depicting the output buffer in the host device 10 (compression side)

Here the case when the processor can process new data is the case when this processor can newly write the next processing result. If a partial area of the output buffer is allocated respectively to the processors 11-14 (channels 1-4), as shown in FIG. 36, as an area to write the processing result, for example, whether new data can be processed can be judged depending on whether there is an opening in the allocated area of this output buffer, or whether a processing result already written in the allocation area has been transferred to the transfer means 318, and overwriting of this area is possible.

It is preferable that the output buffer is comprised of an SDRAM, which can perform burst-transfer at high-speed. This is because the processing result (compressed data) written in the output buffer is burst-transferred by the transfer means 318.

Now the compression control means 317 returns to step S3100 if unselected scanning lines exist among the scanning lines constituting the generated printing image (FIG. 26: step S3105).

Figure 28:
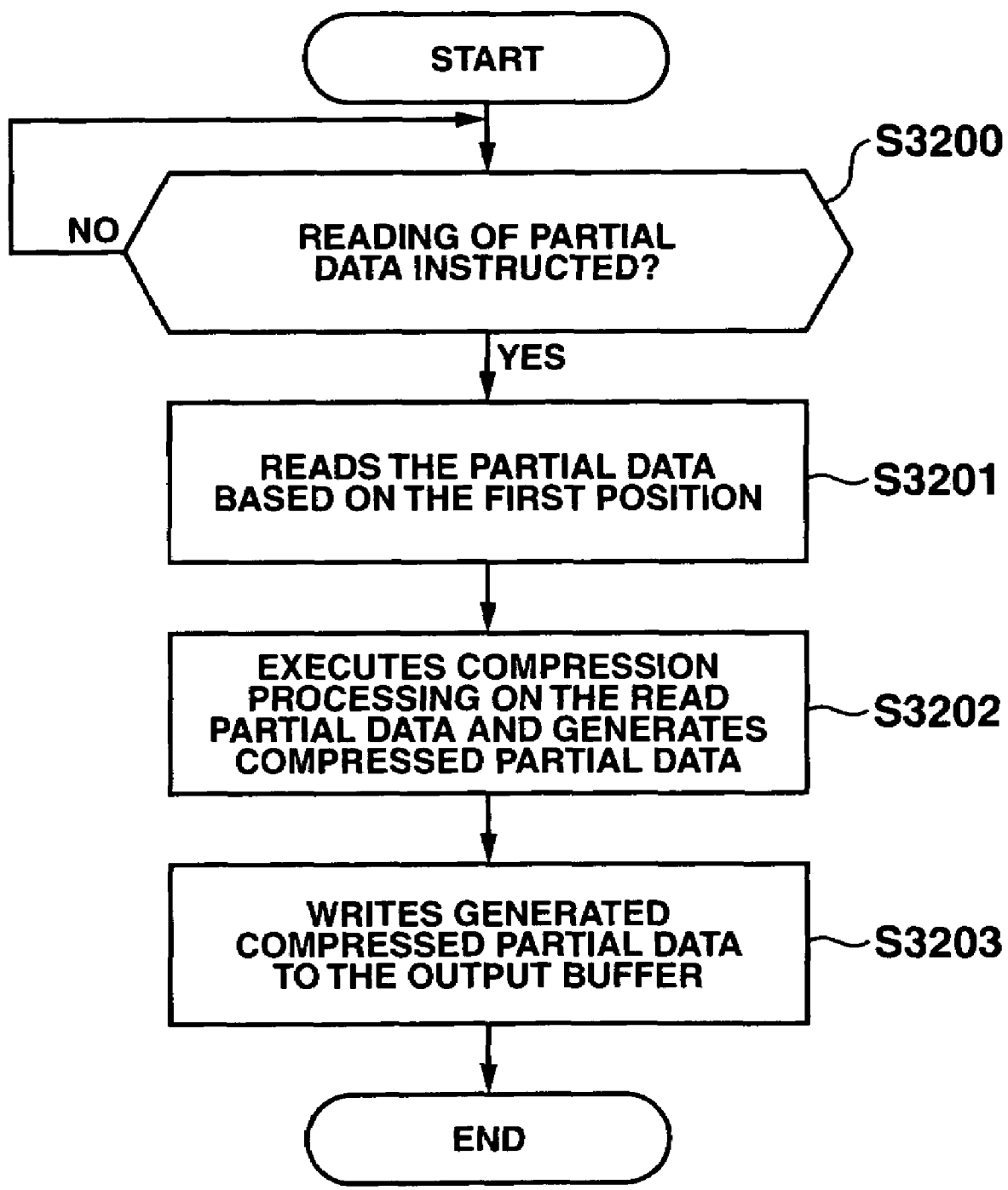
FIG. 28 is a flow chart depicting the processing content of the parallel processing unit 15.

When the information on the first position of the partial data and read instruction are received from the compression control means 317 (FIG. 28: step S3200: YES), each processor 11-14 of the parallel processing unit 15 reads the partial data based on the information on the first position from the predetermined area of the RAM where the generated printing image is stored (FIG. 28: step S3201).

Then the compressed partial data is generated by executing a predetermined compression processing on the read partial data (FIG. 28: step S3202). At this time, a predetermined boundary information is added to the end (or beginning) of the compressed partial data so that the boundary of the compressed partial data can be detected. For the predetermined compression processing, various conventional compression algorithms can be used according to the design, and in the case when the printing image is binary data, for example, it is possible to use a JBIG (Joint Bi-level Image experts Group) algorithm.

And the generated compressed partial data is written to an allocated partial area of the output buffer (FIG. 28: step S3203). When a partial area of the output buffer is allocated to each processor, as shown in FIG. 36, it is possible to dispose a counter for storing a current address for each processor so that each processor can refer to the address to be written next (current address), and increment the counter according to the capacity (number of bytes) that was written.

Figure 29:
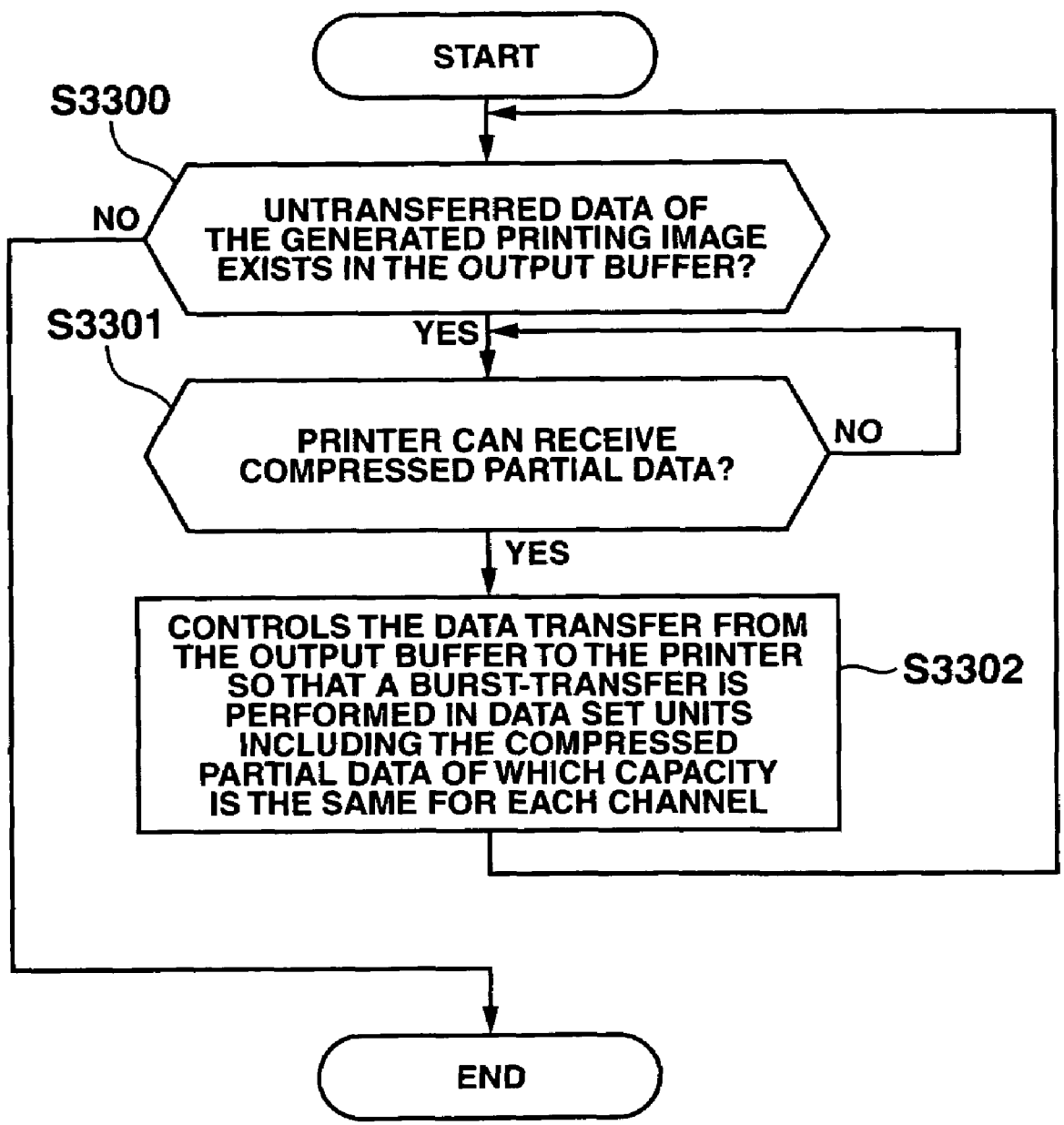
FIG. 29 is a flow chart depicting the processing content of the transfer means 318.

The transfer means 318 judges whether untransferred data exists in the output buffer for the generated printing image (FIG. 29: step S3300). And if untransferred data does not exist (transfer has been completed), the processing ends.

If untransferred data exists, the transfer means 318 judges whether the printer 20 (printer controller 26) can receive the compressed partial data based on the result of communication with the printer 20 (printer controller 26) (FIG. 29: step S3301).

And if receiving is possible, the transfer means controls that data is transferred from the output buffer to the printer 20 (printer controller 26), so that the data set which includes the same capacity of the compressed partial data for each channel is burst-transferred in data set units (FIG. 29: step S3302).

Figure 37:
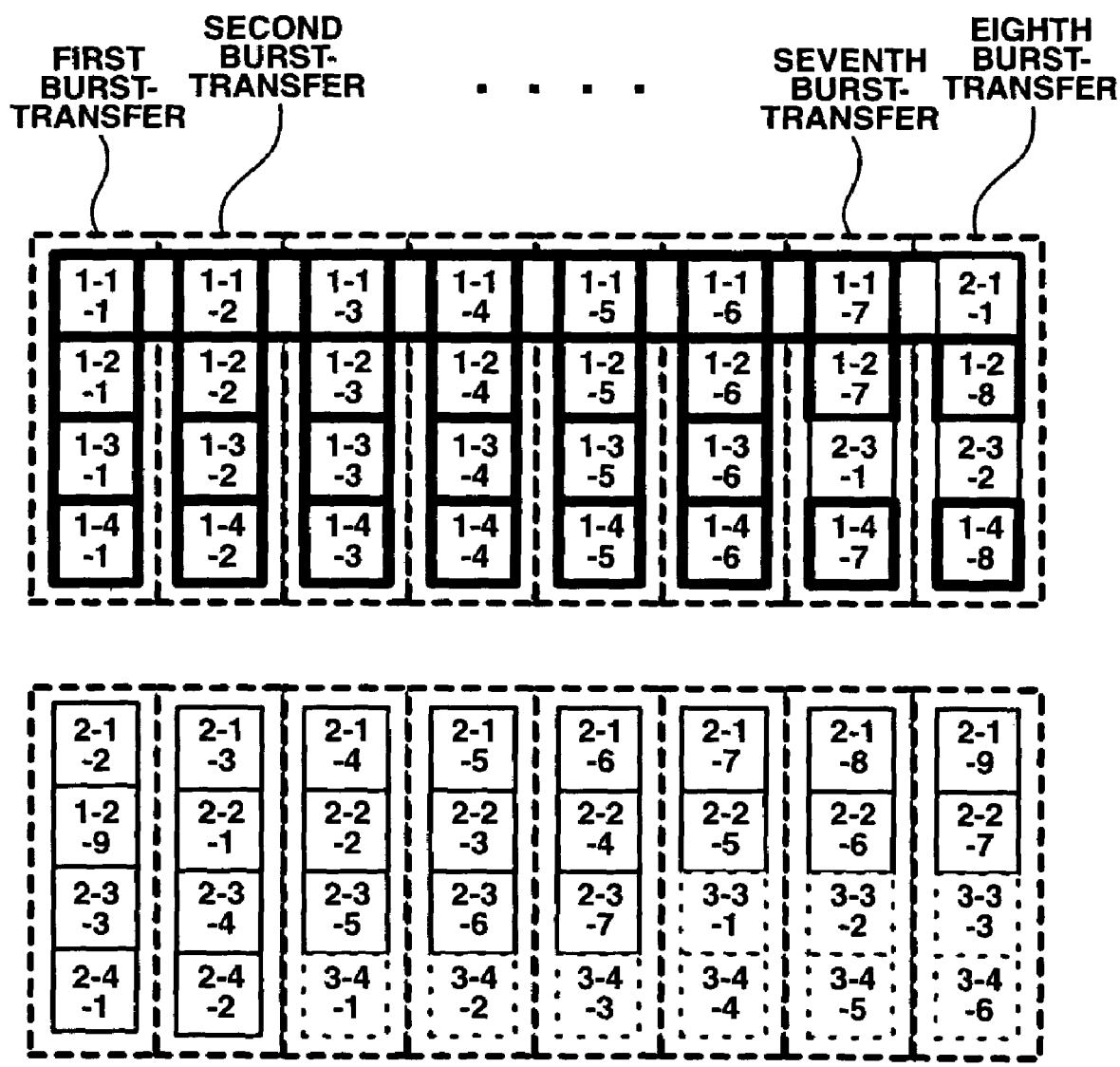
FIG. 37 is a diagram depicting the status of the burst-transfer.
Figure 38:
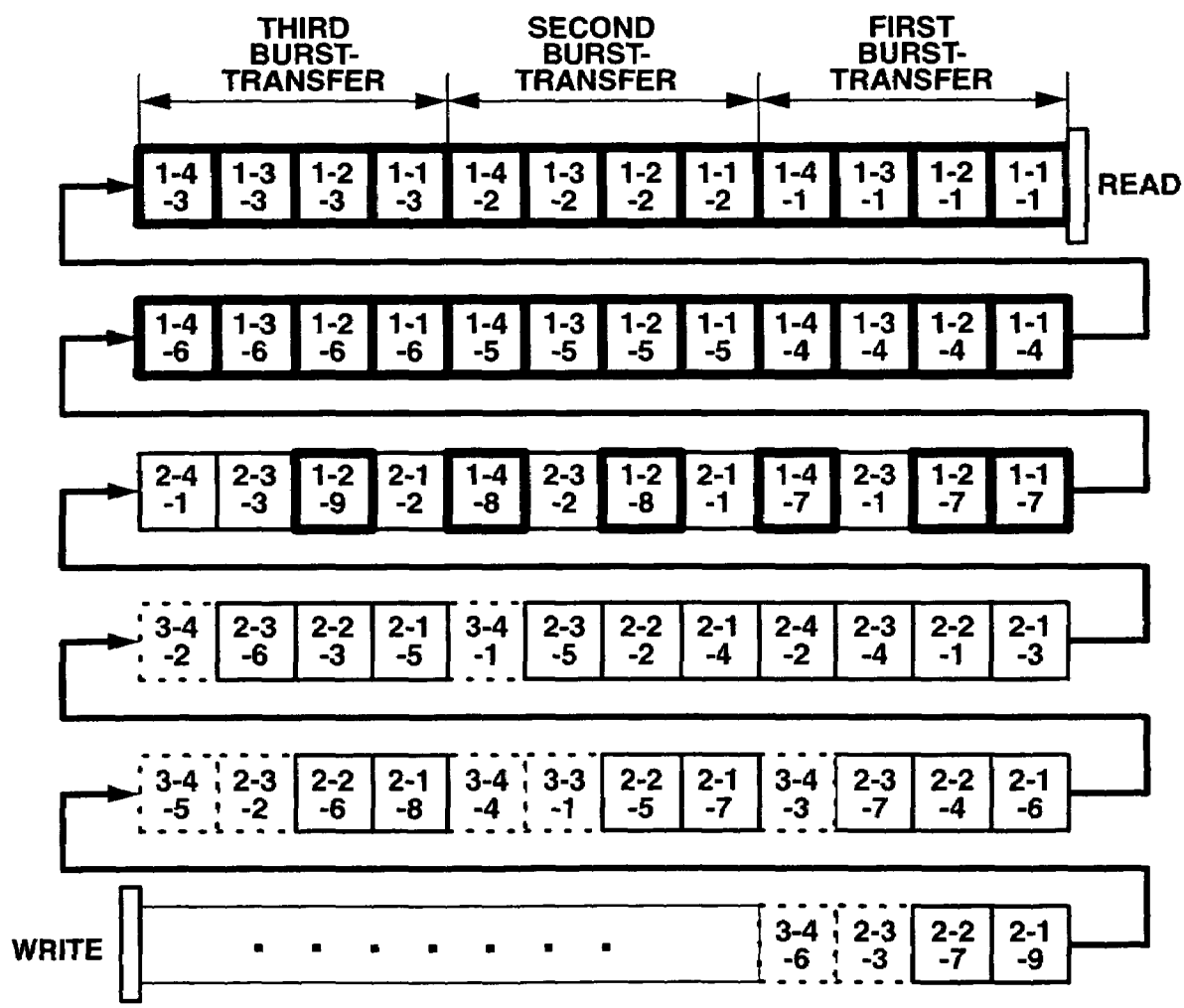
FIG. 38 is a diagram depicting the status of the burst-transferred data set being stored in the FIFO memory according to the prior art.

The size of the data set to be burst-transferred can be determined according to the design, but in the third embodiment, a burst-transfer is performed in a total of 4-byte data set units, including 1 byte of compressed partial data for each channel, as shown in FIG. 37. To perform a burst-transfer in this way, compressed partial data on a plurality of scanning lines may be included in the data set to be burst-transferred, as described with reference to FIG. 36-FIG. 38.

(Processing in Printer 20)

When the receive means receives a printing instruction command, the printer controller 26 prepares for printing by controlling the power mechanism unit using the engine control means. When the receive means receives a burst-transferred data set, the printer controller 26 stores this data set in the data receive buffer, and instructs the data sequence adjustment means 327 to start transfer processing from the data receive buffer to the intermediate buffer.

Figure 30:
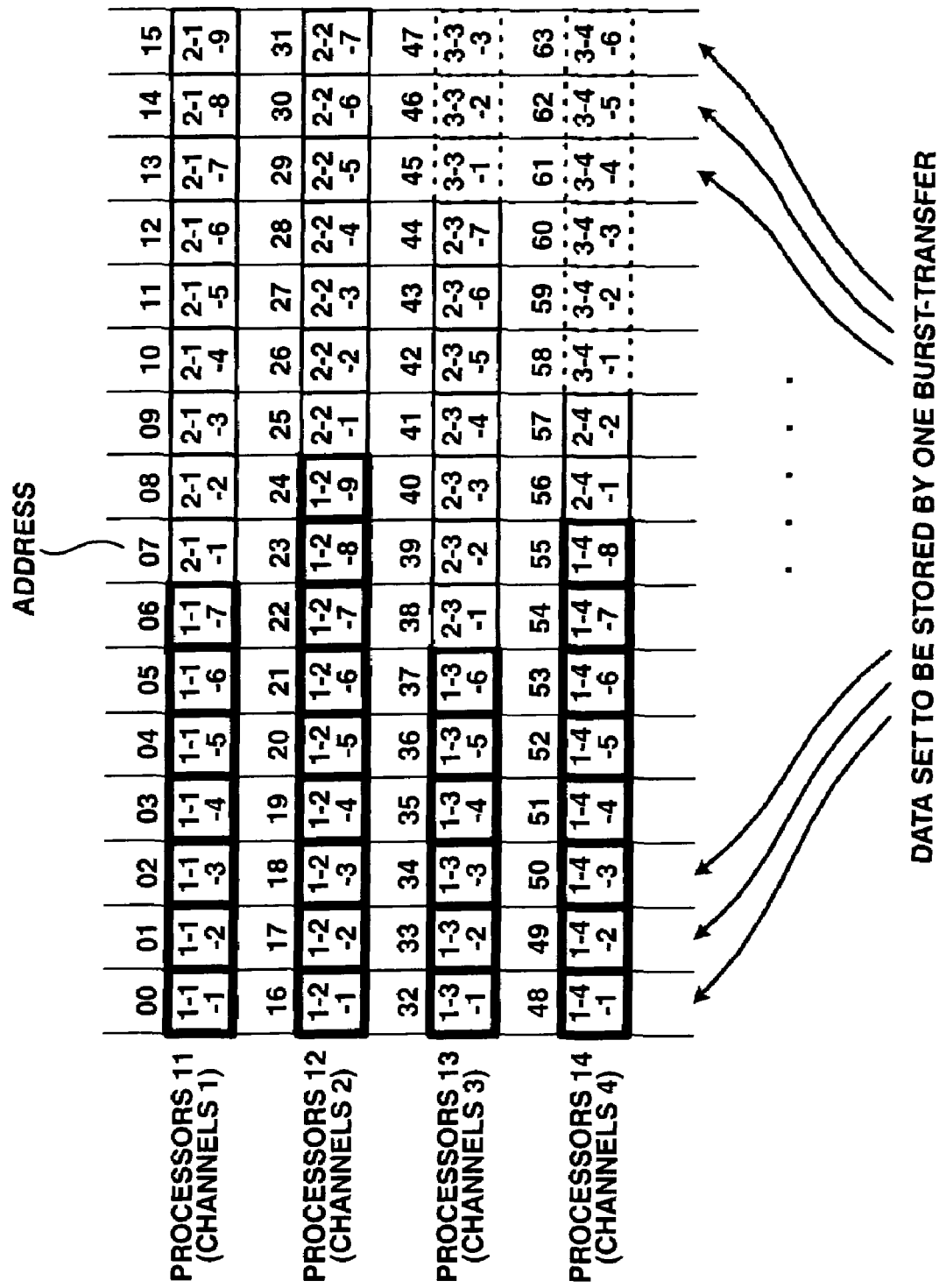
FIG. 30 is a diagram depicting the data receive buffer of the printer controller 26.

Here the data receive buffer becomes a buffer for storing data that is burst-transferred in a total of 4 byte data set units, including 1-byte of compressed partial data for each channel, from the host device 10, as described above, therefore it may be constructed as a ring buffer that can store a plurality of 4-byte data sets in the RAM, for example, as shown in FIG. 30. In the case of the example shown in FIG. 30, the data receive buffer 16 is constructed such that the 16 data sets can be stored cyclically. If the data receive buffer is constructed in this way, the compressed partial data of the channel 1 is continuously stored in the addresses 00-15 of the data receive buffer, and the compressed partial data of the channel 2 is continuously stored in the addresses 16-31, and compressed partial data can be accessed easily for each channel.

The intermediate buffer is constructed as an FIFO type buffer (or FIFO type memory) on the RAM, for example, so that each processor of the parallel processing unit 25 can always specify the same location of the intermediate buffer to read the compressed partial data.

Figure 31:
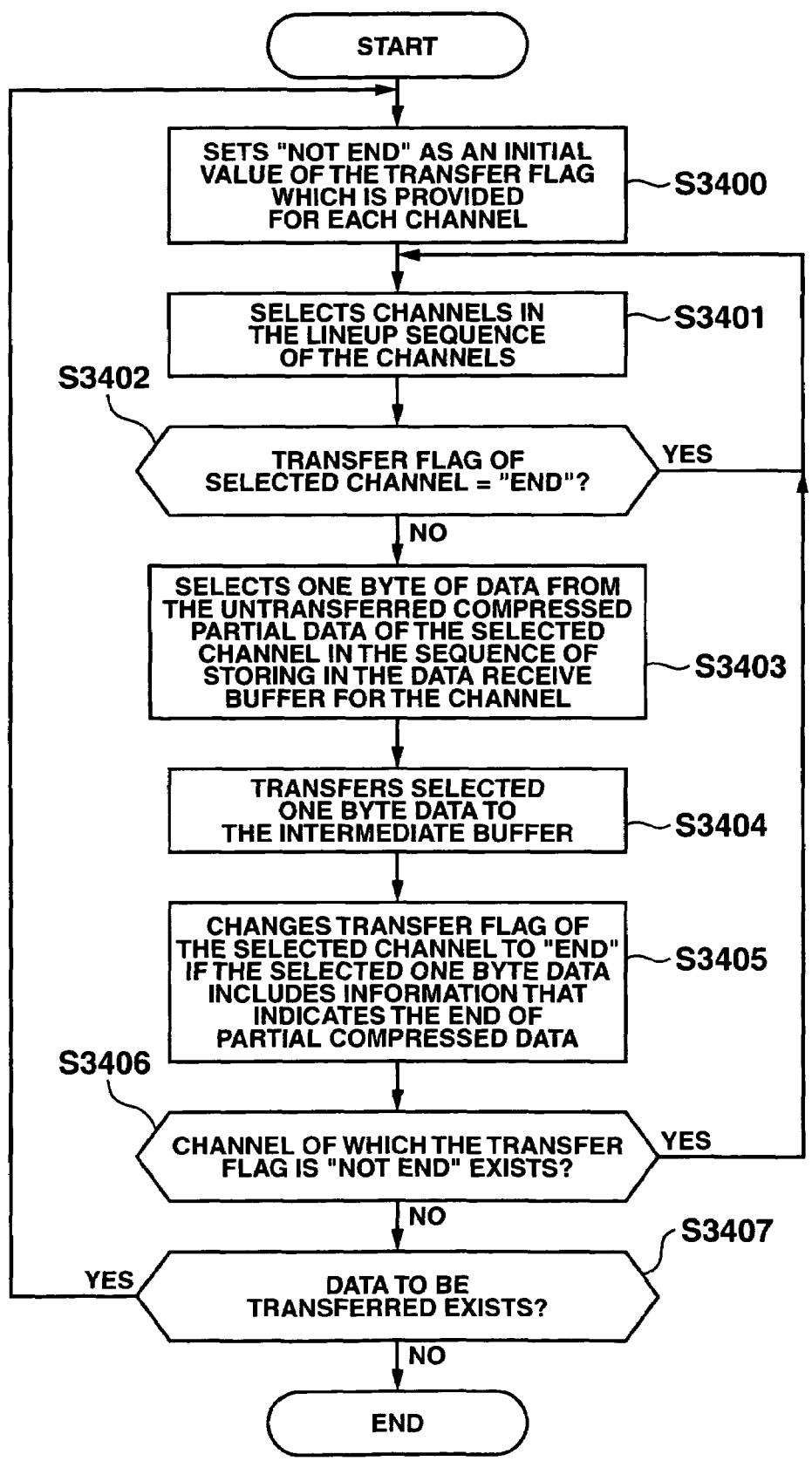
FIG. 31 is a flow chart depicting the processing content of the data sequence adjustment means 327.
Figure 32:
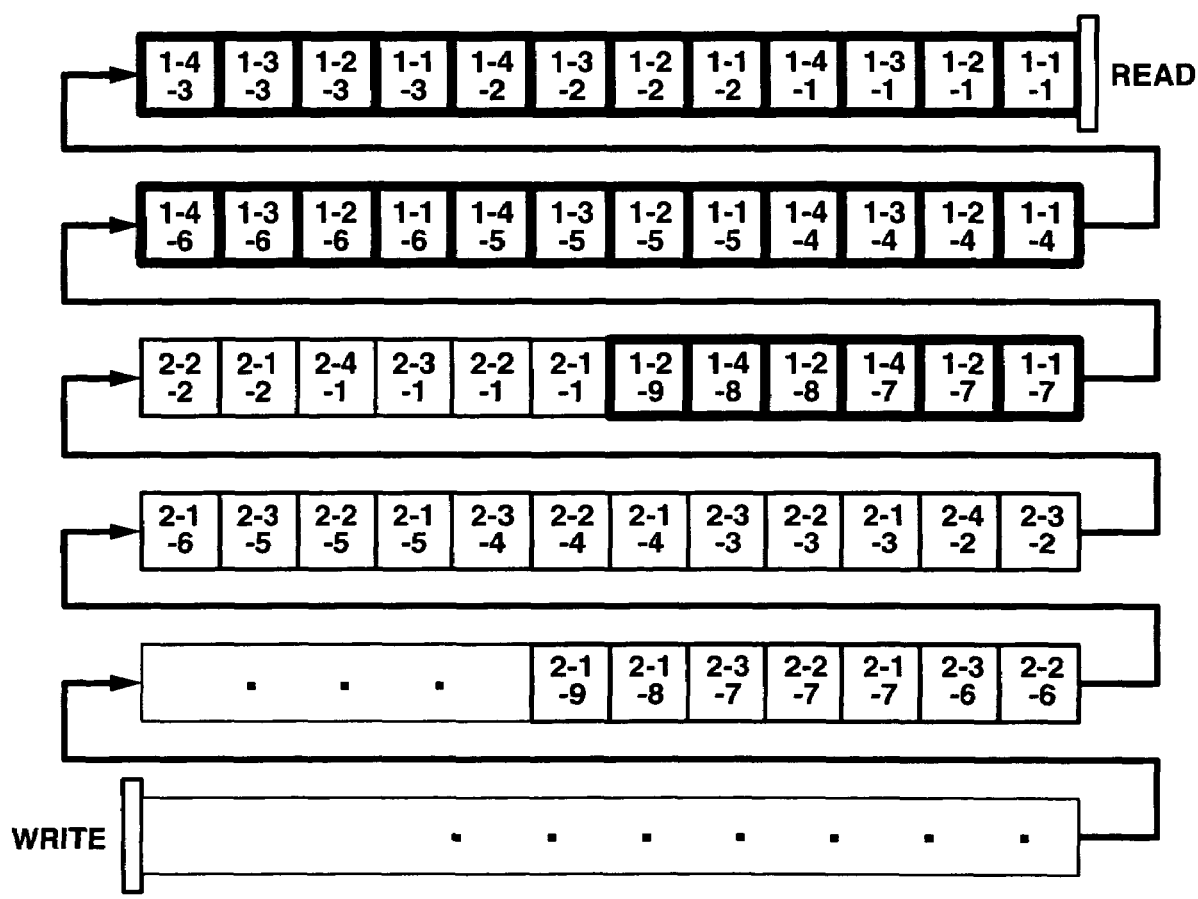
FIG. 32 is a diagram depicting the status of the burst-transferred data set being stored in the intermediate buffer according to the third embodiment.

When the instruction to start transfer processing is received, the data sequence adjustment means 327 sets "not end" to the transfer flag, which is provided for each channel, as an initial value (FIG. 31: step S3400). This transfer flag is changed to "end" when the transfer of the compressed partial data on one scanning line ends in each channel, as described later.

Then the data sequence adjustment means 327 selects a channel in the lineup sequence of the channels (FIG. 31: step S3401). And checks the transfer flag of the selected channel, and returns to S3401 if the transfer flag is "end" (FIG. 31: step S3402).

If the transfer flag is "not end", on the other hand, the data sequence adjustment means 327 selects 1 byte of data from the untransferred compressed partial data of this channel according to the sequence when stored to the data receive buffer for this selected channel (FIG. 31: step S3403).

Then the data sequence adjustment means 327 transfers the selected 1 byte data to the intermediate buffer (FIG. 31: step S3404), and if the selected 1-byte data includes information to indicate the end of the compressed partial data, the data sequence adjustment means 327 changes the transfer flag of the selected channel to "end" (FIG. 31: step S3405).

If there is a channel of which the transfer flag is "not end" (FIG. 31: step S3406: YES), that is when the transfer of the compressed partial data of all the channels has not ended for one scanning line, the data sequence adjustment means 327 returns to S3401 to select the next channel.

If the transfer flags of all the channels are "end" (FIG. 31: step S3406: NO), the data sequence adjustment means 327 judges whether the data to be transferred to the data receive buffer (untransferred scanning line compressed data) remains (FIG. 31: step S3407). If it remains, the data sequence adjustment means 327 returns to S3400 to perform transfer processing for the next scanning line.

When processing is structured in this way, a series of data to be transferred until the transfer flags of all the channels become "end" belong to the compressed partial data on one scanning line. Also considering that both (a) data sets are stored in the data receive buffer in the sequence of the burst-transfer, and (b) in each channel burst-transfer is performed in the compressed sequence (that is in the lineup sequence of the scanning lines), the compressed partial data belonging to one scanning line is continuously stored in the intermediate buffer in the status where the lineup sequence of the scanning lines is maintained (see FIG. 32).

Figure 33:
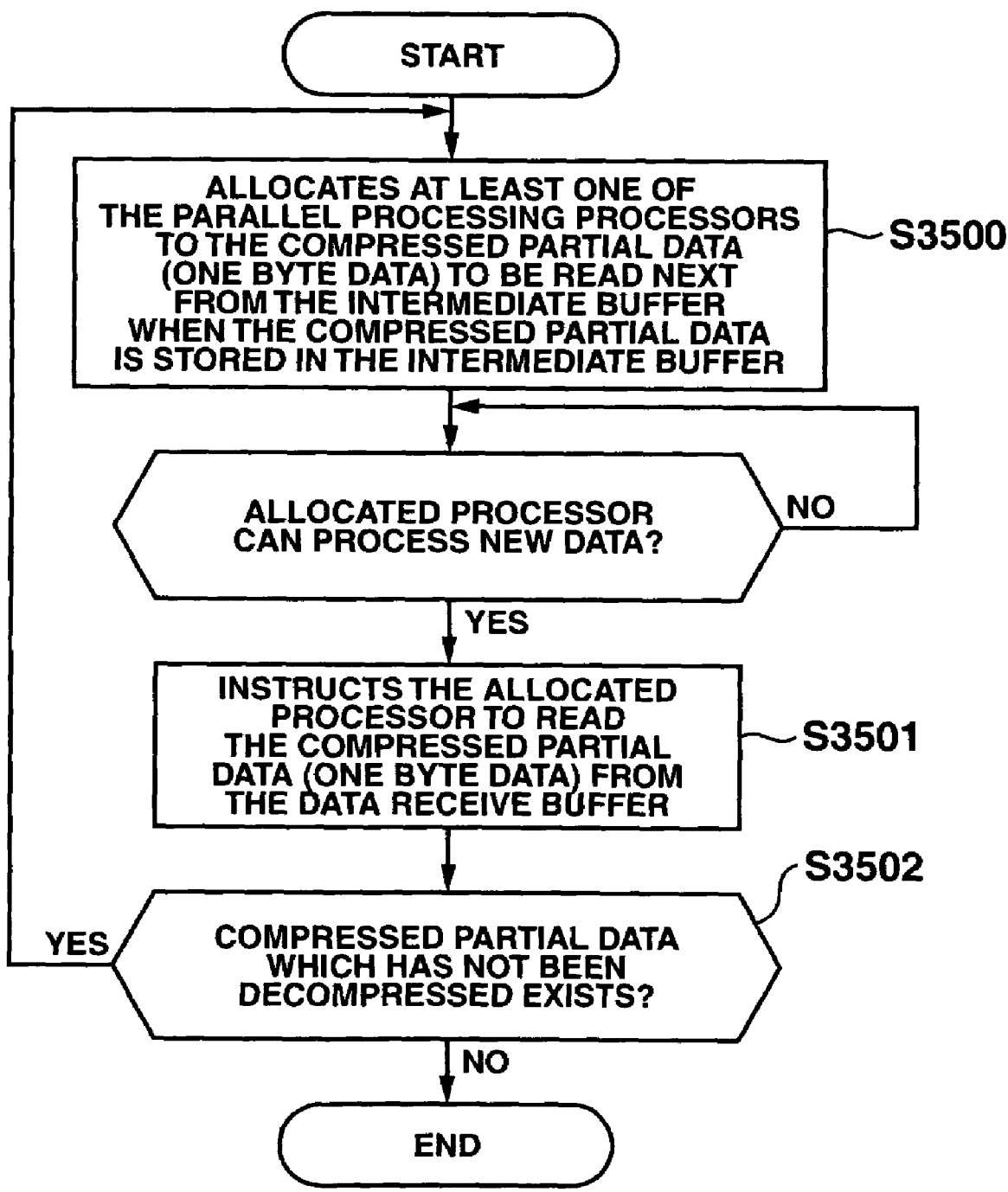
FIG. 33 is a flow chart depicting the processing content of the decompression control means 328.

When the compressed partial data is stored in the intermediate buffer, the decompression control means 328 allocates at least one of the processors 21-24 to the compressed partial data (1-byte data) to be read from the intermediate buffer next (FIG. 33: step S3500).

Specifically, a combination of a channel and a processor is fixed for the allocation, such as the processor 21 to the compressed partial data of channel 1, and the processor 22 to the compressed partial data of channel 2.

Here the size of the compressed partial data of each channel could be different from each other, so 1-byte data is not necessarily stored in the intermediate buffer in the lineup sequence of the channels. In other words, the lineup sequence of the channels is at least maintained but is not always continuous (for example, in the case of the example in FIG. 32, the $7^{th}$ byte data of the channel 4 is stored next to the $7^{th}$ byte data of the channel 2). Therefore the above mentioned fixed allocation cannot be implemented by simply allocating 1-byte data read from the intermediate buffer to the processors cyclically.

Therefore an allocation flag to indicate whether 1 byte data is allocated to this processor is provided for each processor, and each time processing for one scanning line is started, "allocation enable" is set as the initial value. And as mentioned later, if the 1-byte data allocated to the processor itself includes the information to indicate the end of the compressed partial data, its own allocation flag of this processor is changed to "allocation disable" so that 1-byte data is no longer allocated. With this configuration, the above mentioned fixed allocation can be implemented by the decompression control means 328 cyclically allocating the 1-byte data read from the intermediate buffer to the processors of which the allocation flag is "allocation enable".

Then the decompression control means 328 judges whether the allocated processor can process new data, and if possible, instructs the processor to read the compressed partial data from the data receive buffer (FIG. 33: step S3501). Whether the processor can process new data is judged in the same way as the compression control means 317.

Now the decompression control means 328 returns to step S3500 if there is compressed partial data which is not yet decompressed (FIG. 33: step S3502).

Figure 34:
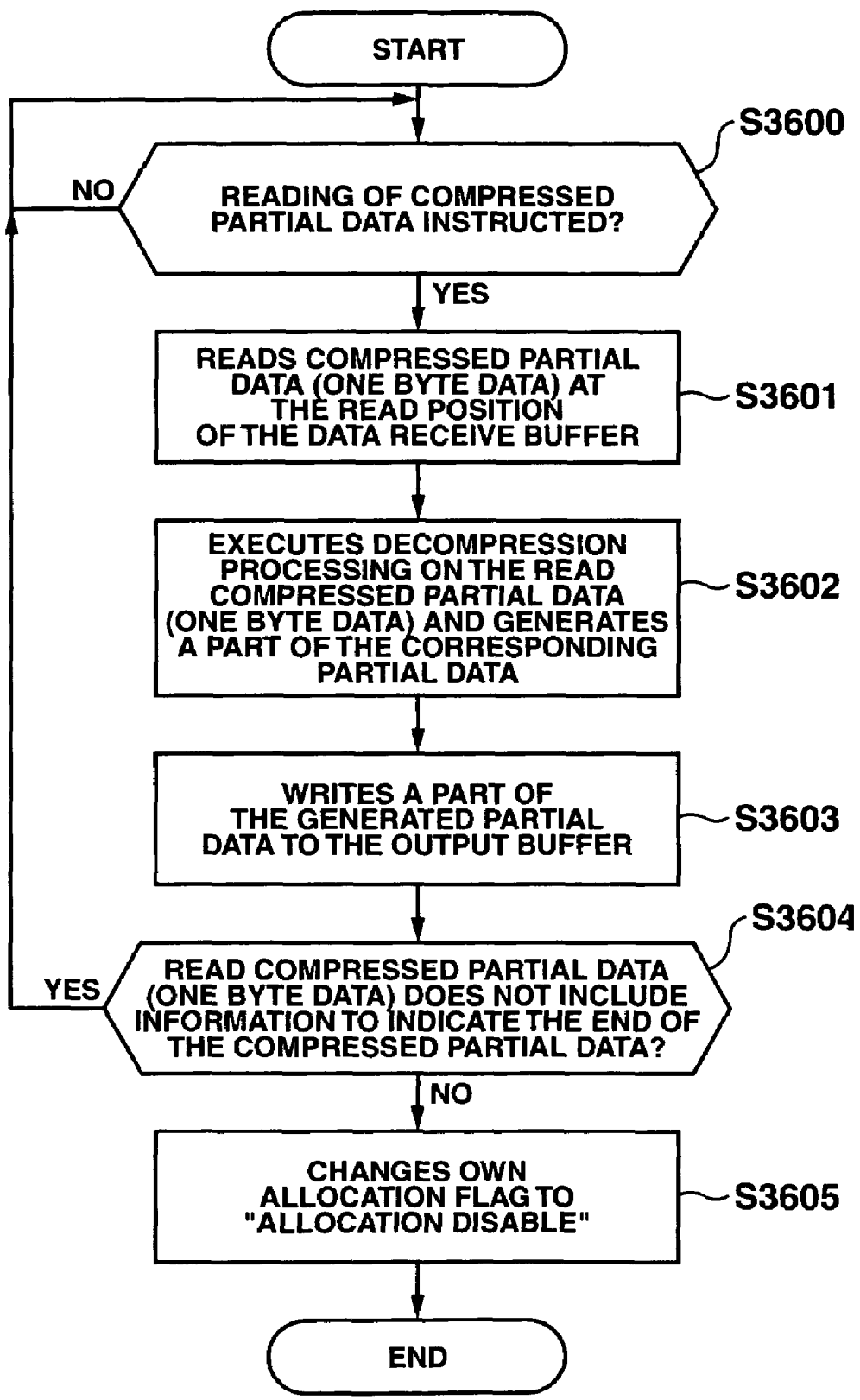
FIG. 34 is a flow chart depicting the processing content of the parallel processing unit 25.

When an instruction to read the compressed partial data is received from the decompression control means 328 (FIG. 34: step S3600: YES), each processor 21-24 of the parallel processing unit 25 reads the 1 byte data located at the read position of the intermediate buffer (FIG. 34: step S3601).

Then each processor 21-24 executes a predetermined decompression processing on the read 1 byte data, and generates a part of the corresponding partial data (FIG. 34: step S3602), and stores this data in the output buffer of the printer controller 26 (FIG. 34: step S3603). For the decompression processing, the decompression processing, corresponding to the compression algorithm used in the parallel processing unit 15 of the host device 10, must be used.

When the read 1-byte data does not include information to indicate the end of the compressed partial data (FIG. 34: step S3604: YES), each processor 21-24 returns to S3600 to execute decompression processing continuously.

If the information to indicate that the end is included (FIG. 34: step S3604: NO), each processor 21-24 changes its own allocation flag to "allocation disable", and stops processing so as to implement synchronization in scanning line units (FIG. 34: step S3605). In the third embodiment, the lineup sequence of the scanning lines is maintained in the intermediate buffer, so decompression processing can be performed in parallel even if each processor stops processing when the decompression processing of the compressed partial data on one scanning line ends (that is operation is synchronized in scanning line units) in this case.

Figure 35:
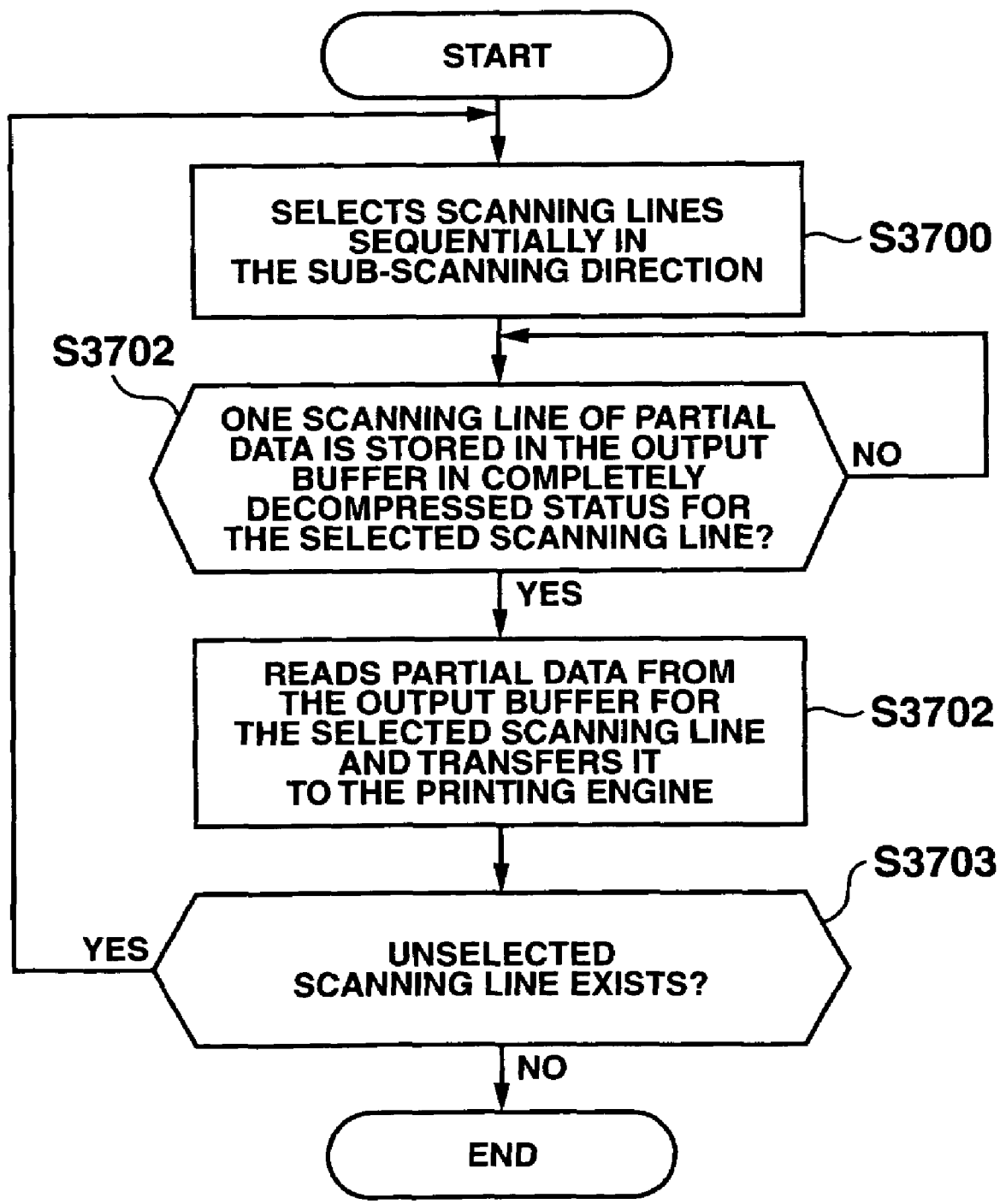
FIG. 35 is a flow chart depicting the processing content of the transfer means 329.

The transfer means 329 selects the scanning lines sequentially in the sub-scanning direction so as to transmit data in the sequence to be used for printing (FIG. 35: step S3700).

Then the transfer means 329 judges whether all the one scanning line of partial data is stored in the output buffer in decompressed status for the selected scanning line (FIG. 35: step S3701).

If judged as stored all in decompressed status, the transfer means 329 reads the partial data from the output buffer for the selected scanning line, and transfers it to the printing engine so as to transmit data in the sequence to be used for printing (FIG. 35: step S3702).

If there are unselected scanning lines for the generated printing image, the transfer means 329 returns to S3700 (FIG. 35: step S3703).

According to the configuration of the third embodiment, compression processing is executed in parallel for each channel constituting one scanning line (that is for each partial data), so the compression processing time for an individual scanning line can be decreased. In particular, a decrease in the compression processing time of the first one scanning line makes it possible to decrease the time from the start of compression processing of a printing image to the end of compression processing of the first scanning line, and to the timing when the processing result thereof is transferred to the printer 20 (printer controller 26), and compression processing (and printing processing) which starts up quickly can be implemented.

Also decompression processing is executed for each channel constituting one scanning line (that is each compressed partial data) in parallel, so the decompression processing time required for an individual scanning line can be decreased. In particular, a decrease in the decompression processing time of the first one scanning line makes it possible to decrease the time required from the start of the decompression processing of the compressed printing image to the end of the decompression processing of the first scanning line, and to the timing when the processing result thereof is transferred to the printing engine, and decompression processing (and printing processing) which starts up quickly can be implemented.

Also the printer controller 26 reads the compressed partial data from the data receive buffer which stores the burst-transferred compressed partial data, and stores it in the intermediate buffer in the sequence which allows parallel processing, that is in the sequence where the lineup sequence of the scanning lines is maintained, and supplies the compressed partial data from this intermediate buffer to each processor for executing the parallel decompression processing, so a framework to synchronize the operation in scanning line units and execute the parallel processing at high-speed, while implementing the compatibility of the configuration of receiving burst-transferred compressed data and the configuration of reading the compressed partial data from the FIFO type intermediate buffer and decompressing it in parallel, can be provided. As a result, even in the case of a laser printer, which must continuously supply printing data to the engine in scanning line units at a predetermined speed, real-time processing is possible.

(Other)

The present invention is not limited to the third embodiment, but can be modified in various ways and applied. For example, the present invention can be applied to a system other than a printer system only if it is a system for compressing/decompressing images.

Also in the third embodiment, the printer 20 comprises the parallel processing unit 25 and printer controller 26, but the present invention is not limited to this configuration. For example, the parallel processing unit 25 and printer controller 26 can be constructed as external devices that can be connected to the printer 20. Also the parallel processing unit 25 and printer controller 26 may be constructed as devices that can be connected to the host device 10 according to a PCI bus standard, for example. In the case of connecting the parallel processing unit 25 to the host device 10, each function of the printer controller 26 may be implemented by the main CPU of the host device 10.

Also in the third embodiment, a configuration where one scanning line is equally divided into partial areas according to the number of processors was described, but the scanning line, need not always be equally divided, but the size of the partial areas to be allocated may be different according to the specifications of the processor, for example. The number of partial areas to be divided (number of channels) need not always be the same as the number of processors.

Also in the third embodiment, a configuration where a combination of a channel and a processor is fixed for allocation was described, but a processor which finished processing may be allocated to the next channel, for example. And in this case, the corresponding relationship between a processor and a channel may be different depending on the scanning line. A channel may be allocated not only to the processors of the parallel processing units 15-25, but also to the main CPU, and parallel processing is executed in this configuration.

Also in the third embodiment, a configuration where the processors 11-14 read the partial data from the RAM was described, but if the host device 10 comprises means of transferring the partial data from the RAM to the processors 11-14 (e.g. DMA transfer means), for example, the compression control means may instruct the transfer to this means. In this case, the processors 11-14 execute processing after receiving the transfer from this means. And in the same way, if the printer 20 comprises means of transferring the compressed partial data from the data receive buffer to the processors 21-24 (e.g. DMA transfer means), the decompression control means can instruct the transfer to this means, and the processors 21-24 execute processing after receiving transfer from this means.

Also in the third embodiment, a configuration where parallel processing is performed for all the scanning lines of a printing image was described, but if the present invention is applied to at least one scanning line constituting the printing image, the compression processing time/decompression processing time can be decreased for this scanning line.

Also in the third embodiment, a configuration where the data sequence adjustment means 327 reads data from the data receive buffer in 1-byte units and transfers it to the intermediate buffer was described, but the compressed partial data of one channel may be continuously read from the data receive buffer (in the case of the example in FIG. 30, data of addresses 00-06 is read first, then data of addresses 16-24 is read next), for example, and transferred to the intermediate buffer.

Also in the third embodiment, a configuration where the transfer means 329 transfers data to the printing engine when one scanning line of data is collected was described, but the data may be transferred to the printing engine without waiting for the one scanning line of data to be collected, or when the plurality of scanning lines of data are collected, depending on the type of the printing engine.

Also in the third embodiment, a scanning line was used as the standard unit of compression processing, decompression processing and synchronization, but the present invention is not limited to this configuration. For example, a band, which includes a predetermined number of scanning lines, may be used as a standard for processing. In this case, as a rule, processing can be performed substituting "scanning line" with "band" in the description of the third embodiment, but in some steps, changes, which are obvious for experts, are required. For example, in step S3102, the compression control means 317 must specify the first address for each scanning line included in the band as the first position of the partial data of each channel of the selected band. If a band is used as a standard, the third embodiment can be interpreted as an embodiment that regards one scanning line=one band.

Fourth Embodiment

The hardware configuration of the printer system 1 according to the fourth embodiment of the present invention is, as a rule, the same as the first embodiment (see FIG. 1).

In other words, the host device 10 is comprised of a main CPU, parallel processing unit 15 further comprising parallel processors 11-14, ROM, RAM, user interface, communication interface and other hardware. According to the fourth embodiment, the parallel processing unit 15 has four processors 11-14, but the number of processors can be two or a higher arbitrary number (e.g. 8) according to the design, just like the first embodiment.

The host device 10 is comprised of a printer driver means 16 as a standard control function for the printer 20 to execute printing.

The printer driver means 16 has a similar functional configuration as a standard printer driver, and comprises RIP means for generating a raster image based on the printing target data written in a predetermined printer control language, such as PostScript®, according to the printing request from the application program running on the host device 10, image processing means for creating a printing image by performing a predetermined image processing (e.g. screen processing) on the raster image, and other means.

The printer driver means 16 of the fourth embodiment, however, comprises compression control means 417 for executing image compression processing for an individual scanning line (or individual band) in parallel using the parallel processing unit 15, and a transfer means 418 for burst-transferring the data compressed by the parallel processing unit 15 to the printer 20, as described later, which is different from a conventional configuration (see FIG. 39A).

The functions of each of these means are implemented by the main CPU executing programs stored in ROM or RAM in the host device 10 or external storage medium.

The printer 20 comprises a power mechanism unit and printer controller 26.

The power mechanism unit further comprises a paper feed mechanism for supplying paper to the printer, printing engine for performing printing, and paper eject mechanism for ejecting paper from the printer. For the printing engine, various printing engines corresponding to a serial printer which prints data in one character units, such as an inkjet printer and thermal transfer printer, a line printer which prints data in one line units, and a page printer which prints data in one page units, can be used.

The printer controller 26 is comprised of a main CPU, parallel processing unit 25 further comprising processors 21-24, ROM, RAM, user interface and communication interface. In the fourth embodiment, just like the first embodiment, the parallel processing unit 25 has four processors 21-24, but the number of processors can be two or a higher arbitrary number (e.g. 8) according to the design. The power mechanism unit may have an independent CPU, and in this case, the CPU of the power mechanism unit communicates with the main CPU of the information processing unit via a predetermined communication path to control the printing engine, and performs printing operation.

The printer controller 26 has a similar functional configuration as a printer controller of a standard printer, and comprises, for example, engine control means for controlling the power mechanism unit to execute printing, and receive means 427 for receiving commands and data from the host device 10 and storing them in the receive buffer.

The receive means 427 of the fourth embodiment, however, receives burst-transferred data, distributes the received data to the compressed data for each partial area, and stores it to each of a plurality of FIFO type receive buffers (input buffers) disposed corresponding to each partial area respectively.

The difference of the printer controller 26 of the fourth embodiment from a conventional configuration, however, is that it comprises decompression control means 428 for executing decompression processing on an individual scanning line (or individual band) in parallel using the parallel processing unit 25, based on the compressed data stored in each receive buffer, and transfer means 429 for transferring the decompression processing result by the parallel processing unit 25 to the printing engine in the sequence to be used for printing (see FIG. 39B).

Each of these means is implemented by the main CPU executing the programs stored in ROM or RAM in the printer 20 or external storage medium.

Now the printing processing in the printer system 1 will be described with reference to the flow charts and diagrams shown in FIG. 40-FIG. 49. Each step (including partial steps not denoted with reference numerals) can be executed in any sequence or in parallel within the scope where inconsistencies do not occur in the processing content.

(Processing in Host Device 10)

The printer driver means 16 accepts a printing request from an application program running externally or on the host deice 10, and sends the printing instruction command to the printer 20 (printer controller 26), and instructs the RIP means to start processing.

The RIP means receives the instruction to start processing, and generates a raster image based on the printing target data written in a predetermined printer control language, such as PostScript®, received from the application program. If the printing target data can be received in raster image format from an application program, the processing by the RIP means can be omitted.

The image processing means performs a predetermined image processing (e.g. screen processing) on the generated raster image, and stores the generated printing image in a predetermined area of the RAM.

Figure 40:
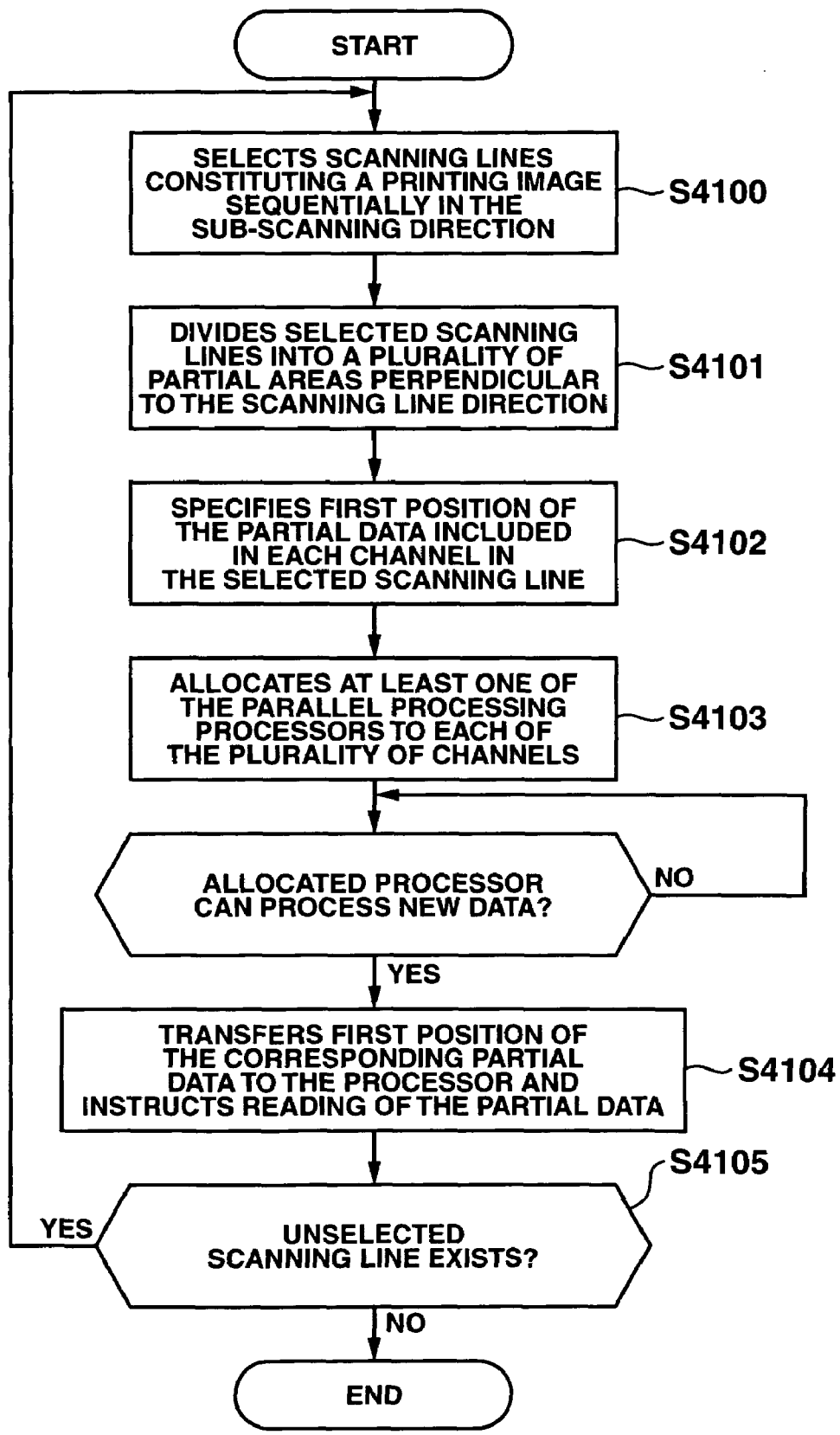
FIG. 40 is a flow chart depicting the processing content of the compression control means 417.
Figure 41:
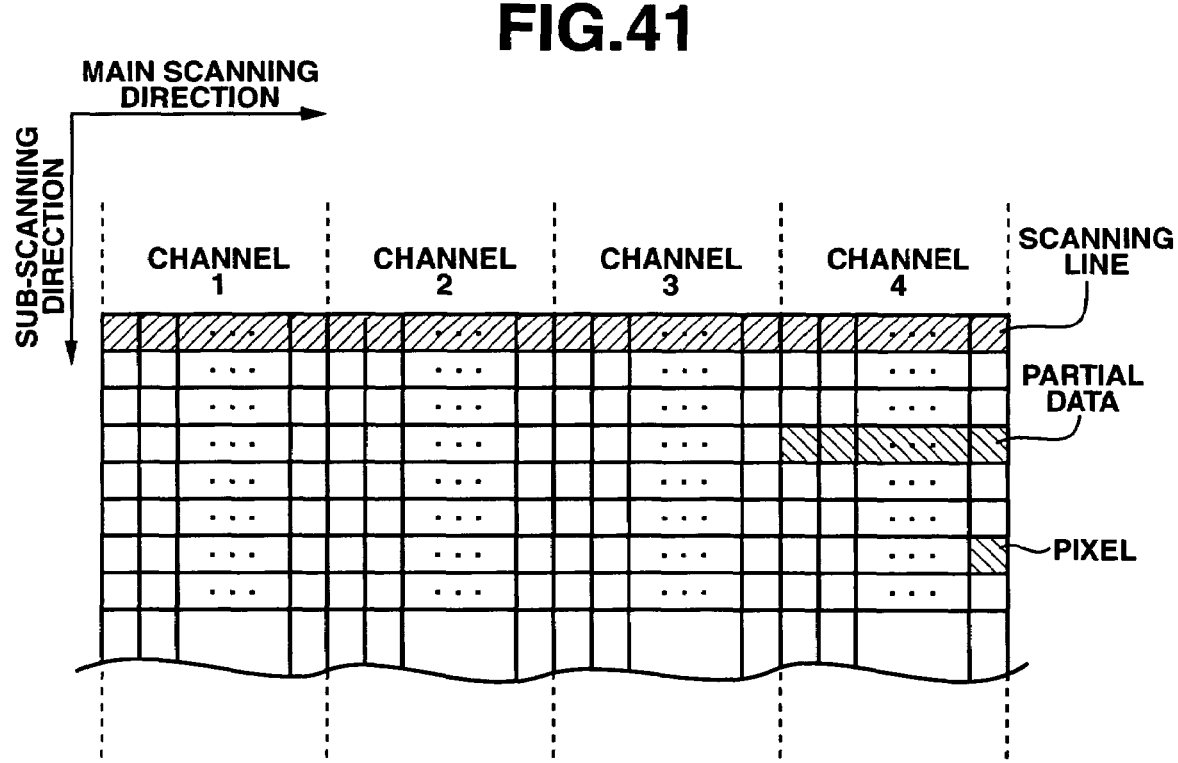
FIG. 41 is a diagram depicting channels.

The compression control means 417 selects the scanning lines in the main scanning direction constituting the generated printing image (hereafter called "scanning line") sequentially in the sub-scanning direction (FIG. 40: step S4100). The main scanning direction and sub-scanning direction are determined based on the scanning in the printer 20.

Then the compression control means 417 divides the selected scanning lines into a plurality of partial areas in a direction perpendicular to the scanning line direction (FIG. 40: step S4101). Hereafter this partial areas is called "channel", and each channel is identified by assigning a channel number in the lineup sequence in a scanning line direction, that is sequentially from the left (see FIG. 41). In the fourth embodiment, the concept of left and right is used assuming that the scanning lines are horizontally scanned from left to right.

Then the compression control means 417 specifies the first position of the printing image included in each channel (hereafter called "partial data") in the selected scanning lines (FIG. 40: step S4102). For example, if one scanning line has 2048 pixels, one scanning line is equally divided into four partial areas according to the number of processors, and the $1^{st}$ pixel, $512^{nd}$ pixel, $1024^{th}$ pixel and $1536^{th}$ pixel are specified as the first positions of the respective partial data.

If channels are defined commonly for all the scanning lines and the first positions of the partial data of each channel are specified in advance, steps S4101-4102 can be omitted.

Now the compression control means 417 allocates at least one of the processors 11-14 to each of the plurality of channels (FIG. 40: step S4103). Specifically the combination of a channel and a processor is fixed for allocation, such as processor 11 to channel 1 and processor 12 to channel 2.

Then the compression control means 417 judges whether the allocated processor can process the new data, and if it can process, the first position of the corresponding partial data is transferred to the allocated processor, and reading of this partial data is instructed (FIG. 40: step S4104).

Here the case when the processor can process new data is the case when this processor can newly write the next processing result. If a partial area of the output buffer is allocated respectively to the processors 11-14 (channels 1-4), as shown in FIG. 36, as an area to write the processing result, for example, whether new data can be processed can be judged depending on whether there is an opening in the allocated area of this output buffer, or whether a processing result already written in the allocation area has been transferred to the transfer means 418, and overwriting of this area is possible.

It is preferable that the output buffer is comprised of an SDRAM which can perform burst-transfer at high-speed. This is because the processing result (compressed data) written in the output buffer is burst-transferred by the transfer means 418.

Now the compression control means 417 returns to step S4100 if unselected scanning lines exist among the scanning lines constituting the generated printing image (FIG. 40: step S4105).

Figure 42:
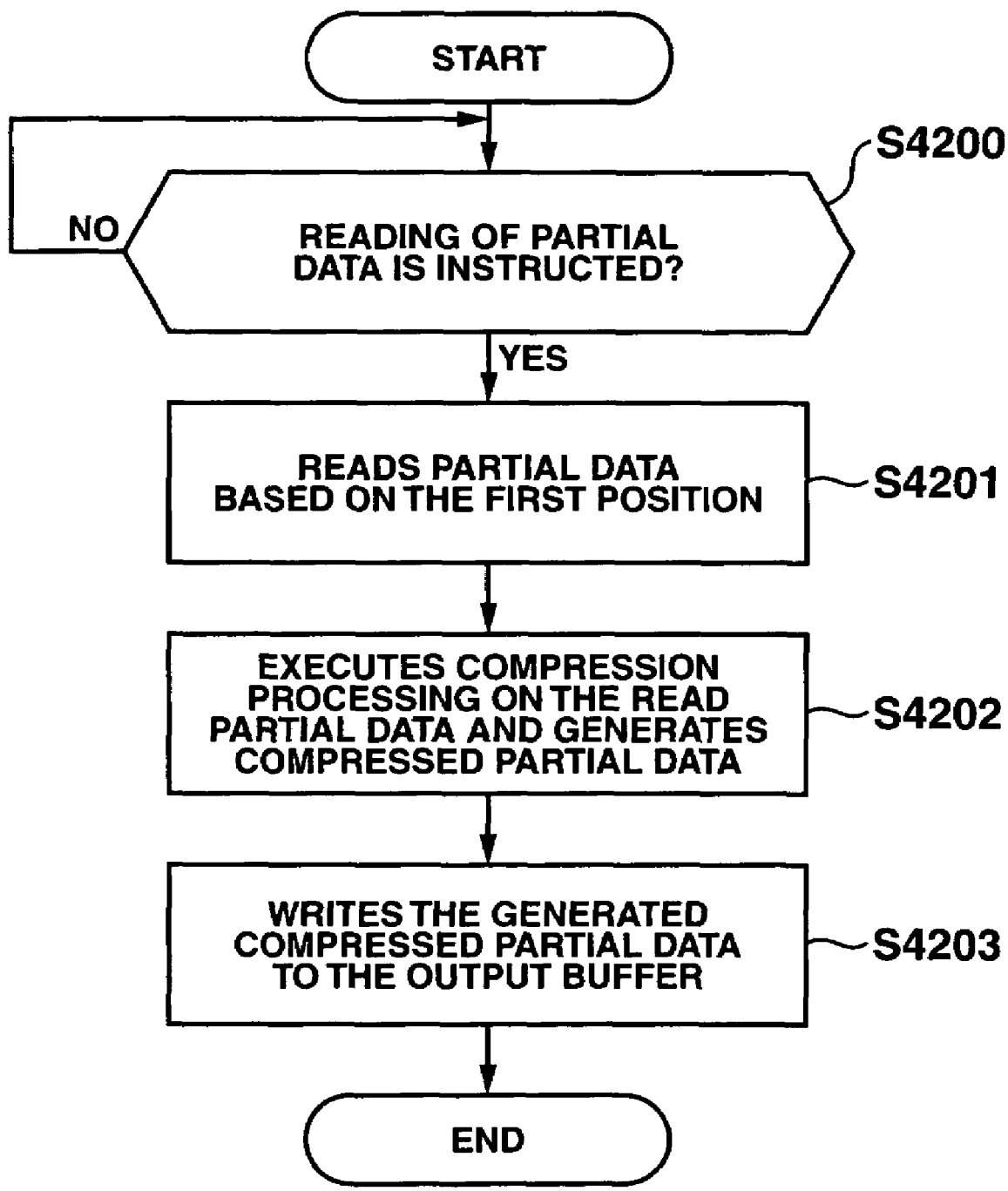
FIG. 42 is a flow chart depicting the processing content of the parallel processing unit 15.

When the configuration on the first position of the partial data and read instruction are received from the compression control means 417 (FIG. 42: step S4200: YES), each processor 11-14 of the parallel processing unit 15 reads the partial data based on the information on the first position from the predetermined area of the RAM where the generated printing image is stored (FIG. 42: step S4201).

Then the compressed partial data is generated by executing a predetermined compression processing on the read partial data (FIG. 42: step S4202). At this time, a predetermined boundary information is added to the end (or beginning) of the compressed partial data so that the boundary of the compressed partial data can be detected. For the predetermined compression processing, various conventional compression algorithms can be used according to the design, and in the case when the printing image is binary data, for example, it is possible to use a JBIG (Joint Bi-level Image experts Group) algorithm.

And the generated compressed partial data is written to an allocated partial area of the output buffer (FIG. 42: step S4203). When a partial area of the output buffer is allocated to each processor, as shown in FIG. 36, it is possible to dispose a counter for storing a current address for each processor, so that each processor can refer to the address to be written next (current address), and increment the counter according to the capacity (number of bytes) that was written.

Figure 43:
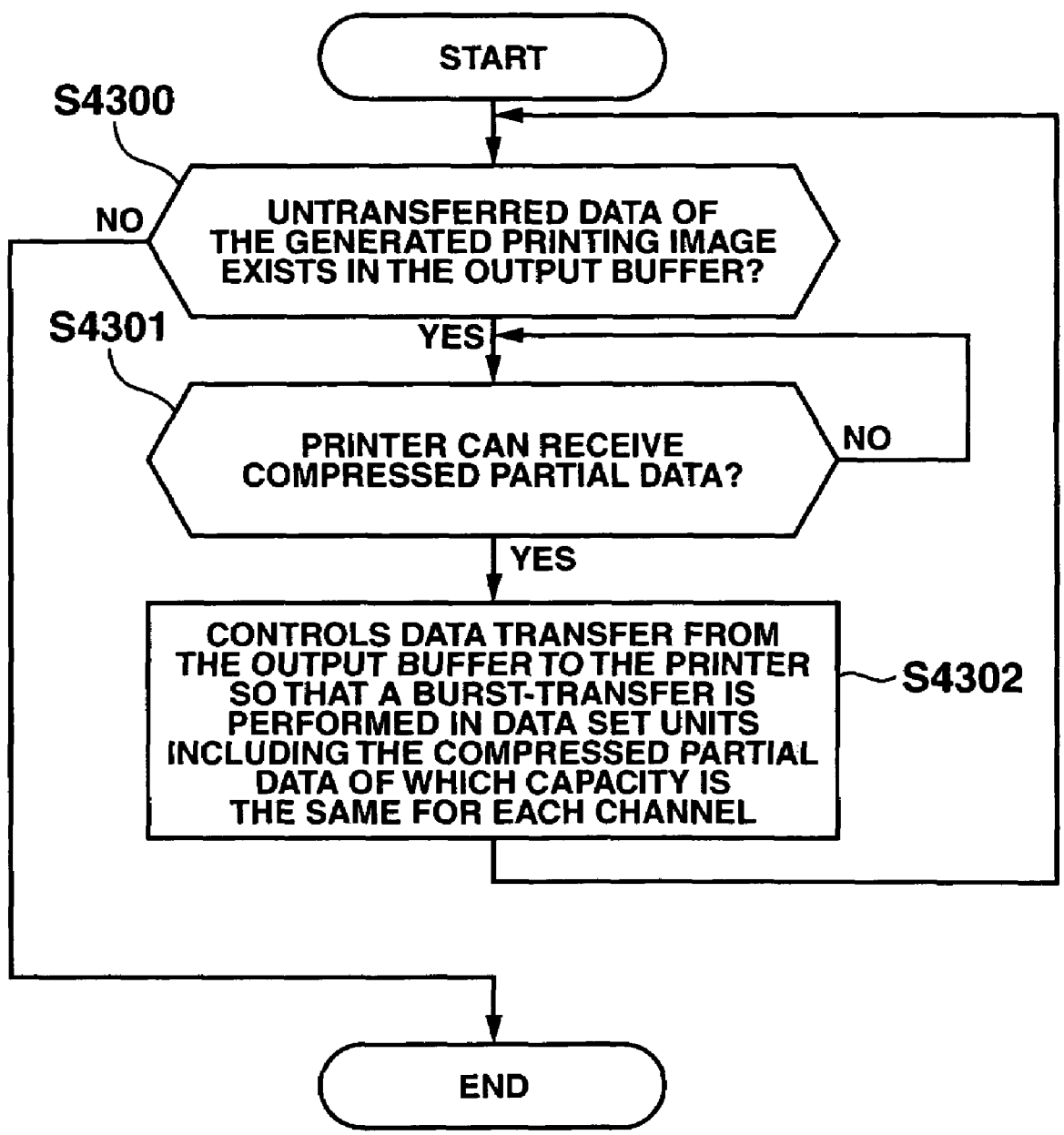
FIG. 43 is a flow chart depicting the processing content of the transfer means 418.

The transfer means 418 judges whether untransferred data exists in the output buffer for the generated printing image (FIG. 43: step S4300). And if untransferred data does not exist (transfer has been completed), the processing ends.

If untransferred data exists, the transfer means 418 judges whether the printer 20 (printer controller 26) can receive the compressed partial data based on the result of communication with the printer 20 (printer controller 26) (FIG. 43: step S4301).

And if receiving is possible, the transfer means controls that data is transferred from the output buffer to the printer 20 (printer controller 26) so that burst-transfer is performed in data set units, which includes the same capacity of the compressed partial data for each channel (FIG. 43: step S4302).

The size of the data set to be burst-transferred can be determined according to the design, but in the fourth embodiment, burst-transfer is performed in a total of 32-byte (4 channels×8 bytes) data set units, which includes 8-bytes of compressed partial data for each channel, as shown in FIG. 44. To perform burst transfer in this way, compressed partial data on a plurality of scanning lines may be included in the data set to be burst-transferred. With reference to FIG. 44, compressed partial data on the first scanning line and second scanning line is included in the first burst-transfer.

(Processing in Printer 20)

When the printing instruction command is sent from the host device 10, the printer controller 26 receives this through the receive means 427 and prepares for printing by controlling the power mechanism unit using the engine control means.

Figure 45:
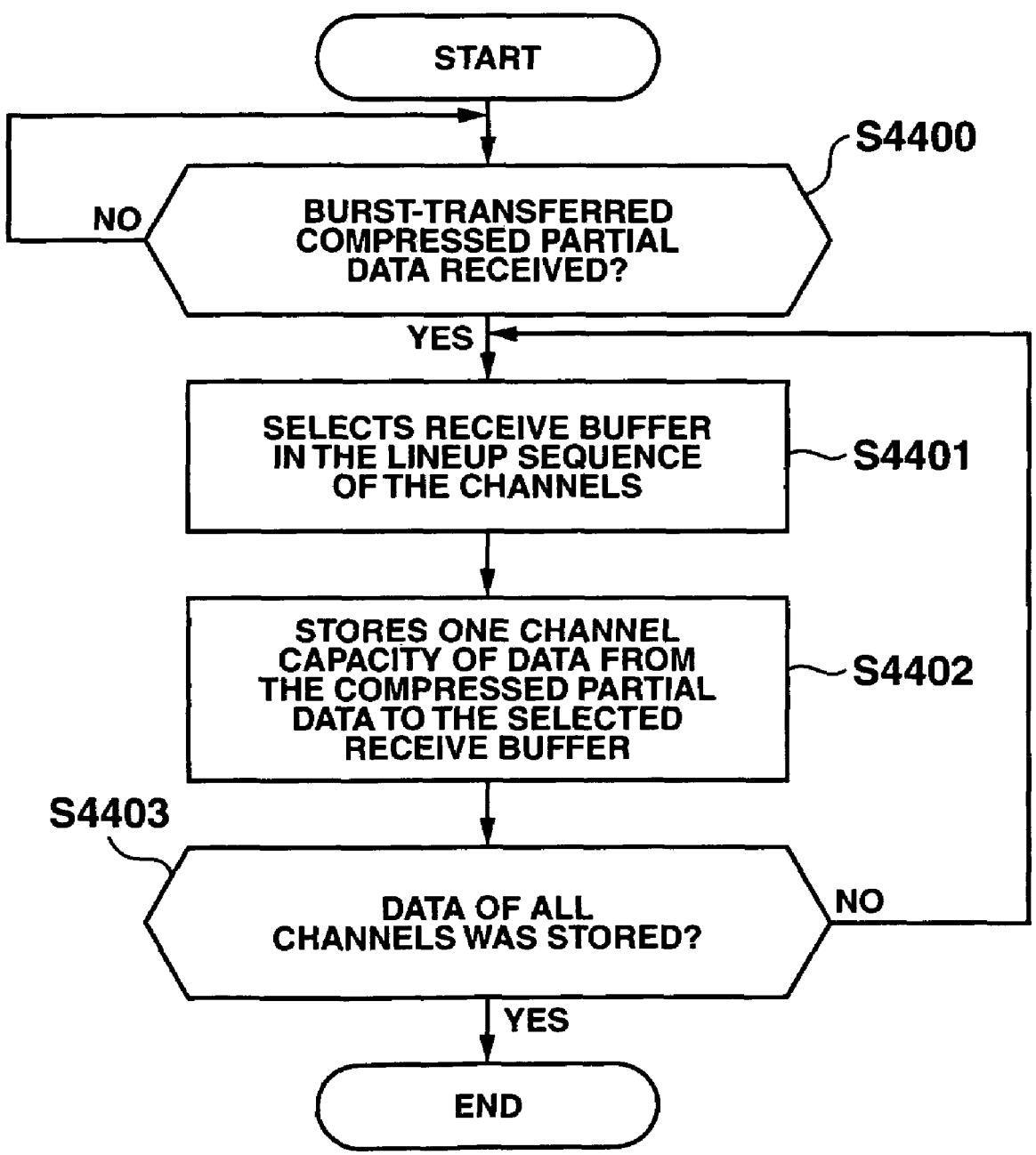
FIG. 45 is a flow chart depicting the processing content of the receive means 426.

When the receive means 427 receives the burst-transferred data set after receiving the printing instruction command (FIG. 45: step S4400: YES), the receive means 427 executes storage processing to the receive buffer.

Figure 46A:
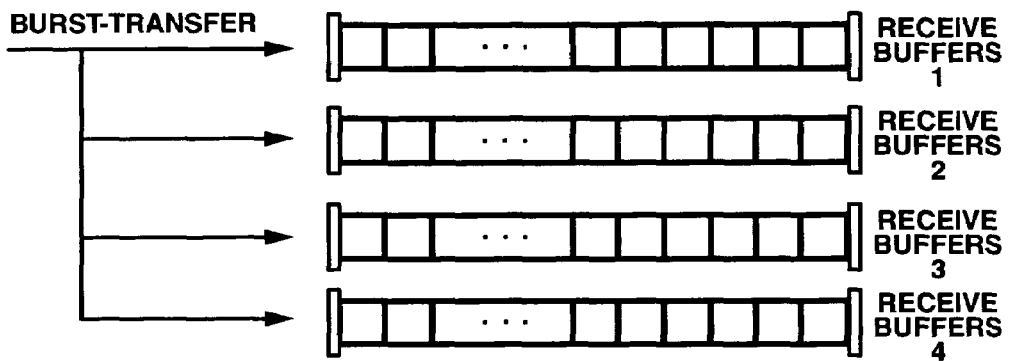
FIG. 46 is a diagram depicting each receive buffer.

Here the receive buffer becomes a buffer for distributing the data that is burst-transferred in data set units including the compressed partial data of each channel from the host device 10, to the compressed partial data for each channel, and storing them, therefore it is possible to construct an FIFO type buffer, as shown in FIG. 46, on the RAM for each channel (or it is also possible to dispose a plurality of FIFO type memories for each channel). In the case of the example shown in FIG. 46A, four receive buffers according to the number of channels are constructed so that burst-transferred data can be distributed and stored for each channel.

The receive means 427 distributes the burst-transferred data to the compressed partial data for each channel according to the setting of the data set to be burst-transferred (N channels×M bytes). Specifically the receive means 427 selects the receive buffer in the lineup sequence of the channels (FIG. 45: step S4401). And from the received data, one channel capacity of data (compressed partial data for one channel) is extracted and stored in the selected receive buffer (FIG. 45: step S4402). For example, in the fourth embodiment, a total of a 32-byte data set, including 8-bytes of compressed partial data for each channel, is the unit of a burst-transfer from the host device 10, so the receive means 427 selects a receive buffer 1 corresponding to channel 1, extracts the 8-bytes of data from the received data, and stores it in the receive buffer 1.

The receive means 427 judges whether the data of all the channels is stored in the receive buffer (FIG. 45: step S4403), and if judged that the storage processing is not completed (FIG. 45: step S4403: NO), processing returns to S4401 to process the data of the remaining channels. If judged that the storage processing is completed for the data of all the channels (FIG. 45: step S4403: YES), processing ends and the start of decompression processing is instructed to the decompression control means 428. By this, the storage processing of the data, received by the first burst-transfer, to each receive buffer ends.

Figure 46B:
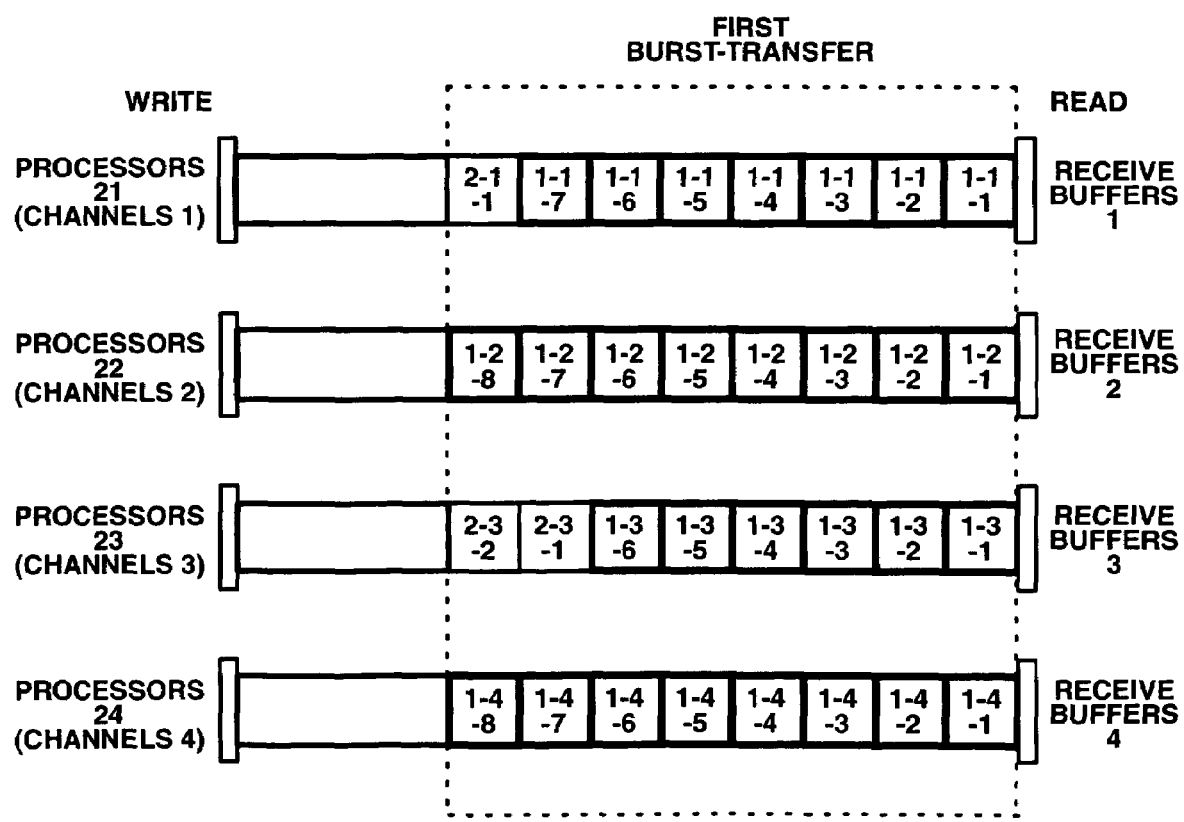

When a plurality of receive buffers are constructed according to the number of channels in this way, the compressed partial data of channel 1 is continuously stored in the receive buffer 1, the compressed partial data of the channel 2 is continuously stored in the receive buffer 2, and the compressed partial data of the channel N is continuously stored in the receive buffer N. In other words, the compressed partial data of each channel is stored in the receive buffer corresponding to each channel, as shown in FIG. 46B, so each processor of the parallel processing unit 25 can always specify the same location (receive buffer) to read the compressed partial data of the channel allocated to each processor.

When the instruction to start decompression is received, the decompression control means 428 sets "not end" in the decompression flag provided for each channel as an initial value (FIG. 47: step S4500). This decompression flag changes to "end" when the decompression of the compressed partial data on one scanning line is ended in each channel, as described later.

The decompression control means 428 instructs each processor 21-24 of the parallel processing unit 25 to read the compressed partial data from the receive buffer corresponding to the allocated channel respectively (FIG. 47: step S4501). And judges whether the decompression flags of all the channels are "end" (FIG. 47: step S4502), and if all the decompression flags are "end", it is regarded that the decompression of the compressed partial data on one scanning line ended, and the decompression control means 428 judges whether the compressed partial data is still stored in the receive buffer (FIG. 47: step S4503). If the compressed partial data is stored in the receive buffer, processing returns to S4500 to perform decompression processing of the compressed partial data on the next scanning line.

If the decompression control means 428 judges that any one of the decompression flags is "not end" in S4502, it is regarded that the decompression of the compressed partial data on one scanning line has not ended, and the decompression flags are checked agein(FIG. 47: step S4502).

Now the decompression processing of each processor of the parallel processing unit 25 will be described. In the fourth embodiment, channels to be processed and the receive buffer from which the compressed partial data is read have been allocated to each processor 21-24 respectively in advance, but the decompression control means 428 may allocate channels to be processed to each processor 21-24 when processing is started.

Figure 48:
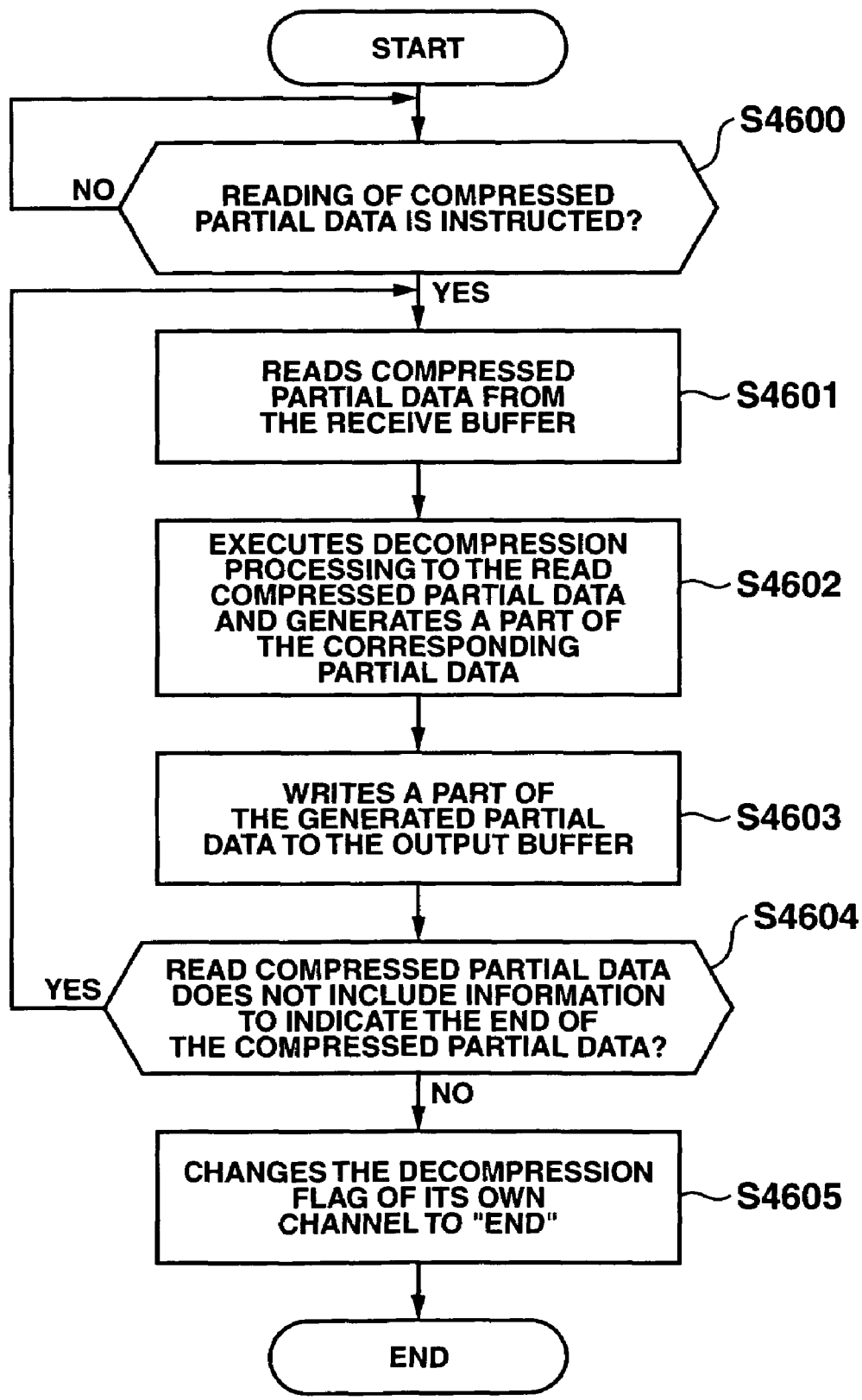
FIG. 48 is a flow chart depicting the processing content of the parallel processing unit 25.

When an instruction to read the compressed partial data is received from the decompression control means 428 (FIG. 48: S4600), each processor 21-24 reads 1-byte of the compressed partial data at a time from the respective receive buffer to which the processor is allocated (FIG. 48: step S4601).

Then each processor 21-24 executes a predetermined decompression processing to the read 1-byte data, and generates a part of the corresponding partial data (FIG. 48: step S4602), and stores this data in the output buffer of the printer controller 26 (FIG. 48: step S4603). For the decompression processing, the decompression processing corresponding to the compression algorithm used in the parallel processing unit 15 of the host device 10 must be used.

Then each processor 21-24 judges whether the read 1-byte data includes information to indicate the end of the compressed partial data (FIG. 48: step S4604). And if the read 1-byte data does not include the information to indicate the end of the compressed partial data (FIG. 48: S4604: YES), each processor 21-24 returns to S4601 to execute decompression processing continuously.

If the information to indicate the end is included (FIG. 48: step S4604: NO), each processor 21-24 changes its own decompression flag to "end" (FIG. 48: step S4605), and stops processing to implement synchronization in scanning line units.

In the fourth embodiment, a receive buffer is installed for each channel, that is for each processor, as described above, so decompression processing can be performed in parallel even if each processor stops processing when the decompression processing of the compressed partial data on one scanning line ends (that is operation is synchronized in scanning line units).

The transfer means 429 selects the scanning lines sequentially in the sub-scanning direction so as to transmit data in the sequence to be used for printing (FIG. 49: step S4700).

Then the transfer means 429 judges whether all the one scanning line of partial data is stored in the output buffer in the decompressed status for the selected scanning line (FIG. 49: step S4701).

And if judged as all stored in decompressed status, the transfer means 429 reads the partial data from the output buffer for the selected scanning line and transfers it to the printing engine so as to transmit data in the sequence to be used for printing (FIG. 49: step S4702).

If there are unselected scanning lines for the generated printing image, the transfer means 429 returns to S4700 (FIG. 49: step S4703).

According to the configuration of the fourth embodiment, compression processing is executed in parallel for each channel constituting one scanning line (that is for each partial data) so the compression processing time for an individual scanning line can be decreased. In particular, a decrease in the compression processing time of the first one scanning line makes it possible to decrease the time from the start of the compression processing of the printing image to the end of the compression processing of the first scanning line, and to the timing when the processing result thereof is transferred to the printer 20 (printer controller 26), and compression processing (and printing processing) which starts up quickly can be implemented.

Also decompression processing is executed for each channel constituting one scanning line (that is each compressed partial data) in parallel, so the decompression processing time required for an individual scanning line can be decreased. In particular, a decrease in the decompression processing time of the first one scanning line makes it possible to decrease the time required from the start of the decompression processing of the compressed printing image to the end of the decompression processing of the first scanning line, and to the timing when the processing result thereof is transferred to the printing engine, and decompression processing (and printing processing) which starts up quickly can be implemented.

Also in the printer controller 26, the receive buffer for storing the burst-transferred compressed partial data is constructed as a plurality of FIFO type receive buffers which correspond to each channel respectively, so a framework to execute parallel processing at high-speed while implementing the compatibility of the configuration of receiving the burst-transferred compressed partial data, and the configuration of reading the compressed partial data from an FIFO type receive buffer and decompressing it in parallel synchronizing in scanning line (or band) units, can be provided. As a result, even in the case of a laser printer which must continuously supply printing data to the engine in scanning line units at a predetermined speed, real-time processing is possible.

Fifth Embodiment

In the fourth embodiment, a configuration where processing stops, when each processor finished decompression processing of the compressed partial data on one scanning line (that is a configuration where each processor operates synchronizing in scanning line units), was described, but in the fifth embodiment, each processor executes decompression processing without synchronizing in scanning line units, so that processing of each processor becomes faster.

However if each processor performs decompression without synchronization, decompressed partial data of different scanning lines is included in the output buffer depending on the channel.

So in the fifth embodiment, the intermediate output buffer for storing the decompressed partial data of each processor respectively is disposed for each channel, and the decompressed partial data stored in this intermediate output buffer is controlled to be stored in the output buffer in scanning line units. Now the decompression processing according to the fifth embodiment will be described in detail with reference to FIG. 50-FIG. 52. The processing in the host device 10 (configuration of the printer driver means 16 shown in FIG. 50A) is the same as the processing/configuration of the fourth embodiment, so description thereof will be omitted here.

The printer controller 26 according to the fifth embodiment has data sequence adjustment means 430 for reading one scanning line of decompressed partial data from the intermediate output buffer for storing the decompressed partial data decompressed by each processor for each channel, and transferring it to the output buffer, in addition to each function described in the fourth embodiment (FIG. 50B).

Now the processing of the printer 20 according to the fifth embodiment will be described. Just like the fourth embodiment, the receive means 427 distributes the burst-transferred compressed partial data to the compressed partial data for each channel, and stores it to the respective receive buffer (see flow chart in FIG. 45). When the receive means 427 judges that storage processing is completed for the data of all the channels, the receive means 427 ends processing and instructs each processor 21-24 of the parallel processing unit 25 to read the compressed partial data from the buffer allocated to the respective processor.

Figure 51:
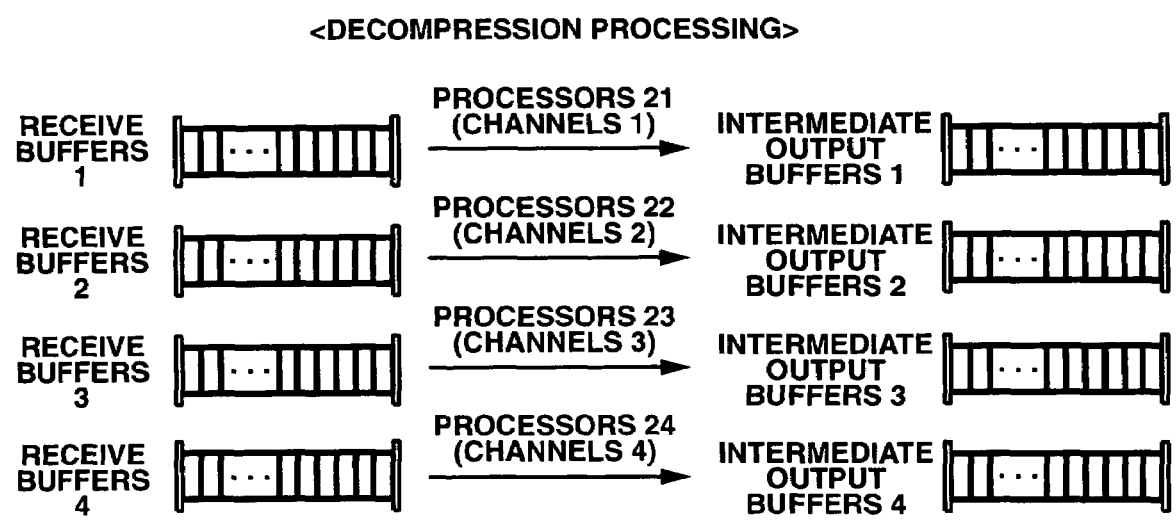
FIG. 51 is a diagram depicting the intermediate output buffer.

When an instruction to read the compressed partial data is received from the receive means 427, each processor 21-24 reads 1-byte of the compressed partial data at a time from the respective receive buffer. And each processor 21-24 executes a predetermined decompression processing to the read 1-byte data, and generates a part of the corresponding partial data, and stores this data to the intermediate output buffers 1-4 corresponding to each processor respectively. FIG. 51 is a diagram depicting the intermediate output buffer disposed for each channel.

At this time each processor 21-24 judges whether the read 1 byte data includes information to indicate the end of the compressed partial data. And if the read 1-byte data includes information to indicate the end of the compressed partial data, a predetermined boundary information is added to the end (or beginning) of the decompressed partial data so that the boundary of the decompressed partial data can be detected.

Figure 52:
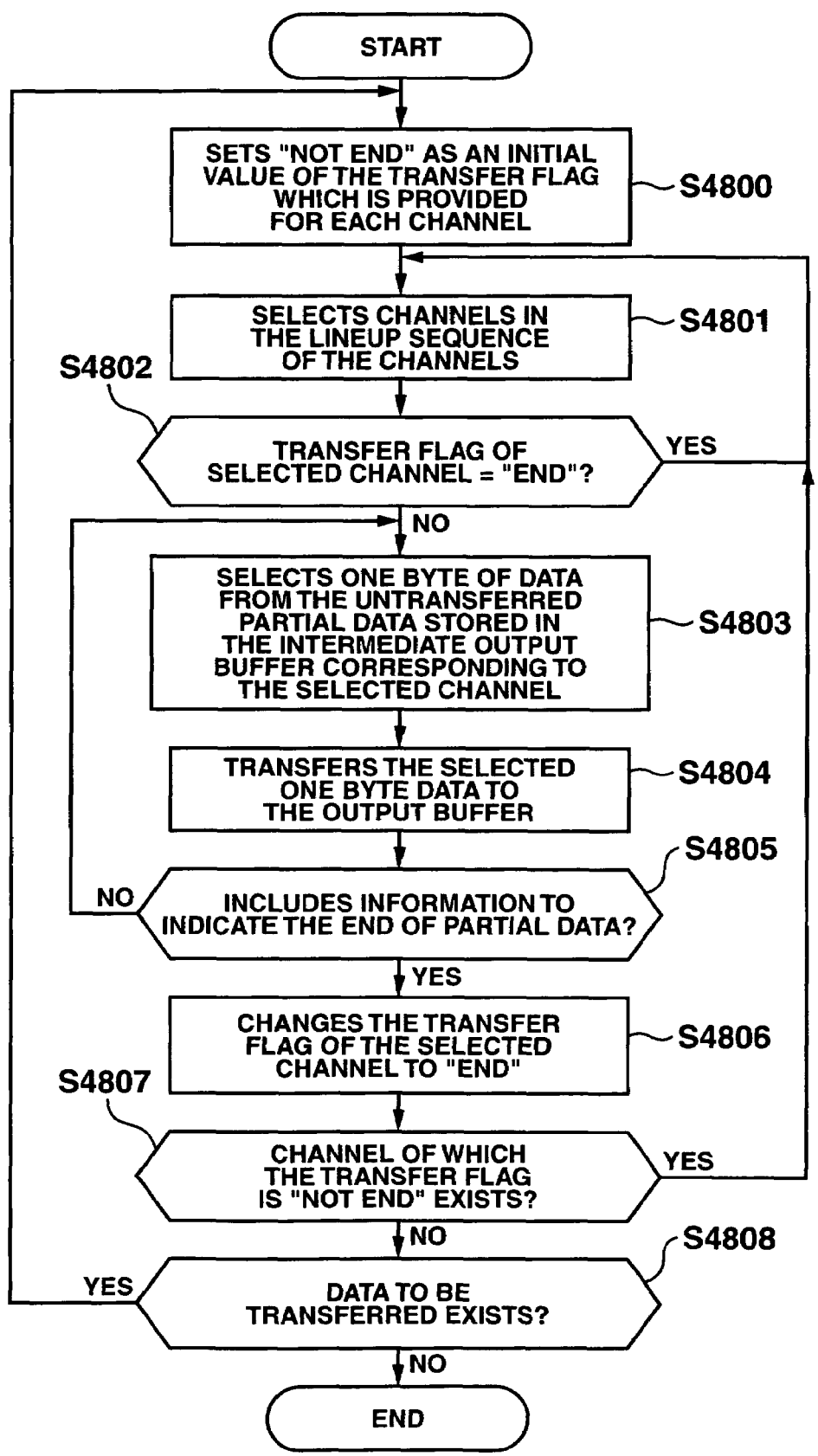
FIG. 52 is a flow chart depicting the processing content of the data sequence adjustment means 430.

Then the data sequence adjustment means 430 sets "not end" in the transfer flag provided for each channel as an initial value (FIG. 52: step S4800). This transfer flag changes to "end" when the transfer of the decompressed partial data on one scanning line (transfer from the intermediate output buffer to the output buffer) is ended in each channel, as described later.

Then the data sequence adjustment means 430 selects channels in the lineup sequence of the channels (FIG. 52: step S4801). And the data sequence adjustment means 430 checks the transfer flag of the selected channel, and returns to S4801 if the transfer flag is "end" (FIG. 52: step S4802).

If the transfer flag is "not end", on the other hand, the data sequence adjustment means 430 specifies an intermediate output buffer corresponding to the selected channel out of the intermediate output buffers 1-4, and 1-byte data is selected from the decompressed partial data stored in this specified intermediate output buffer, which has not been transferred (FIG. 52: step S4803).

Then the data sequence adjustment means 430 transfer the selected 1 byte data to the output buffer (FIG. 52: step S4804), and judges whether the selected 1 byte data includes information to indicate the end of the decompressed partial data (FIG. 52: step S4805).

If the selected 1 byte data does not include information to indicate the end of the decompressed partial data, the data sequence adjustment means 430 returns to step S4803, and executes the transfer processing for the next 1-byte data. If the selected 1-byte data includes information to indicate the end of the decompressed partial data, on the other hand, the data sequence adjustment means 430 changes the transfer flag of the selected channel to "end" (FIG. 52: step S4806).

Then if there is a channel of which the transfer flag is "not end" (FIG. 52: step S4807: YES), that is if the transfer of decompressed partial data of all the channels has not ended for one scanning line, the data sequence adjustment means 430 returns to S4801 to select the next channel.

If the transfer flags of all the channels are "end", on the other hand (FIG. 52: step S4807: NO), the data sequence adjustment means 430 judges whether the data to be transferred (untransferred scanning line decompressed data) remains in the intermediate output buffers 1-4 (FIG. 52: step S4808). If it remains, the data sequence adjustment means 430 returns to S4800 to perform transfer processing for the next scanning line.

Then the transfer means 429 selects the scanning lines sequentially in the sub-scanning direction so as to transmit data in the sequence to be used for printing, just like the fourth embodiment, and judges whether all the one scanning line of data is stored in the output buffer in the decompressed status for the selected scanning line. And if judged as all stored in the decompressed status, the transfer means 429 reads the partial data from the output buffer for the selected scanning line and transfers it to the printing engine so as to transmit data in the sequence to be used for printing (see the flow chart in FIG. 49).

If the processing is constructed in this way, each processor can perform decompression processing on the data of each channel individually, and a series of data to be transferred until the transfer flags of all the channels become "end" belong to the partial data on one scanning line, so the partial data on one scanning line is continuously stored in the output buffer in the status where the lineup sequence of the scanning lines is maintained. As a result, the partial data can be transferred to the printing engine synchronizing in scanning line units, and the decompression processing of each processor can be executed at high-speed.

(Other)

The present invention is not limited to the fourth and fifth embodiments, but can be modified in various ways and applied. For example, the present invention can be applied to a system other than a printer system only if it is a system for compressing/decompressing images.

Also in the fourth and fifth embodiments, the printer 20 comprises the parallel processing unit 25 and printer controller 26, but the present invention is not limited to this configuration. For example, the parallel processing unit 25 and printer controller 26 can be constructed as external devices that can be connected to the printer 20. Also the parallel processing unit 25 and printer controller 26 may be constructed as devices that can be connected to the host device 10 according to a PCI bus standard, for example. In the case of connecting the parallel processing unit 25 to the host device 10, each function of the printer controller 26 may be implemented by the main CPU of the host device 10.

Also in the fourth and fifth embodiment, a configuration where one scanning line is equally divided into partial areas according to the number of processors was described, but the scanning line need not always be equally divided, but the size of the partial areas to be allocated may be different according to the processor specifications, for example. The number of partial areas to be divided (number of channels) need not always have the same number of processors.

Also in the fourth and fifth embodiments, a configuration where a combination of a channel and a processor is fixed for allocation was described, but a processor which finished processing may be allocated to the next channel, for example. In this case, the corresponding relationship between a processor and a channel may be different depending on the scanning line. A channel may be allocated not only to the processors of the parallel processing units 15 and 25, but also to the main CPU, and parallel processing is executed in this configuration.

Also in the fourth and fifth embodiments, a configuration where the processors 11-14 read the partial data from the RAM was described, but if the host device 10 comprises means of transferring the partial data from the RAM to the processors 11-14 (e.g. DMA transfer means), for example, the compression control means may instruct the transfer to this means. In this case, the processors 11-14 execute processing after receiving the transfer from this means. In the same way, if the printer 20 comprises means of transferring the compressed partial data from the data receive buffer to the processors 21-24 (e.g. DMA transfer means), the decompression control means can instruct the transfer to this means, and the processors 21-24 execute processing after receiving the transfer from this means.

Also in the fourth and fifth embodiments, a configuration where parallel processing is performed on all the scanning lines of a printing image was described, but if the present invention is applied to at least one scanning line constituting the printing image, the compression processing time/decompression processing time can be decreased for this scanning line.

Also in the fourth and fifth embodiments, a configuration where the transfer means 429 transfers data to the printing engine when one scanning line of data is collected was described, but the data may be transferred to the printing engine without waiting for the one scanning line of data to be collected, or when the plurality of scanning lines of data are collected, depending on the type of the printing engine.

Also in the fourth and fifth embodiments, a scanning line was used as a standard unit of compression processing, decompression processing and synchronization, but the present invention is not limited to this configuration. For example, a band, which includes a predetermined number of scanning lines, may be used as a standard for processing. In this case, as a rule, processing will be performed substituting "scanning line" with "band" in the description of the fourth and fifth embodiments, but in some steps, changes, which are obvious to experts, are required. For example, in step S4102, the compression control means 417 must specify the first address for each scanning line included in the band as the first position of the partial data of each channel of the selected band. If a band is used as a standard, the fourth and fifth embodiments can be interpreted as an embodiment regarding one scanning line=one band.

Sixth and Seventh Embodiments

In order to improve the printing quality of a printer, various gradation expression methods have been proposed.

For example, Japanese Patent Application Laid-Open No. 2000-335014 discloses a configuration where an operator selects an attribute to be a key, out of a coordinate area, density area, hue area and spatial frequency, and a half-tone group combining a binary half-tone which is suitable for each of the plurality of areas divided by the key and a plurality of half-tone types comprised of multi-value half-tones greater than binary are selected, so that half-tone image signals, having a half-tone type suitable for that area, are output.

Also as network technologies advance, a printer system where a computer and a printer are connected via a network is now popular. The user can acquire a desired printing result by sending the printing data created on a host device to a printer via a network.

In a so called host printer system, in which the host device has a function to develop the printing target into a printing image, the host device must send the developed printing image to the printer via a network. Since the data volume of the developed printing image depends on the gradation expression, the data volume is generally large if grayscale is high, and the data volume is generally small if grayscale is low. For example, if 3 bits are allocated to each pixel of an image, 8 grayscales can be expressed, but the data volume increases. If 1 bit is allocated to each pixel, then only 2 grayscales can be expressed, but the data volume is small.

In the case of a conventional host printer system, however, the host device has only one gradation mode. Therefore a mode where the bit length of each pixel is large must be used to implement high image quality, that is to assign priority to the gradation of the image, which means that the data transfer time increases and the throughput of the entire printing processing drops even if high quality images can be acquired. If priority is assigned to the data transfer time, on the other hand, a mode where the bit length of each pixel is small must be used, so image quality drops even if the data volume of a printing image decreases.

With the foregoing in view, a printer system considering a balance of both the required image quality and the printing processing speed, and a printer system where the user can freely select a plurality of gradation expressions will be described in the sixth and seventh embodiments.

Sixth Embodiment

The sixth embodiment describes the case when two types of bit gradation modes, that is a 1 bit fixed gradation mode in which 1 bit is used as the bit length of each pixel to express 2 grayscales, and a 2 bit fixed gradation mode in which 2 bits are used as the bit length of each pixel to express 4 grayscales, as an example of a plurality of gradation modes, of which the configuration of the bit length to be used for gradation expression is completely different (hereafter called "bit gradation mode").

(Configuration of Printer System)

Figure 54A:
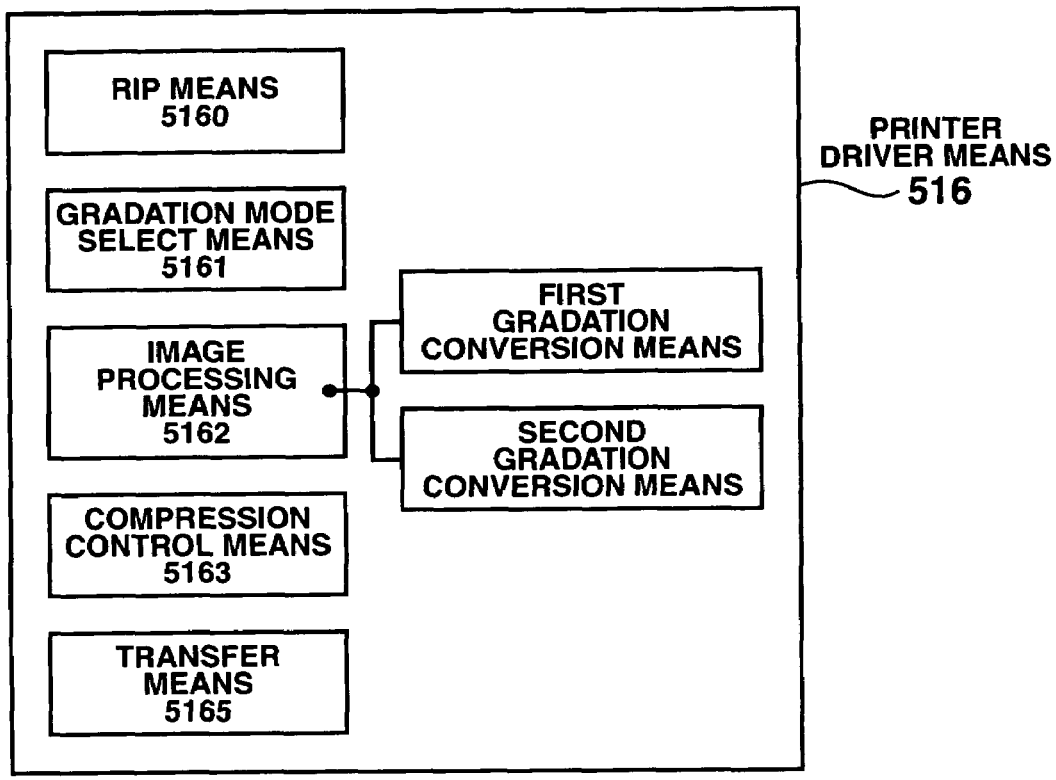
FIG. 54 is a block diagram depicting the functional configuration of the printer driver means 516 and printer controller 526 according to the sixth embodiment.
Figure 54B:
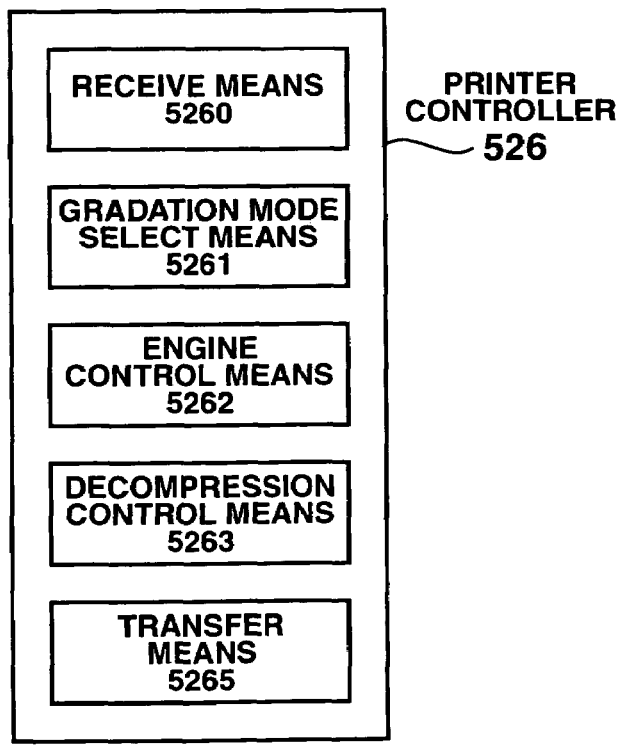

First the configuration of the printer system according to the present embodiment will be described with reference to FIG. 53 and FIG. 54. FIG. 53 is a block diagram depicting the hardware configuration of the printer system 1 according to the present embodiment. FIG. 54 are diagrams depicting the configuration of the printer driver means and printer controller.

As FIG. 53 shows, the printer system comprises a host device 10 and a printer (image processor) 20 which can communicate with the host device via a communication network (any one of LAN, Internet, dedicated line, packet communication network and combination thereof, including both cable and radio).

The host device 10 is comprised of a CPU, ROM, RAM, user interface, communication interface and other hardware. The host device 10 further comprises printer driver means 516 shown in FIG. 54 as a standard control function required for the printer 20 to execute printing.

The printer driver means 516 has a similar functional configuration as a standard printer driver, and comprising RIP means 5160 for generating a raster image based on the printing target data written in a predetermined printer control language, such as PostScript®, according to the printing request from the application program running on a host device 10, image processing means 5162 for generating a printing image by performing a predetermined image processing (e.g. half-tone processing) on the raster image generated by the RIP means 5160, compression control means 5163 for compressing the printing image generated by the image processing means 5162, and transfer means 5165 for transferring the printing image compressed by the compression control means 5163 to the printer 20.

The printer driver means 516 of the sixth embodiment further comprises gradation mode select means 5161 for selecting a bit gradation mode, and image processing means 5162 further comprises a plurality of gradation conversion means (first gradation conversion means, second gradation conversion means) for converting the input gradation value on the raster image into the output gradation value on the printing image. Also the transfer means 5165 transfers the compressed printing image and the gradation identification signal to indicate the bit gradation mode to the printer 20, which is different from the conventional configuration. The image processing means 5162 selects the gradation conversion means corresponding to the bit gradation mode selected by the gradation mode select means 5161, and generates the gradation data for each pixel using the selected gradation conversion means.

Now the gradation conversion means will be described. Each gradation conversion means has a table storing the corresponding relationship between the input gradation value on the raster image and the output gradation value on the printing image (hereafter called "gradation conversion table") respectively, and converts the input gradation value on the raster image into the output gradation value on the printing image using this gradation conversion table (not shown in drawing).

Here the first gradation conversion means corresponds to the 1 bit fixed gradation mode, and the second gradation conversion means corresponds to the 2 bit fixed gradation mode. For example, if the 1 bit fixed gradation mode is set, the gradation value of one pixel on the raster image is converted into a 1 bit length gradation value by the first gradation conversion means. In this case, the printing image is expressed by 2 levels of gradation, image quality is low, but the data size can be suppressed to be small. If the 2 bit fixed gradation mode is set, the gradation value of one pixel on the raster image is converted into a 2 bit length gradation value. In this case, the printing image is expresses by 4 levels of gradation, so the image quality is high, but the data size is also large.

Each of these means is functionally implemented by the CPU executing the programs stored on the ROM or RAM in the host device 10 or programs on the external storage medium.

The printer 20 comprises a power mechanism unit and printer controller 526.

The power mechanism unit further comprises a paper feed mechanism for supplying paper to the printer, a printing engine for performing printing and a paper eject mechanism for ejecting paper from the printer. For the printing engine, various printing engines corresponding to a serial printer which prints data in one character units, such as an inkjet printer and thermal transfer printer, a line printer which prints data in one line units, and a page printer which prints data in one page units, can be used.

The printer controller 526 is comprised of a CPU, ROM, RAM, user interface and communication interface. The power mechanism unit may have an independent CPU, and in this case, the CPU of the power mechanism unit communicates with the CPU of the information processing unit via a parallel interface or the like, to control the printing engine and to perform the printing operation.

The printer controller 526 has a similar functional configuration as a printer controller of a standard printer, and comprises, for example, receive means 5260 for receiving commands and data from the host device 10 and storing them in the receive buffer, engine control means 5262 for controlling the power mechanism unit to execute printing, decompression control means 5263 for executing decompression processing, and transfer means 5265 for transferring the decompression result to the printing engine in the sequence to be used for printing, as shown in FIG. 54.

The difference of the printer controller 526 of the sixth embodiment from the conventional configuration, however, is that it comprises gradation mode select means 5261 for selecting a bit gradation mode, and the transfer means 5265 extracts a predetermined bit length data (gradation data of each pixel), from the decompression processing result according to the bit gradation mode selected by the gradation mode select means 5261, and transfers it to the printing engine.

The gradation mode select means 5261 of the sixth embodiment selects the bit gradation mode according to the gradation identification signal to indicate the bit gradation mode received by the receive means 5260. The transfer means 5265 extracts the 1 bit length data from the beginning of the decompression result as the gradation data of each pixel in the case of the 1 bit gradation mode, and in the case of 2 bit gradation mode, the transfer means 5265 extracts the 2 bit length data from the beginning of the decompression result as the gradation data of each pixel.

Each of these means is implemented by the CPU executing programs stored in the ROM or RAM in the printer 20 aor- external storage medium.

(Printing Processing in the Printer System)

Now the printing processing of the printer system 1 will be described with reference to the flow charts shown in FIG. 55 and FIG. 57 and the screen configuration shown in FIG. 56. Each step (including the partial steps not denoted with reference numerals) can be executed in any sequence or in parallel within the scope where no inconsistency occurs regarding the processing content.

In the sixth embodiment, two types of bit gradation modes, that is 1 bit fixed gradation mode and 2 bit fixed gradation mode, were used as an example of the plurality of bit gradation modes, as described above. However the bit gradation modes are not limited to these two types, but may be added or changed according to the specifications. For example, gradation modes where 3 bit length gradation signals are provided for all the pixels and 8 levels of gradation expression is performed using these gradation signals may be used instead of or added to these two types of bit gradation modes.

(Processing in the Host Device 10)

Processing in the host device 10 will now be described with reference to FIG. 55.

Figure 55:
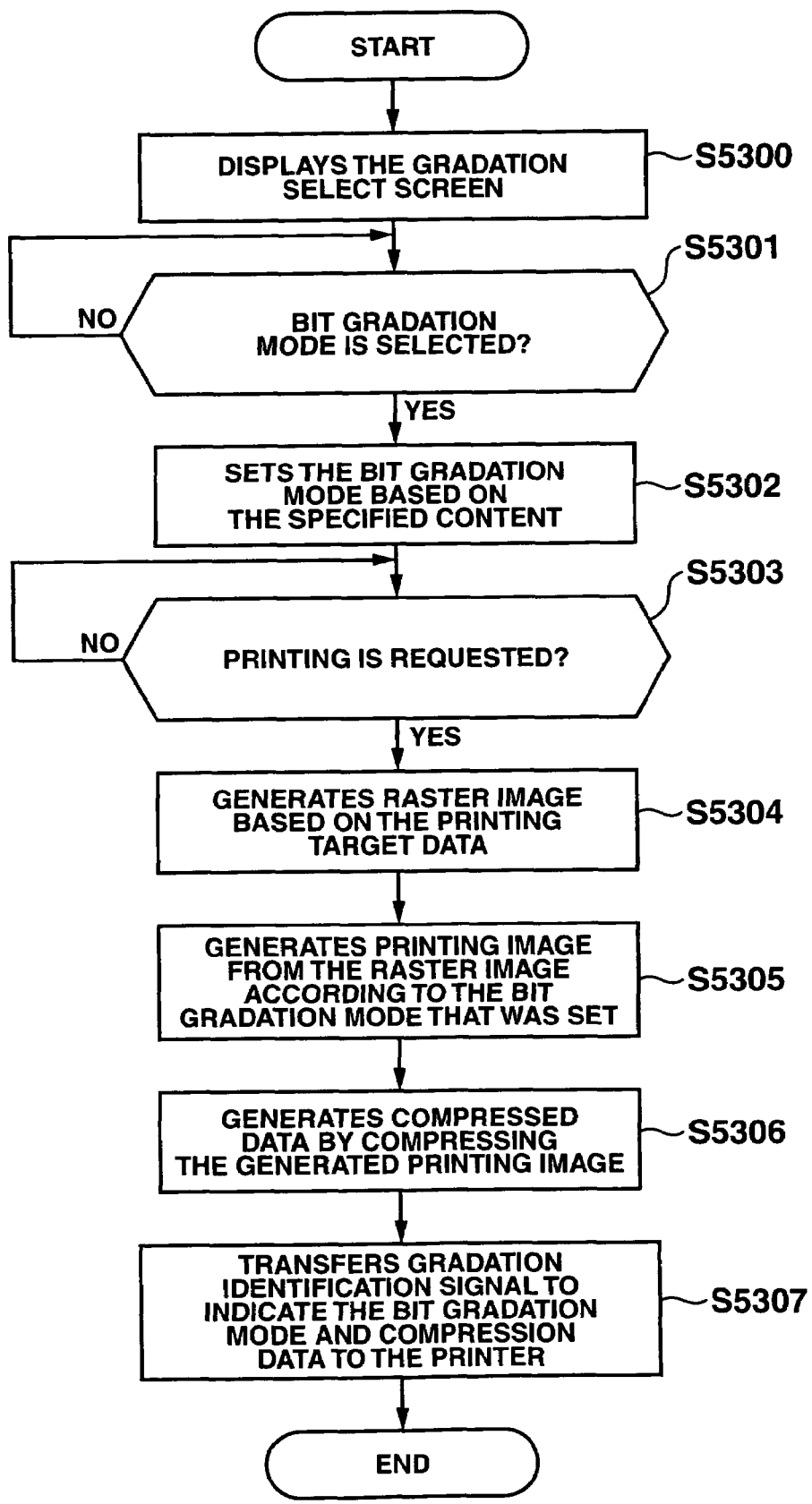
FIG. 55 is a flow chart depicting the processing content of the printer driver means 516 according to the sixth embodiment.

FIG. 55 is a flow chart depicting the processing flow in the host device. The user inputs an instruction to select the bit gradation mode to the host device 10 via the user interface. The gradation mode select means 5161 outputs and displays the gradation select screen, shown in FIG. 56, on the display (STEP 5300).

Figure 56:
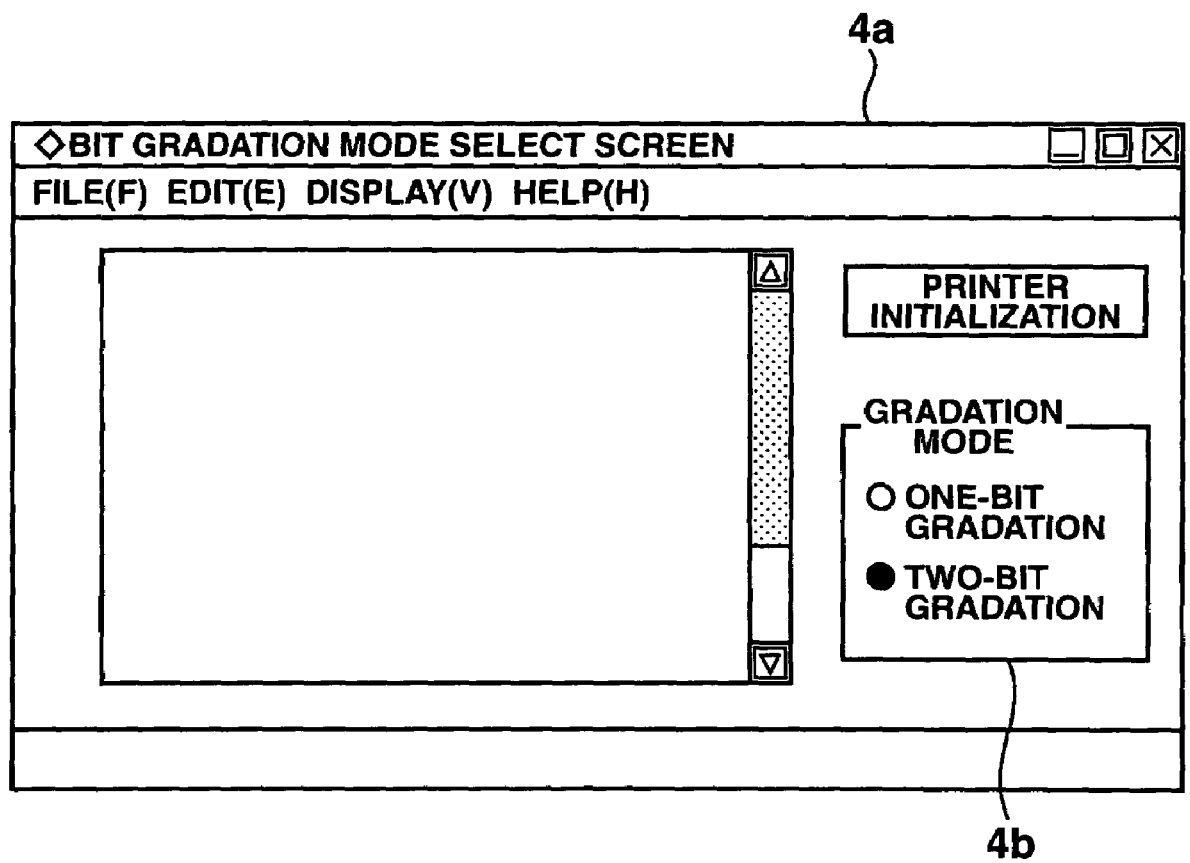
FIG. 56 is a diagram depicting an example of a gradation select screen according to the sixth embodiment.

FIG. 56 is a diagram depicting an example of the gradation select screen displayed on the display. As FIG. 56 shows, in the gradation select screen 4a, a plurality of bit gradation modes 4b are displayed. The gradation select screen has a function for the user to specify a desired bit gradation mode. For example, the user can specify a desired gradation mode by clicking on a button corresponding to each bit gradation mode. In the following description of the sixth embodiment, it is assumed that 2 bit fixed gradation mode was specified, as shown in FIG. 56.

When the user specifies a predetermined bit gradation mode (STEP 5301: YES), the gradation select means 5161 sets the bit gradation mode to be used for the image processing based on the specified content (STEP 5302). To set the bit gradation mode, a bit gradation flag, to indicate whether the bit gradation mode is 1 bit fixed gradation mode or 2 bit fixed gradation mode, is provided, for example, and the information to identify each mode is stored in this flag (e.g. 1 bit fixed gradation mode is "1", 2 bit fixed gradation mode is "2"). In the sixth embodiment, where 2 bit fixed gradation mode is specified, "2" is stored in the bit gradation flag.

The printer driver means 516 accepts a printing request from an application program running externally or on the host device 10 (STEP 5303: YES), and sends the printing instruction command to the printer 20 (printer controller 526), and instructs the RIP means 5160 to start processing.

The RIP means 5160 receives the instruction to start processing, and generates a raster image based on the printing target data written in a predetermined printer control language, such as PostScript®, received from the application program (STEP 5304). If the printing target data can be received in raster image format from the application program, the processing by the RIP means 5160 can be omitted.

The image processing means 5162 performs a predetermined image processing on the generated raster image according to the bit gradation mode set by the gradation mode select means 5161, and stores it in a predetermined area of the RAM (STEP 5305).

Specifically, the image processing means 5162 selects a gradation conversion means corresponding to the bit gradation mode. The selected gradation conversion means refers to the gradation conversion table corresponding to the gradation conversion means itself, converts the input gradation value on the raster image into the output gradation value on the printing image, and generates a predetermined bit length gradation data for each pixel. The image processing means 5162 stores the generated gradation data in a predetermined storage area of the RAM as a printing image. In this case, "2" is stored in the bit gradation flag, so the image processing means 5162 selects the second gradation conversion means. The second gradation conversion means generates 2 bit length gradation data for each pixel.

Then the compression control means 5163 reads the generated printing image from a predetermined area of the RAM, and generates the compressed data by executing a predetermined compression processing on this read printing image (STEP 5306). For the predetermined compression processing, various compression algorithms can be used according to the design, and in the case when the printing image is binary data, for example, it is possible to use a JBIG (Joint Bi-level Image experts Group) algorithm.

Then the transfer means 5165 transfers the gradation identification signal to indicate the bit gradation mode, and the compressed data, to the printer 20 (printer controller 526) (STEP 5307) when the printer 20 (printer controller 526) can receive the compressed data. The transfer means 5165 executes the transfer processing until all the compressed data is transferred for the generated printing image.

The gradation identification signal, which is for the printer 20 to detect the bit information mode, may be transferred at a timing different from the timing to transfer the compressed data. For example, the gradation identification signal may be transferred when the printing instruction command is sent to the printer 20 (printer controller 526) after the printing request is accepted. The gradation identification signal may be transferred according to the acquisition request from the printer 20.

According to this configuration, the user can specify a desired gradation via the gradation select screen, so the gradation mode according to the required image quality can be implemented in the host. The user can specify the gradation mode considering the required image quality, printing speed and traffic status on the network, so convenience for the user of the printer system can be improved.

(Processing in Printer 20: FIG. 57)

The processing in the printer 20 will now be described with reference to FIG. 57.

Figure 57:
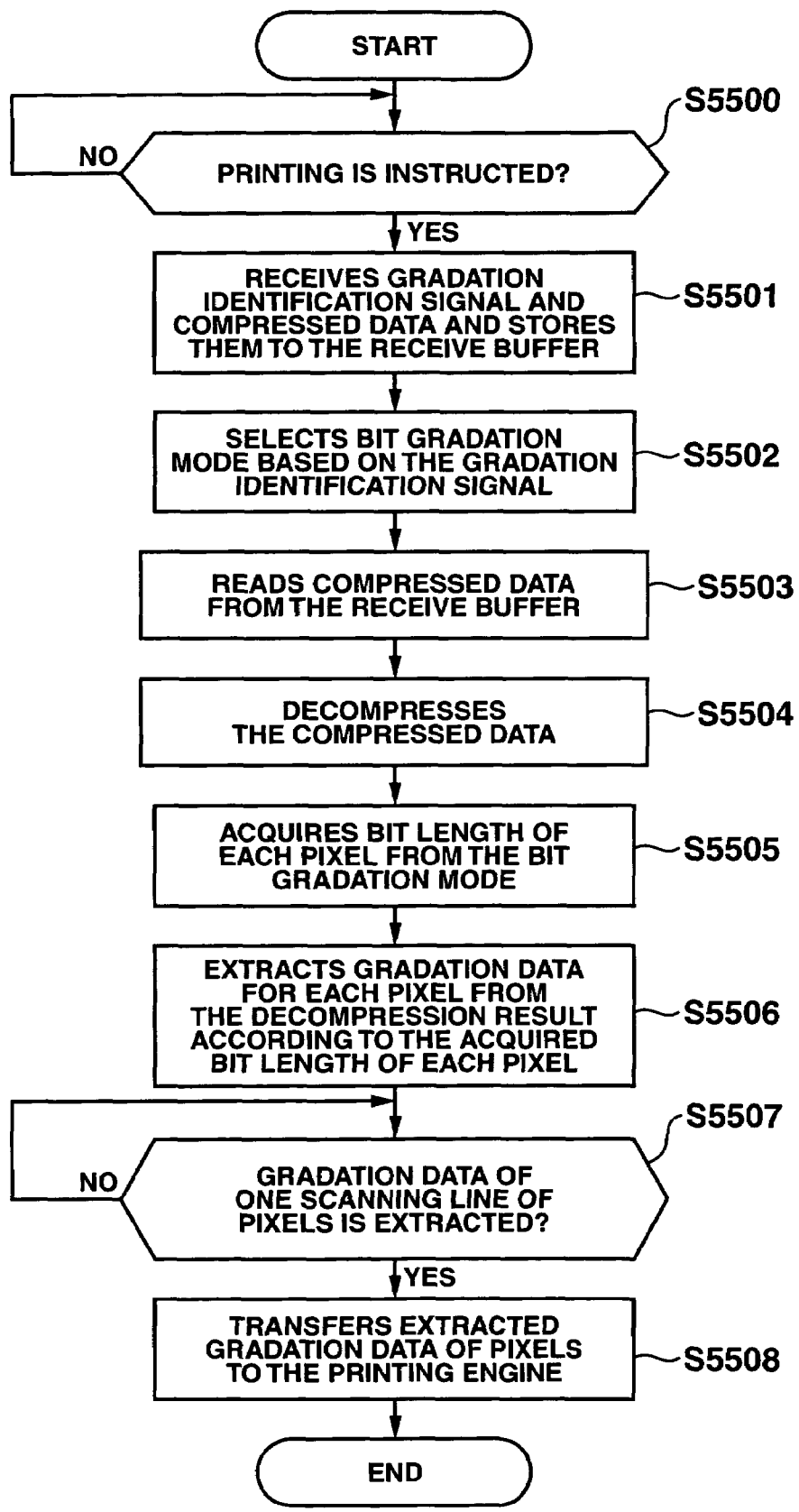
FIG. 57 is a flow chart depicting the processing content of the printer controller 526 according to the sixth embodiment.

FIG. 57 is a flow chart depicting the flow of printing processing in the printer 20. If the command received by the receive means 5260 is a printing instruction command (STEP 5500: YES), the printer controller 526 controls the power mechanism unit using the engine control means 5262 to prepare for printing. When the compressed data 7 to be transferred and the gradation identification signal are received from the host device 10, the receive means 5260 stores them in the receive buffer, and instructs the gradation mode select means 5261 and decompression control means 5263 (STEP 5501) to start processing.

The gradation mode select means 5261 accepts the instruction to start processing, and selects the bit gradation mode based on the gradation identification signal (STEP 5502). In this case, the 2 bit fixed gradation mode is selected.

The decompressing control means 5263 accepts the instruction to start processing, and reads the compressed data stored in the data receive buffer (STEP 5503), and executes a predetermined decompression processing on this read compressed data (STEP 5504). For the decompression processing, decompression processing corresponding to the compression algorithm is used by the compression control means 5163 of the host device 10.

The transfer means 5265 specifies the bit length of each pixel according to the bit gradation mode selected by the gradation mode select means 5261 (STEP 5505), and extracts the gradation data for each pixel by extracting data with that bit length sequentially from the beginning of the decompression result according to the big length (STEP 5506). In this case, 2 bit gradation mode is selected, so 2 bit information is extracted as the gradation data for each pixel.

The transfer means 5265 extracts the gradation data for one scanning line of pixels (STEP 5507: YES), and transfers the extracted gradation data of each pixel to the printing engine (STEP 5508).

According to this configuration, the printer judges the bit gradation mode of the received printing image according to the gradation identification signal, therefore even in the case when a printing image, according to the plurality of bit gradation modes, is transferred from the host device 10, the gradation data of each pixel can be extracted in a bit gradation mode corresponding to the printing image.

Also according to the above configuration, 1 bit fixed gradation mode can be selected when the printing target data does not require gradation or when priority is assigned to data speed rather than image quality, so that the data communication load in the printer system can be decreased. When the printing target in particular requires gradation or when priority is assigned to image quality rather than data speed, on the other hand, selecting 2 bit fixed gradation mode allows acquiring a high image quality printing result. As a consequence, a printer system which can select the required image quality or data communication according to the situation can be implemented.

Seventh Embodiment

In the sixth embodiment, a printer system considering the balance of both the gradation expression and data transfer time is implemented by selecting 1 bit fixed gradation mode or 2 bit fixed gradation mode according to purpose, but it is not easy to select one of the gradation modes if high image quality and short data processing time are both required.

With the foregoing in view, an object of the seventh embodiment is to implement a printer system that satisfies user demands for decreasing the data transfer time while maintaining high image quality by providing a variable gradation mode in which the bit length can be specified in pixel units.

The variable gradation mode is structured such that one of a plurality of types of bit lengths is selected in pixel units, which is different from the fixed gradation mode in which the bit length is a constant value for all pixels, such as the 1 bit fixed gradation mode and 2 bit fixed gradation mode. In the seventh embodiment, in addition to the 1 bit fixed gradation mode and 2 bit fixed gradation mode, variable gradation mode, in which one of 1 bit length, 2 bit length or 3 bit length can be specified for each pixel, is used. The configuration of the bit lengths in the variable gradation mode can be changed according to the specifications.

(Functional Configuration of the Printer System)

Figure 58A:
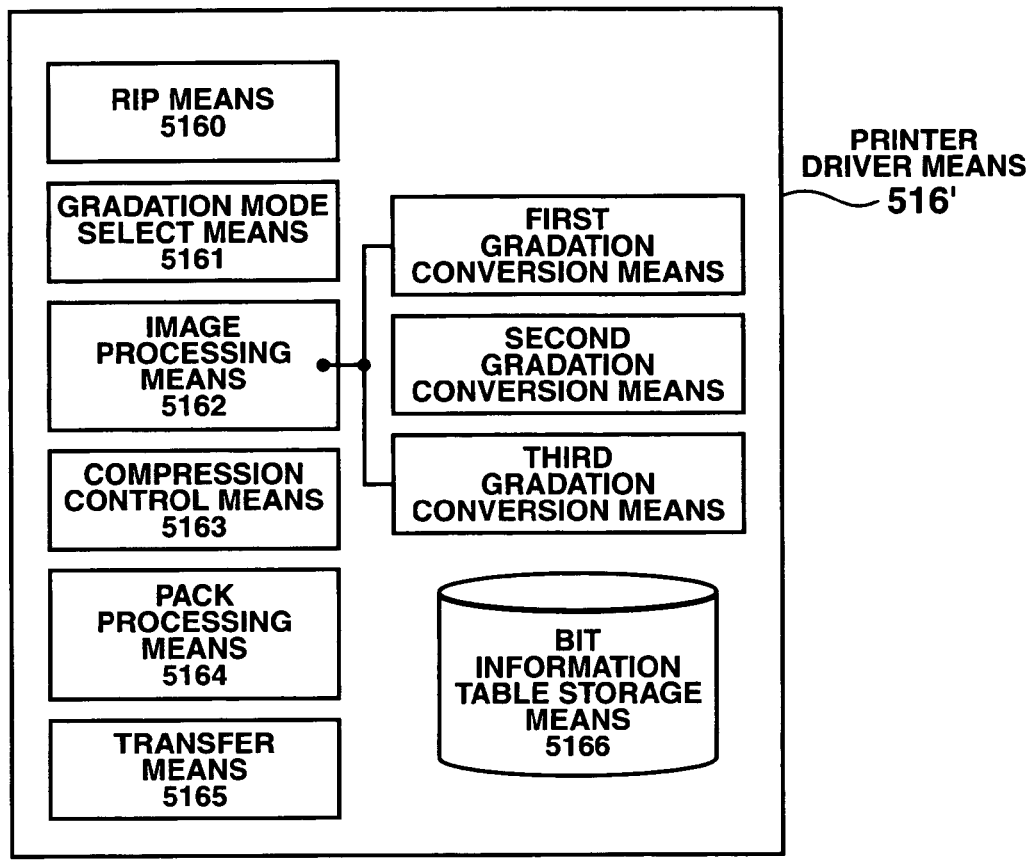
FIG. 58 is a block diagram depicting the functional configuration of the printer driver means 516' and printer controller 526' according to the seventh embodiment.

FIG. 58 are block diagrams depicting the functional configuration of the printer system 1 according to the seventh embodiment. The functional implementation means, corresponding to the functions shown in FIG. 54, are denoted with the same reference numerals. As shown in FIG. 58A, the printer driver means 516' comprises pack processing means 5164 for executing the processing for collecting the printing image, which is generated in bit unit according to the variable gradation mode, in byte units, and bit information table storage means 5166 for storing a table for specifying the lineup of the bit length of each pixel (hereafter called "bit information table"). The image processing means 5162 further comprises a third gradation conversion means which corresponds to the variable gradation mode.

Each of these means is functionally implemented by the CPU executing the programs stored in the ROM and RAM in the host device 10 and external storage medium. The bit information table storage means 5166 is constructed in the ROM or RAM in the host device 10 or external storage medium.

Figure 58B:
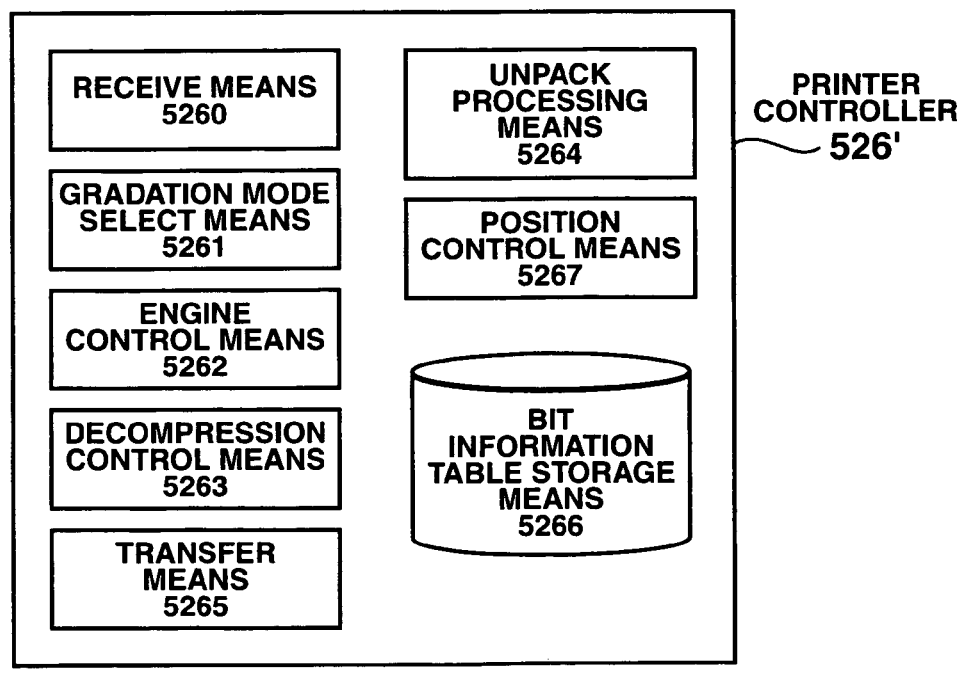

On the other hand, as shown in FIG. 58B, the printer controller 526' comprises unpack processing means 5264 for executing the processing to return the printing image collected in byte units by the pack processing means 5164 back to bit units (unpacking), position control means 5267 for controlling the positions of the isolated dots for the data unpacked by the unpack processing means 5264, and bit information table storage means 5266 for storing the bit information table.

Each of these means is implemented by the CPU executing the programs stored in the ROM or RAM in the printer 20 or external storage medium. The bit information table storage means 5266 can be constructed in the ROM or RAM in the printer 20 or external storage medium.

(Bit Information Table)

Figure 59A:
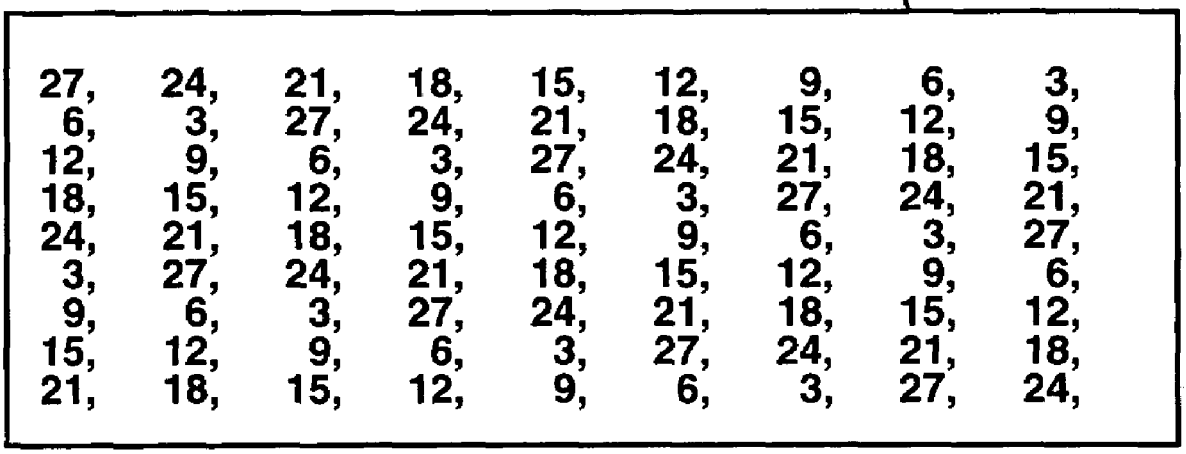
FIG. 59 is a diagram depicting an example of the bit length information table according to the seventh embodiment.
Figure 59B:
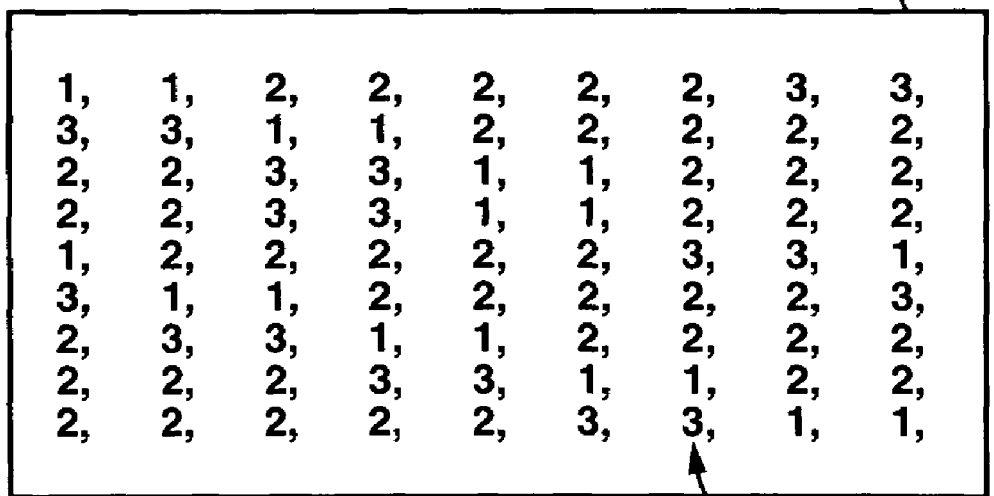

FIG. 59 shows an example of the screen table and bit information table. FIG. 59A shows an example of the screen table, and FIG. 59B shows an example of the bit information table. The bit information table corresponds to positions in the screen table and the bit lengths. If one pixel on the raster image is converted into 9×9 pixels on the printing image, each gradation value of the 9×9 pixels on the printing image is converted into the gradation value of the bit length in the bit information table corresponding to the position in the screen table.

The variable gradation mode is based on 2 bit gradation, wherein an area which can be sufficiently expressed with less gradation is expressed by 1 bit gradation, and an area which requires more gradation is expressed by 3 bit gradation. For example, human eyes are sensitive to the density difference in low density areas, but not very sensitive to the density difference in high density areas. The 2 bit fixed gradation mode, which can express a smoother gradation than the 1 bit fixed gradation mode, is suitable for mid-tones and high density images, but it is difficult to express smooth gradation for a low density area, such as an image of the human skin.

With the foregoing in view, according to the seventh embodiment, a 1 bit gradation is used for a greater value in the screen table (e.g. 27, 24), and 3 bit gradation is used for a smaller value (e.g. 6, 3) in the variable gradation mode, so as to decrease the gradation in the high density part of the printing image while increasing the gradation in the low density part. Also the number of pixels of the part where 1 bit gradation is assigned and the number of pixels of the part where 3 bit gradation is assigned are matched, so that the total data volume becomes the same data volume as the case of 2 bit fixed gradation mode.

The bit information table can be transferred from the printer driver means 516' to the printer controller 526', or vice versa, that is from the printer controller 526' to the printer driver means 516'. Because of this structure, the bit information table can be easily updated, even if changes occur to the printer driver, target engine or screen table.

(Printing Processing in the Printer System)

Now the printing processing in the printer system 1 will be described with reference to the flow charts shown in FIG. 60 and FIG. 61. Each step (including the partial steps not denoted with reference numerals) can be executed in any sequence or in parallel within the scope where inconsistencies do not occur in the processing content.

Figure 60:
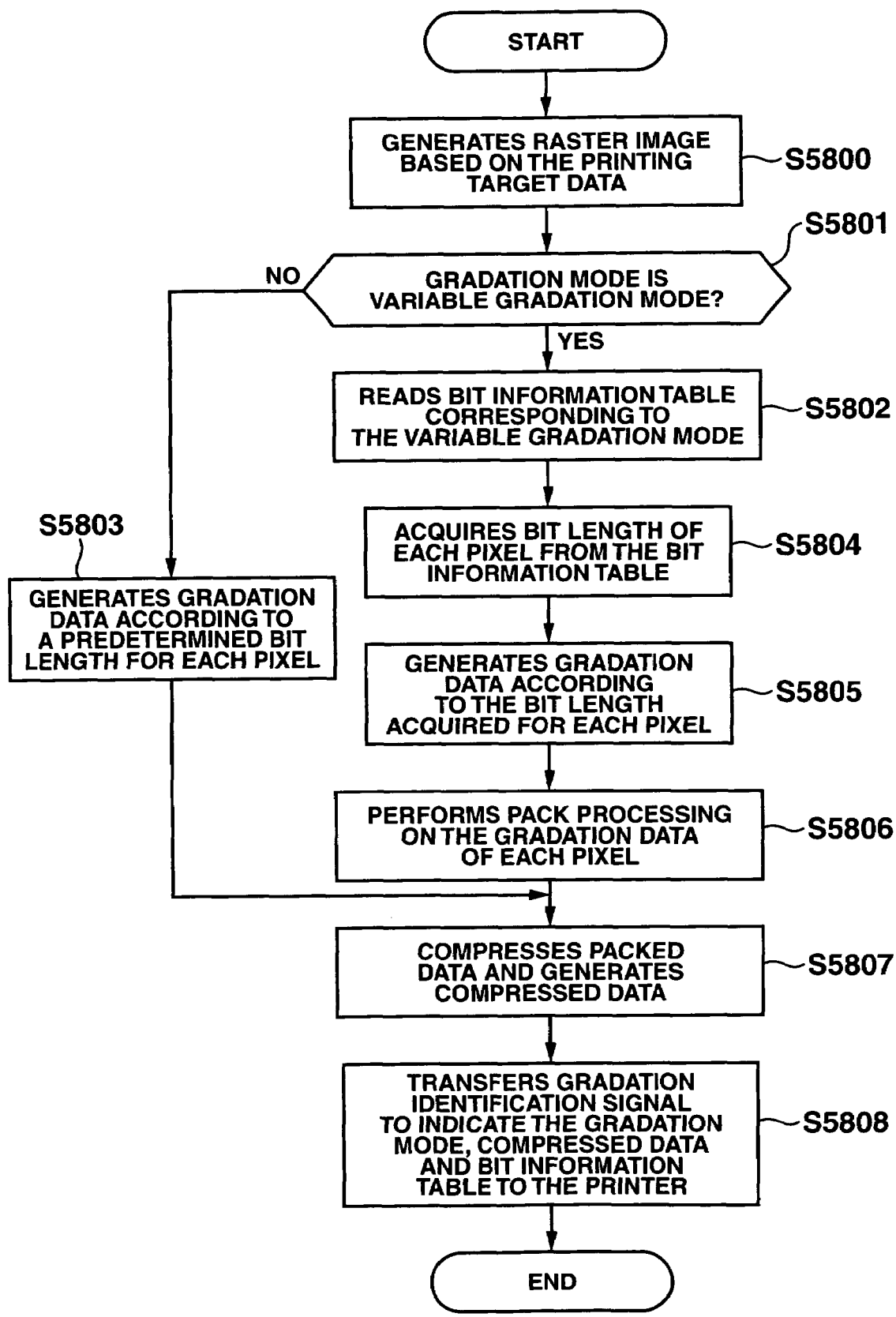
FIG. 60 is a flow chart depicting the processing content of the printer driver means 516' according to the seventh embodiment.

FIG. 60 is a flow chart depicting the processing flow in the host device. Selection of the gradation mode by a user and the processing from the instruction to start processing to the generation of a raster image is essentially the same as the processing flow in FIG. 55, so description thereof will be omitted.

Here it is assumed that the user selected the bit variable gradation mode in the gradation select screen shown in FIG. 56. Since the bit variable gradation mode is specified, the gradation mode select means 5161 stores "3" to indicate this mode in the bit gradation flag.

The RIP means 5160 generates the raster image based on the printing target data (STEP 5800). When the raster data is generated by the RIP means 5160, the image processing means 5162 judges whether the gradation mode currently set is the variable gradation mode (STEP 5801).

If variable gradation mode, the image processing means 5162 reads the bit information table corresponding to the variable gradation mode from the bit information table storage means 5166 using the third gradation conversion means (STEP 5802). If not the variable gradation mode, on the other hand, the image processing means 5162 generates the printing image using the gradation conversion means corresponding to the specified bit gradation mode (STEP 5803).

In the seventh embodiment, where the variable gradation mode is set, the image processing means 5162 (third gradation conversion means) reads the bit information table corresponding to the variable gradation mode. If a plurality of variable gradation modes exist, a bit information table corresponding to each mode is stored in the bit information table storage means 5166, so the applicable bit information table is read.

The image processing means 5162 acquires the bit lengths of the target pixels from the bit information table (STEP 5804). And gradation data is generated according to the bit lengths acquired for the target pixels respectively (STEP 5805). The image processing means 5162 transfers the generated gradation data to the pack processing means 5164.

Then the pack processing means 5164 starts processing to convert the gradation data of each pixel from bit units into byte units (STEP 5806). Specifically, 1 bit, 2 bit and 3 bit data are connected to create 1 byte (8 bit) unit data (pack processing). The pack processing means 5164 transfers the data packed in byte units to the compression control means 5163.

The compression control means 5163 executes a predetermined compression processing on the packed data to generate compressed data (STEP 5807). Then the transfer means 5165 transfers the gradation identification signal to indicate the bit gradation mode and the compressed data to the printer 20 (printer controller 526') if the printer 20 (printer controller 526') can receive the compressed data (STEP 5808).

When the variable gradation mode is specified, the transfer means 5165 also transfers the bit information table together if the same bit information table does not exist in the printer 20. The timing when the bit information table is transferred is not limited to this timing. For example, the bit information table may be transferred when the printing instruction command is sent to the printer 20 (printer controller 526') after the printing request is accepted, or may be transferred when the acquisition request is received from the printer 20.

Now the processing at the printer side will be described.

Figure 61:
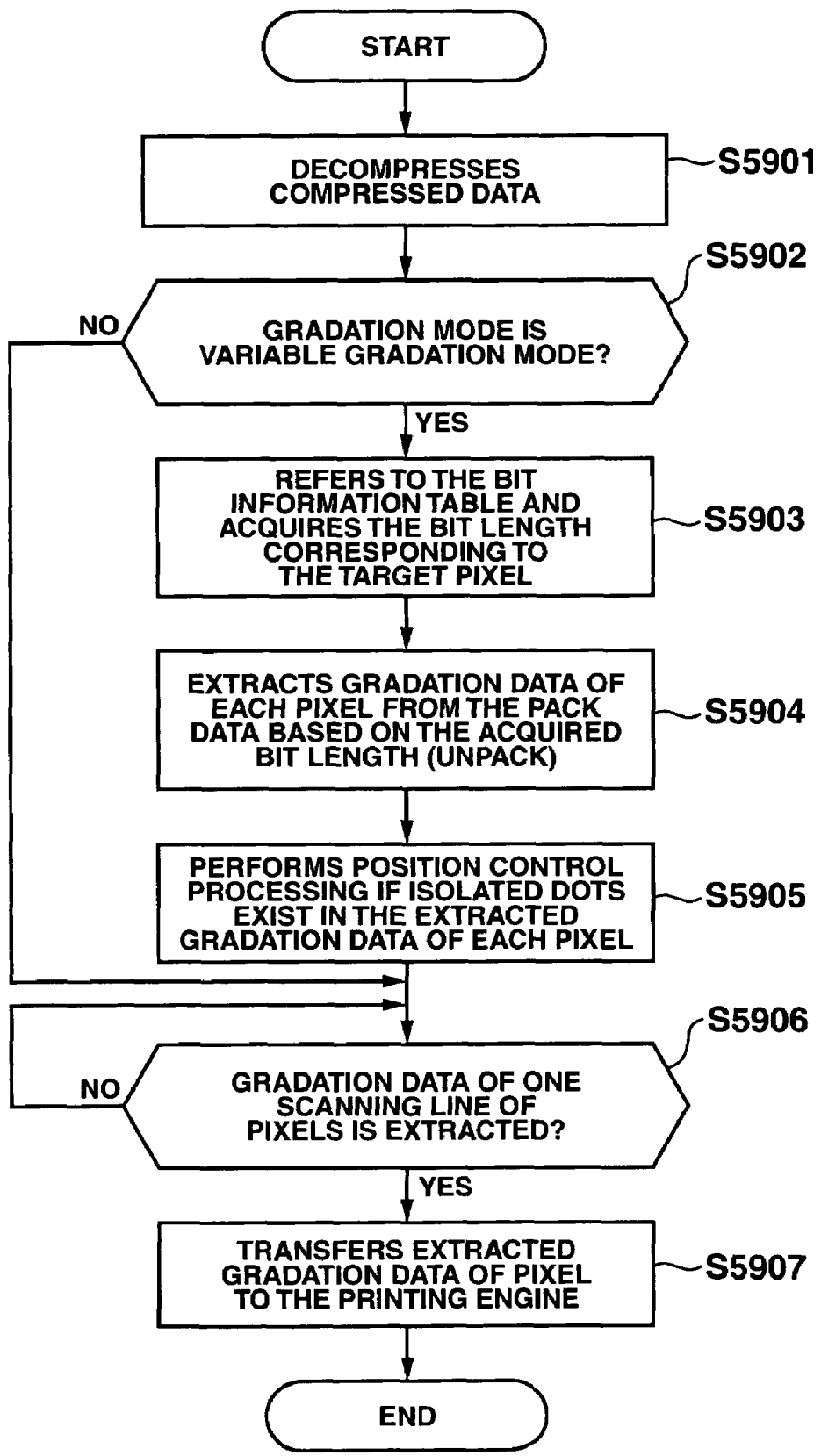
FIG. 61 is a flow chart depicting the processing content of the printer controller 526' according to the seventh embodiment.

FIG. 61 is a flow chart depicting the processing flow in the printer. The processing until the compressed data is stored in the receive buffer is essentially the same as the processing flow in FIG. 57, therefore description thereof will be omitted.

The decompression control means 5263 reads the compressed data from the receive buffer and decompresses this data (STEP 5901). For the decompression processing, the decompression processing corresponding to the compression algorithm used by the compression control means 5163 of the host device 10 must be used. Then the gradation mode select means 5261 judges whether the bit gradation mode is a variable gradation mode (STEP 5902). If variable gradation, the gradation mode select means 5261 instructs the unpack processing means 5264 to start processing.

The unpack processing means 5264 acquires the bit lengths of the target pixels referring to the bit information table based on the first position (STEP 5903). For the bit information table used for the unpack processing, one corresponding to the bit length information table used by the pack processing means 5164 of the host device 10 must be used. In the seventh embodiment, the bit information table transferred from the host device 10 is used, but it may be stored in the printer 20 in advance. The unpack processing means 5264 extracts the data of each pixel from the packed data according to the acquired bit lengths (STEP 5904).

Now the position control means 5267 executes the processing for controlling the positions of isolated dots (STEP 5905). In the case of a laser printer, a plurality of gradations are expressed using a plurality of partial dots which are acquired by dividing one pixel in the main scanning direction. For example, in the case of 2 bit gradation mode, one dot is divided into four partial dots ($1^{st}$ partial dot, $2^{nd}$ partial dot, $3^{rd}$ partial dot and $4^{th}$ partial dot) in the main scanning direction, and a laser is irradiated onto these partial dots using the pattern defined in four levels to adhere toner.

However if a plurality of partial dots, to which a laser is not irradiated, exist before and after the partial dots to which a laser is irradiated (e.g. if a laser is irradiated only onto the $3^{rd}$ partial dot, and laser is not irradiated onto partial dots other than the $3^{rd}$ partial dot), it is difficult for the toner 40 to adhere to the target partial dots. These partial dots are called "isolated dots".

Therefore in this printer system 1, the positions of such isolated dots are controlled to be moved either in the main scanning direction or in a direction opposite of the main scanning direction. When an isolated dot is detected, the position control means 5267 adds information on which one of the main scanning direction and the opposite of the main scanning direction in which the dot is moved.

When the gradation data of one scanning line of pixels is all decompressed (and when unpack and position control are also performed in the case of a variable gradation mode) (STEP 5906: YES), the transfer means 5265 transfers the gradation data of each pixel to the printing machine (STEP 5907).

According to this configuration, where a variable gradation mode is used in this printer system 1, different levels of gradation can be implemented in pixel units.

(Other)

The present invention is not limited to the sixth and seventh embodiments, but can be modified in various ways and applied. For example, the present invention can be applied to a system other than a printer system if it is a system for performing gradation processing on image data.

Also in the sixth and seventh embodiments, a case when 1 bit fixed gradation mode, 2 bit fixed gradation mode and variable gradation mode are used as the bit gradation mode was described, but the bit gradation mode can be added or changed according to the specifications. For example, 3 bit fixed gradation mode where 8 grayscales are expressed using a 3 bit length may be added.

Also in the sixth and seventh embodiments, a configuration where the gradation mode select means 5161 of the printer driver means 16 sets the bit gradation mode to be applied to image processing was described, but the present invention is not limited to this configuration. For example, the printer controller 526 side may set the bit gradation mode. In this case, the user can specify the bit gradation mode via the user interface of the printer 20, and the printer controller 526 transfers the gradation identification signal to indicate the bit gradation mode to the host device 10 at a predetermined timing. For example, the gradation identification signal is transferred at a timing when the printing instruction command is received from the host device, or a timing when the gradation identification signal acquisition request is received. According to this, the setting at the host side can be matched to the bit gradation mode at the printer side.

Also in the sixth and seventh embodiments, the user specifies the bit gradation mode, but the present invention is not limited to such a configuration. For example, the printer driver means 516 or the printer controller 526 may specify the bit gradation mode automatically according to predetermined conditions.

Also in the sixth and seventh embodiments, pack/unpack processing is performed and position control processing is also performed in variable gradation mode, but the present invention is not limited to such a configuration. For example, the pack/unpack processing and position control processing may also be executed in 2 bit fixed gradation mode.

Eight Embodiment

As an image creation method used for color printers and color copiers, an electro-photographic system is known. In an electro-photographic system, an electrostatic latent image is formed on a photosensitive drum using a laser beam, the image is developed by charged toner, and the developed image by toner is transferred and fused to transfer paper to create the image. In this case, the position of the irradiation area of the laser beam (area where the latent image is actually formed) can be changed in various ways within the latent image formation enabled area corresponding to each pixel (hereafter called "dot"), so even if the number of dots per unit area is low, a color image with high resolution with high gradation can be created.

In this electro-photographic system, it has been attempted to improve the image quality by controlling the position of the irradiation area of the laser beam in the dot(s) (hereafter called "intra-dot position"), but most such attempts were based on a framework where the gradation value (density) of the target pixel and the gradation value of adjacent pixels before and after the target pixel are compared, and the intra-dot position is determined based on the comparison result so as to be close to an adjacent pixel with high gradation (see Japanese Patent Application Laid-Open No. H8-324020).

When such a framework is used as a base, a gradation value must be acquired in advance for the pixel after the target pixel to determine the intra-dot position for the target pixel, which means that it is unavoidable that the processing load increases and overload problems occur. Particularly when image data is generated by decompressing the compressed data and image creation processing is executed based on the generated image data, if the target pixel and subsequent pixel are included in different compressed data, the intra-dot position of the target pixel cannot be determined unless decompression processing is performed on the next compressed data, therefore the overhead problem increases further and processing itself becomes complicated.

With the foregoing in view, in the eighth embodiment, a technology for solving the above problems and creating high quality images will be described.

Figure 62:
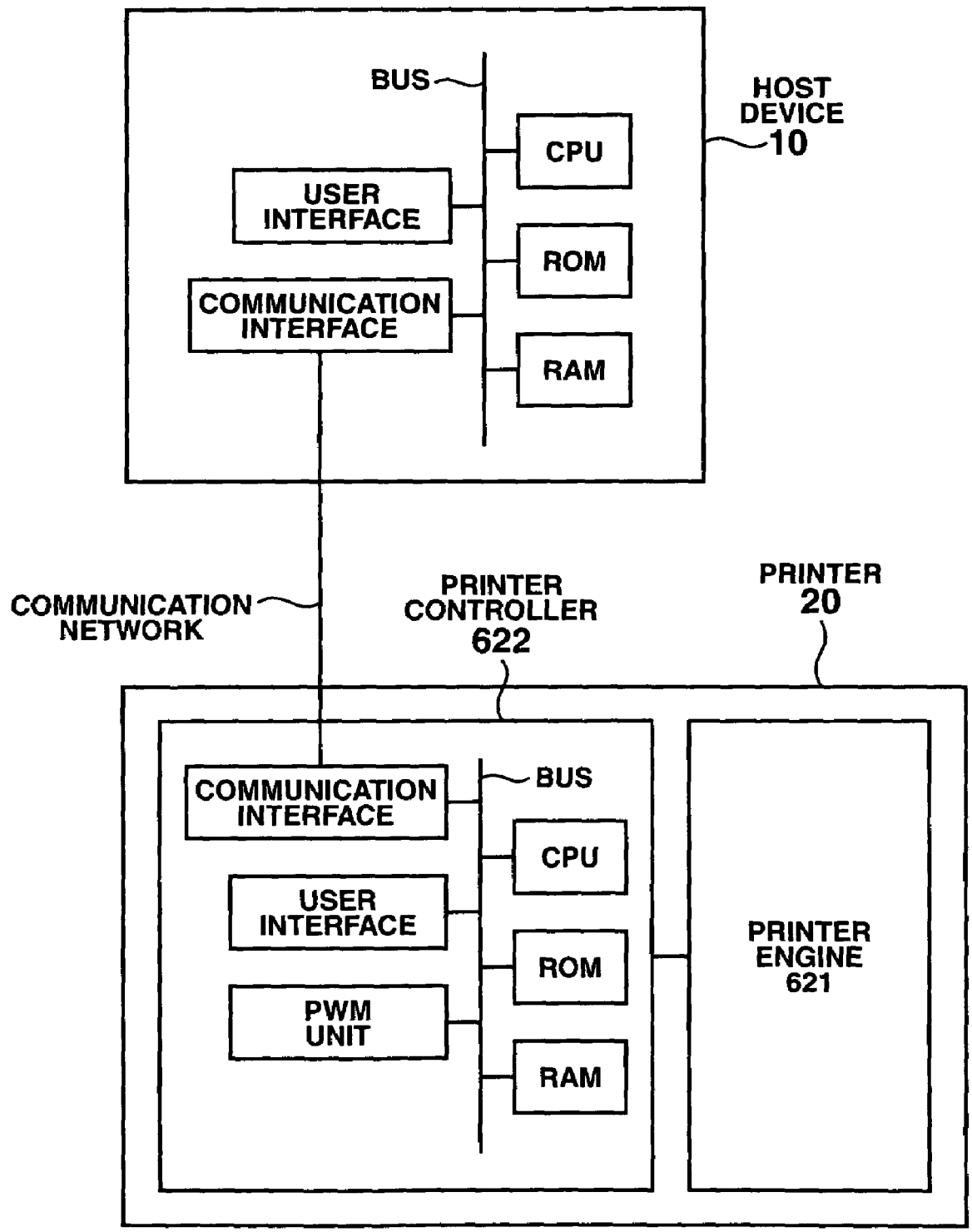
FIG. 62 is a block diagram depicting the hardware configuration of the printer system according to the eighth embodiment.

FIG. 62 is a block diagram depicting the hardware configuration of the printer system 1 of the eighth embodiment. As FIG. 62 shows, the printer system 1 is comprised of a host device 10 and printer (image creation device) 20 which can communicate with the host device 10 via a communication network (any one of LAN, Internet, dedicated line, packet communication network, and a combination thereof, including both cable and radio).

The host device 10 is comprised of a CPU, ROM, RAM, communication interface, user interface and other hardware. The host device 10 further comprises the printer driver means shown in FIG. 63 as a standard function required for the printer 20 to execute printing.

Figure 63A:
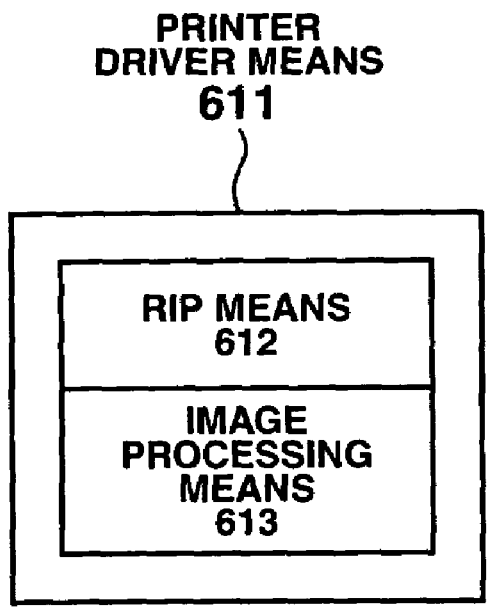
FIG. 63 is a block diagram depicting the functional configuration of the printer driver means 611 and printer controller 622.

The printer driver means 611 has a similar functional configuration as a standard printer driver, and comprises RIP means 612 for generating a raster image based on the printing target data written in a predetermined printer control language, such as PostScript®, according to the printing target from the application program running on the host device 10, image processing means 613 for creating a printing image by performing a predetermined image processing (e.g. half-tone processing) on the raster image, and other means (see FIG. 63A). Each of these means is implemented by the CPU executing the programs stored in ROM or RAM in the host device 10 or external storage medium.

The printer comprises a printer engine 621 and printer controller 622. The printer controller 622 may be separate from the printer 20.

The printer engine 621 is a standard printer engine of an electro-photographic system, and comprises a laser diode, photosensitive element, transfer belt and drive units thereof and so like.

The printer controller 622 is comprised of a CPU, ROM, RAM, communication interface, user interface and PWM (Pulse Width Modulation) unit and so like.

The printer controller 622 has a similar functional configuration as the printer controller of a standard printer, and comprises, for example, receive means 623 for receiving commands and data from the host device 10 via the communication interface and storing them in RAM, and engine control means 624 for controlling the printer engine 621 to execute printing.

Figure 63B:
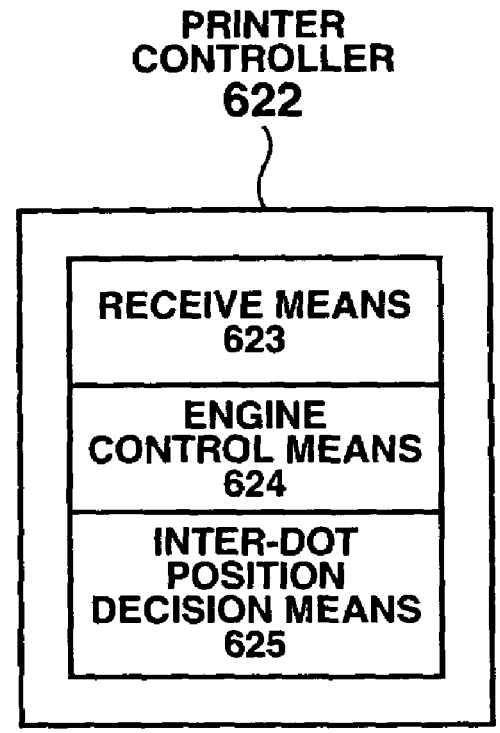

The difference of the printer controller 622 of the eighth embodiment from a conventional configuration, however, is that it comprises intra-dot position decision means 625 for determining the latent image formation position (laser beam irradiation position) of the target pixel based at least on the latent image formation position of the previous pixel of the pixel of which the latent image formation image is determined (target pixel) when the latent image formation position, in the latent image formation enabled area (dot) corresponding to the pixel, is determined for each pixel of the printing image (see FIG. 63B).

Each of these means is implemented by the CPU executing the programs stored in RAM or ROM in the printer controller 622 or external storage medium.

Now the printing processing in the printer system 1 will be described with reference to the flow charts and diagrams shown in FIG. 64 and other drawings. Each step (including the partial steps not denoted with reference numerals) can be executed in any sequence or in parallel within the scope where inconsistencies doe not occur in the processing content.

Figure 64:
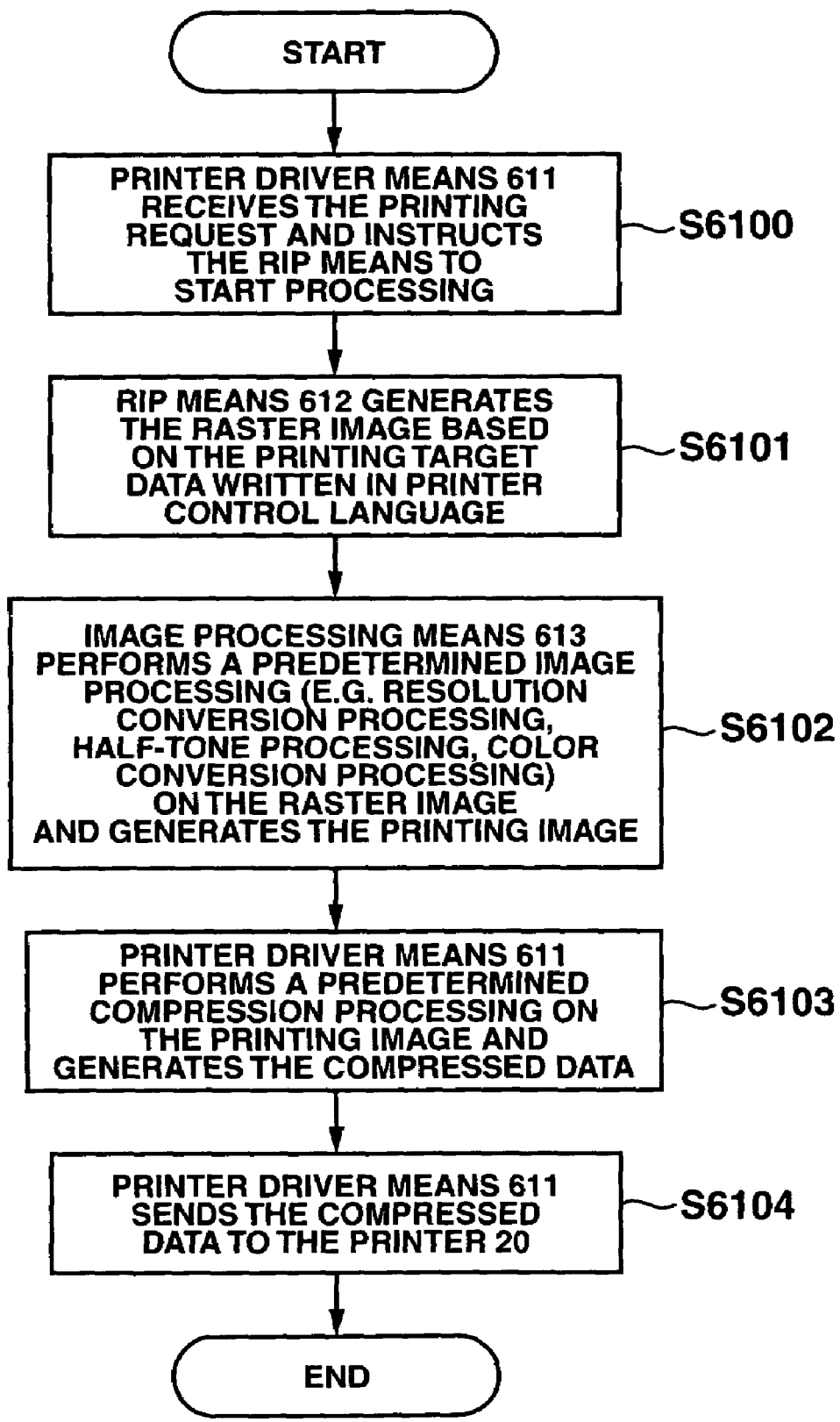
FIG. 64 is a flow chart depicting the processing content of the host device 10.

The printer driver means 611 accepts a printing request from an application program running externally or on the host device 10, and sends the printing instruction command to the printer 20 (printer controller 622), and instructs the RIP means 612 to start processing (FIG. 64: step S6100).

The RIP means 612 receives the instruction to start processing, and generates a raster image based on the printing target data written in a predetermined printer control language, such as PostScript®, received from the application program (FIG. 64: step S6101). If the printing target data can be received in raster image format from an application program, the processing by the RIP means 612 can be omitted.

Then the image processing means 613 performs a predetermined image processing (e.g. resolution conversion processing, half-tone processing, color conversion processing) on the generated raster image, and generates the printing image (FIG. 64: step S6102). For the resolution conversion processing, half-tone processing and color conversion processing, known methods can be used. The bit length (number of expression bits) of each pixel of the printing image depends on the half-tone processing, and can be freely determined according to the design, but in the eighth embodiment it is assumed that 1 pixel is expressed by 2 bits, that is 4 grayscales.

Then the printer driver means 611 performs a predetermined compression processing (e.g. JBIG) on the printing image to generate the compressed data (FIG. 64: step S6103), and sends this compressed data to the printer 20 (printer controller 622) (FIG. 64: step S6104).

When the receive means 623 receives the printing instruction command, the printer controller 622 controls the printer engine 621 using the engine control means 624 to prepare for printing. When the receive means 623 receives the compressed data, the printer controller performs decompression processing according to the compression processing to generate the printing image, and stores it in the RAM, and instructs the intra-dot position decision means 625 to start processing.

Figure 65:
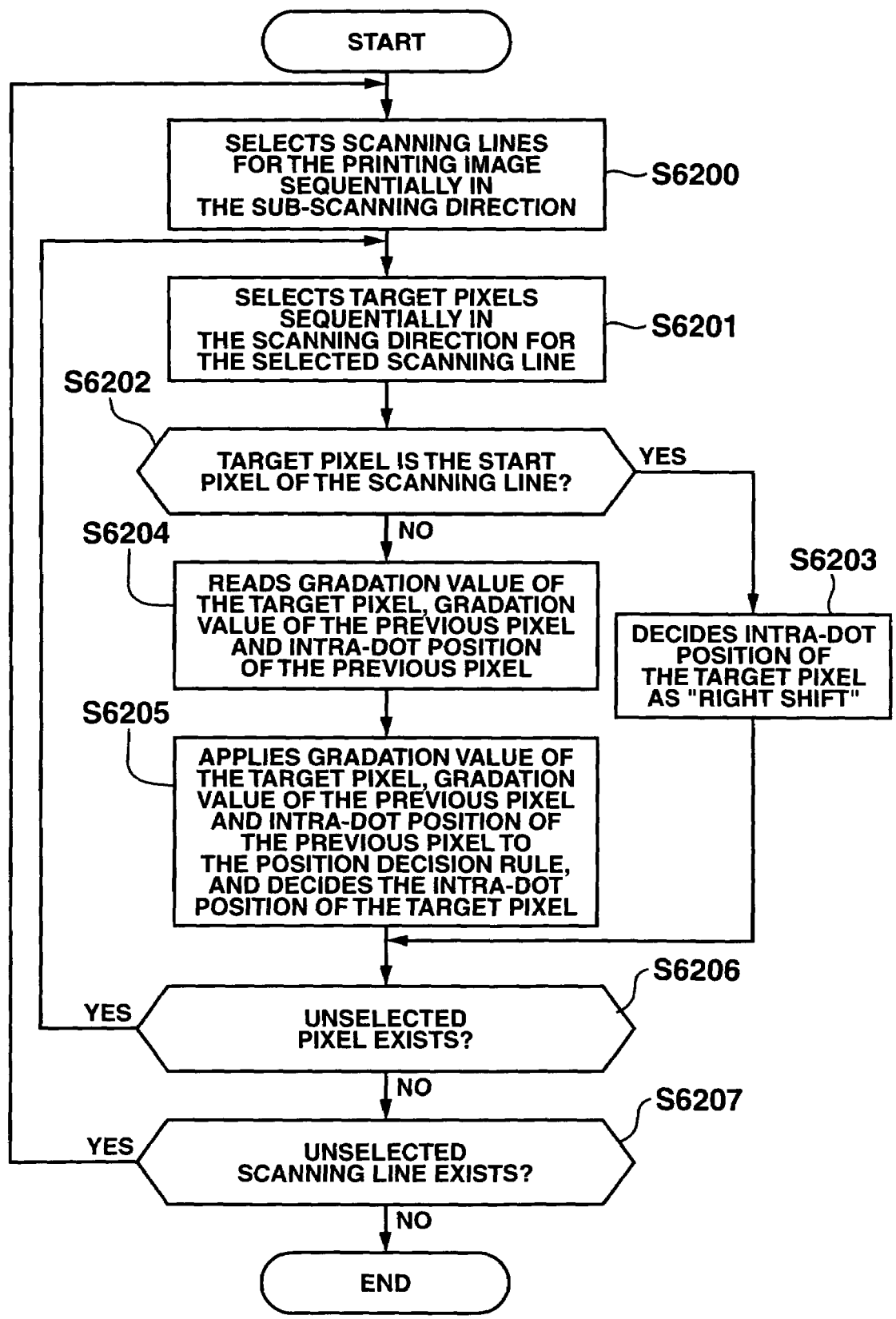
FIG. 65 is a flow chart depicting the processing content of the intra-dot position decision means 625.

The intra-dot position decision means 625 receives the instruction to start processing, and selects scanning lines sequentially in the sub-scanning direction for the printing image stored in the RAM (FIG. 65: step S6200).

Then the intra-dot position decision means 625 selects pixels sequentially in the scanning direction for the selected scanning line (FIG. 65: step S6201).

Then the intra-dot position decision means 625 judges whether the selected pixel (hereafter called "target pixel") is the start pixel of the scanning line (FIG. 65: step S6202).

If it is the start pixel of the scanning line, the intra-dot position decision means 625 determines the intra-dot position of the target pixel to "right shift", and stores this information of the intra-dot position in the predetermined area of RAM corresponding to this pixel (FIG. 65: step S6203). In the eighth embodiment, the concept of left and right is used assuming that the scanning line is horizontally scanned from left to right. Therefore "left shift" is the position shifted to the previous pixel from the current position, and "right shift" is the position shifted to the subsequent pixel from the current position.

If it is not the start pixel of the scanning line, on the other hand, the intra-dot position decision means 625 reads the gradation value of the target pixel, gradation value of the previous pixel of the target pixel (that is the adjacent left pixel of the target pixel), and the intra-dot position of the previous pixel from the RAM (FIG. 65: step S6204).

And the intra-dot position decision means 625 applies the gradation value of the target pixel, the gradation value of the previous pixel and the intra-dot position of the previous pixel to the position decision rule stored in RAM as the table shown in FIG. 66A, for example, so as to decide the intra-dot position of the target pixel, and stores this information of the intra-dot position in the predetermined area of the RAM corresponding to the target pixel (FIG. 65: step S6205).

If there are unselected pixels for the selected scanning line, the intra-dot position decision means 625 returns to S6201 (FIG. 65: step S6206), and if not and if there are unselected scanning lines, then the intra-dot position decision means 625 returns to S6200 to select the next scanning line (FIG. 65: step S6207).

Now the position decision rule shown in FIG. 66A will be described. This rule is structured such that the intra-dot position of the target pixel is determined to be "left shift" if the target pixel and the previous pixel have an intermediate gradation value of 1 or 2 and the intra-dot position of the previous pixel is "right shift", and otherwise the intra-dot position of the target pixel is determined to be "right shift". In other words, when the target pixel and the previous pixel have an intermediate gradation value, the intra-dot position of the target pixel is determined to be "left shift" if at least the intra-dot position of the previous pixel is "right shift". However if the gradation value is 0 or a maximum gradation value, this means that the latent image is not formed or that the latent image is full formed for a dot, so information on the intra-dot position is meaningless. Therefore the case when the gradation value becomes 0 or the maximum gradation value may be omitted from the position decision rule.

This position decision rule can also be interpreted as a rule where when the target pixel has an intermediate gradation value, the intra-dot position of the target pixel is determined to be "left shift" if at least the previous pixel has a gradation value smaller than the threshold 3, and the latent image of the previous pixel is formed at a position where integrations (or linking) with the latent image of the target pixel is possible (FIG. 66B). If interpreted in this way, the above threshold can be considered as a gradation value that can provide a latent image area sufficient for adhering toner. Such a threshold was established because if the gradation value of the previous pixel is the threshold or more, that is, having a latent image area sufficient for adhering toner, then the necessity to integrate the target pixel by shifting to the left is low. If the above interpretation is applied to the eighth embodiment, where threshold=maximum gradation value 3, the total dot area is set to be a latent image area sufficient to adhere toner.

Figure 67:
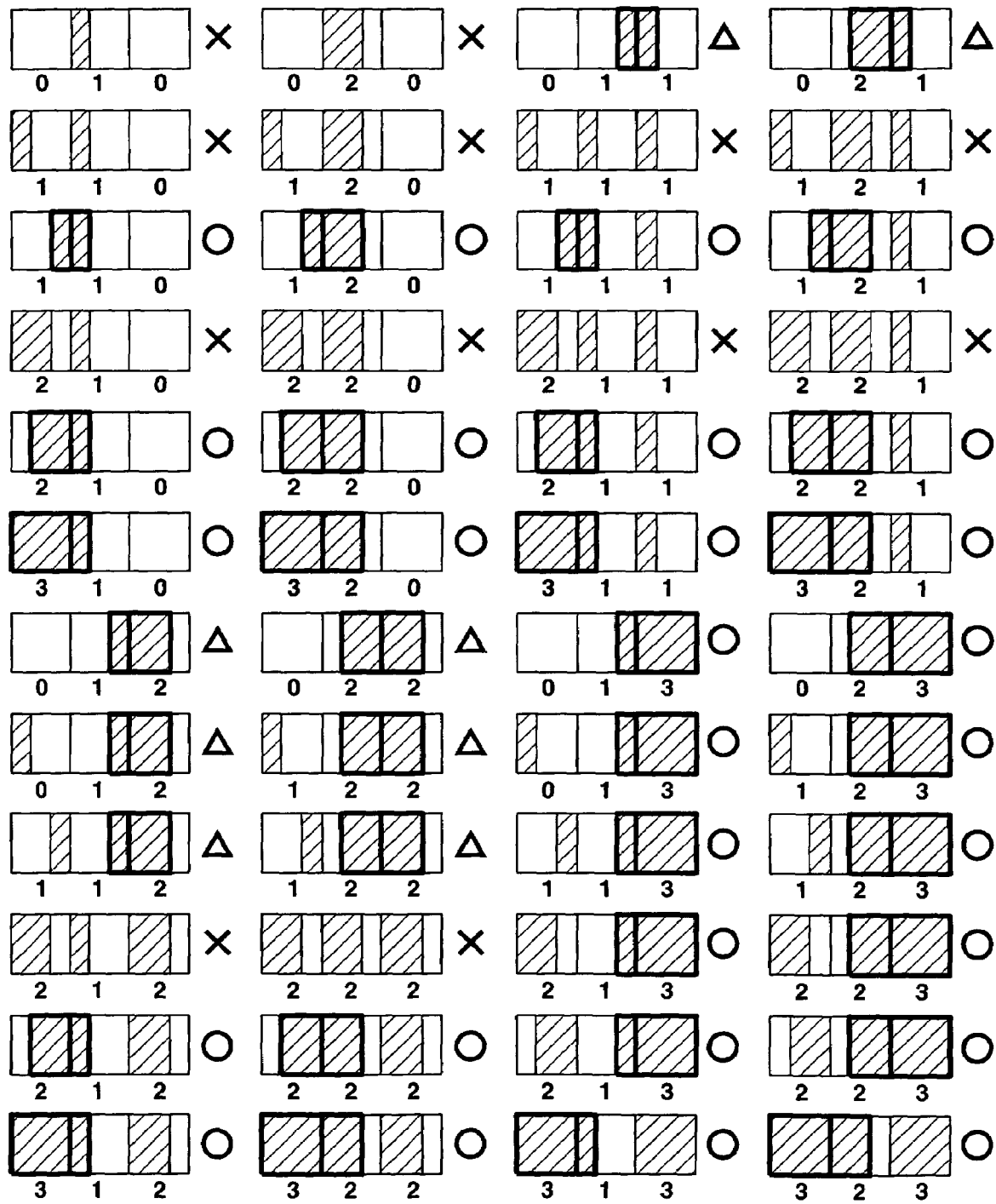
FIG. 67 is a diagram depicting the integration possibility of a latent image of a target pixel according to the prior art.
Figure 68:
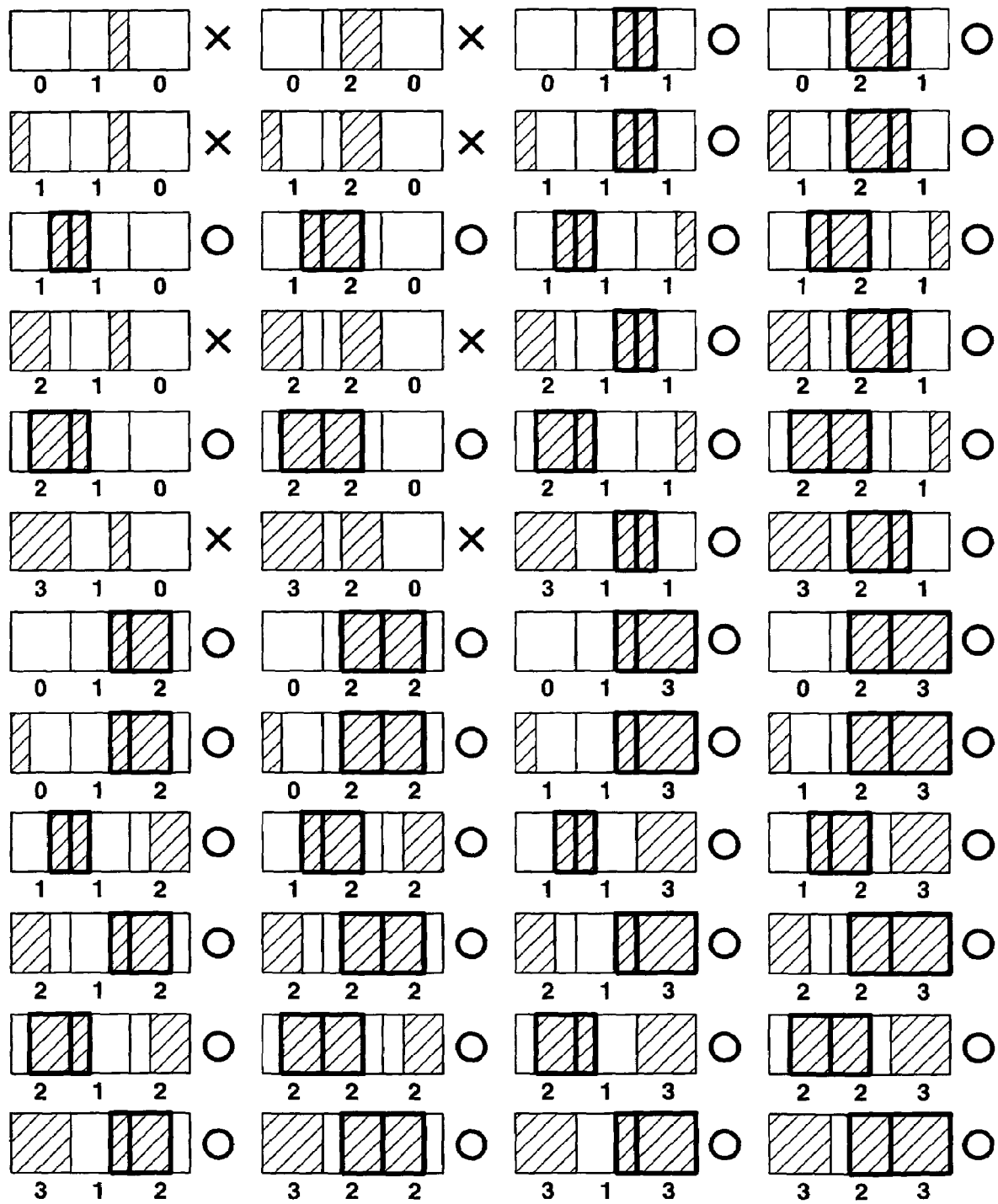
FIG. 68 is a diagram depicting the integration possibility of a latent image of a target pixel according to the eighth embodiment.

Now 48 patterns, in which whether the latent image of the target pixel can be integrated, and which changes depending on the intra-dot position of the target pixel, will be studied (see FIG. 67, FIG. 68). Each pattern in FIG. 67 and FIG. 68 has 3 pixels (previous pixel, target pixel, subsequent pixel) of the latent image, where the shaded portion is the latent image, and the number beneath each pixel indicates the gradation value. O, Δ and X at the right of each pattern indicates a pattern in which the latent image of the target pixel is always integrated, a pattern in which the integration possibility is determined depending on the second pixel after the target pixel (FIG. 67 and FIG. 68 show the case when integrated), and a pattern in which the latent image of the target pixel is never integrated respectively.

FIG. 67 shows the case of a prior art (a method of shifting the latent image formation position of the target pixel to the side of the adjacent pixel having high gradation). As FIG. 67 shows, 28 out of 48 patterns are cases when the latent image of the target pixel is always integrated, and 8 patterns are cases when the integration possibility is determined depending on the second pixel after the target pixel. If the left and right adjacent pixels have a same gradation value, "left shift" is applied.

FIG. 68 shows the case when the above mentioned rule of the eighth embodiment is applied. As FIG. 68 shows, 40 out of 48 patterns are cases when the latent image of the target pixel is always integrated, which is more patterns than prior art can integrate the latent image of the target pixel.

In this way, if the above mentioned rule is applied, more patterns can be integrated, so the integration possibility of a target pixel increases, and as a result, the defects of toner adhesion caused by a small electrostatic latent image area can be avoided, and high quality images can be formed.

When the processing of the intra-dot position decision means 625 ends for a predetermined number of scanning lines (e.g. for one band), the printer controller 622 instructs the engine control means 624 to start the signal transmission processing to the printer engine 621.

When the instruction to start processing is received, the engine control means 624 reads the gradation value and the intra-dot position of each pixel from RAM in the scanning sequence (FIG. 69: step S6300), and decides the pulse width value according to the gradation value and the pulse position according to the intra-dot position (FIG. 69: step S6301), and supplies the information on the pulse width value and the pulse position as a pair to the PWM unit (FIG. 69: step S6302). The PWM unit generates pulse width-modulated laser drive pulses according to the pulse width value and the pulse position (FIG. 69: step S6303), and sends the laser drive pulse to the printer engine 621 according to the synchronization signal from the printer engine 621 (FIG. 69: step S6304).

The printer engine 621 drives the laser diode based on the received laser drive pulse, and irradiates the laser beam onto the photosensitive drum. By this, the laser beam is irradiated only onto the area determined by the pulse width value, to the left or right, determined by the pulse position in a dot corresponding to each pixel, and toner is adhered onto that area. And the transfer and fusing to the printing paper is performed and the image is formed.

According to this configuration, the intra-dot position of the target pixel is determined based only on the information of the previous pixel without comparison with the gradation value of the subsequent pixel, so the processing to determine the intra-dot position can be simplified, and the overhead caused by the processing to acquire the gradation value of the subsequent pixel (e.g. decompression processing of compressed data where the subsequent pixel is included) can be avoided. Also by determining the intra-dot position of the target pixel based on the intra-dot position of the previous pixel, the possibility of integrating the latent image of the target pixel can be increased, the defects of toner adhesion caused by a small electrostatic latent image area can be avoided, and high quality images can be formed.

(Other)

The present invention is not limited to the eighth embodiment, but can be modified in various ways and applied.

For example, in the eighth embodiment, the rule can be interpreted as threshold=maximum gradation value 3, that is total dot area=electrostatic latent image area sufficient for adhering toner, but it is not necessary to always set the maximum gradation value as the threshold. For example, if toner can be adhered sufficiently, even in an electrostatic latent image area, with an intermediate gradation value smaller than the maximum gradation value (area smaller than a dot) depending on the performance of the printer engine 621, then such an intermediate gradation value can be determined as a threshold.

Conversely, the threshold value may be set to maximum gradation value+$\alpha$. In this case, conditions on the gradation value of the previous pixel are not satisfied, therefore if the electrostatic latent image of the previous pixel is formed at a position where integration with the electrostatic latent image of the target pixel is possible, the latent image formation position of the target pixel is determined to be a position shifted to the previous pixel, and if not, the latent image formation position of the target pixel is determined to be a position shifted to the subsequent pixel.

Also in the eighth embodiment, the intra-dot position of the target pixel is determined based only on the information of the previous pixel, but information on a plurality of previous pixels may be used for the gradation value.

Also in the eighth embodiment, the printer 20 comprises the printer controller 622, but the present invention is not limited to this configuration. For example, the printer controller may be constructed as an external device that can be connected to the printer 20. Also the printer controller 622 may be constructed as a device that can be connected to the host device 10 according to a PCI bus standard, for example, and in this case, each function of the printer controller 622 may be implemented by the CPU of the host device 10.

Finally the present invention may be applied to any color/monochrome printer, or may be applied to an image creation device other than a printer.

The entire disclosure of Japanese Patent Application No. 2003-343692 filed on Oct. 1, 2003, No. 2003-360725 filed on Oct. 21, 2003, No. 2003-379008 filed on Nov. 7, 2003, No. 2003-384191 filed on Nov. 12, 2003, No. 2003-359773 filed on Oct. 20, 2003, No. 2003-370788 filed on Oct. 10, 2003, including specification, claims, drawings and summary are incorporated herein by reference in its entirety.

We claim:

1. An image processor for performing image processing in parallel using a plurality of processors, wherein when an individual scanning line is divided into a plurality of partial areas, at least one of said plurality of processors is allocated to each of said partial areas for at least one scanning line constituting an image, and image processing is performed in parallel, wherein the image processor comprises:

memory areas for the number of scanning lines, less than the number of said plurality of processors, as memory areas for storing an image processing result; and means of transferring the corresponding image processing result to a processor in the subsequent stage in the sequence of the lineup of the partial areas in the scanning line;

wherein a lineup of a bit length of each pixel in said image has a periodic pattern, and a boundary of each of said partial areas matches at least one boundary of said periodic pattern.

2. The image processor according to claim 1, wherein said image processing is image compression processing or image decompression processing.

3. An image processor for decompressing the data in parallel targeting data compressed for each partial area when scanning lines (or bands) constituting an image are divided into a plurality of said partial areas perpendicular to the direction of the scanning lines, comprising: a plurality of FIFO type memories installed corresponding to each partial area respectively; storage means for distributing burst-transferred data in data set units including the compressed data of which capacity is the same for each partial area, to the compressed data of said each partial area and storing the distributed data in the corresponding memories; and a parallel processor unit in which each processor reads the compressed data of said each partial area from a memory corresponding to the allocated partial area respectively, and executes decompression processing in parallel synchronizing in scanning line (or band) units.

4. A printer comprising the image processor according to claim 3.

5. An image processing system comprising an image compression unit and an image decompression unit, each of which has a function to perform image processing in parallel using a plurality of processors, wherein the image compression unit allocates at least one of the plurality of processors to each of the partial areas when scanning lines (or bands) constituting an image are divided into a plurality of said partial areas perpendicular to the direction of the scanning lines, and performs image compressing in parallel, and burst-transmits the data to the image decompression unit in data set units including compressed data of which capacity is the same for each partial area, and the image decompression unit receives the burst-transferred data from the image compression unit and distributes this received data to the compressed data for each partial area, stores it in an FIFO type memory installed corresponding to each partial area respectively, and controls each processor to read the compressed data of the partial area from each memory allocated respectively, and to perform image decompression processing in parallel synchronizing in scanning line (or band) units.

6. An image processing method for decompressing the data in parallel targeting data compressed for each partial area using a plurality of processors when scanning lines (or bands) constituting an image are divided into a plurality of said partial areas perpendicular to the direction of the scanning lines, comprising steps of: receiving burst-transferred data in data set units including compressed data of which capacity is the same for each partial area and distributing this received data to the compressed data for each partial area, and storing the distributed data in an FIFO memory installed corresponding to each partial area; and controlling each processor to read the compressed data of the partial data from a memory allocated to each processor and to perform image decompression processing in parallel synchronizing in scanning line (or band) units.

7. A computer readable storage medium storing instructions for causing a computer to execute the image processing method according to claim 6.

8. An image processor for performing image processing in parallel using a plurality of processors, wherein when an individual scanning line is divided into a plurality of partial areas, at least one of said plurality of processors is allocated to each of said partial areas for at least one scanning line constituting an image, and image processing is performed in parallel,
wherein the image processor comprises:
memory areas for the number of scanning lines, less than the number of said plurality of processors, as memory areas for storing an image processing result; and
means of transferring the image processing result to a processor in the subsequent stage when the image processing result for one scanning line is collected;
wherein a lineup of a bit length of each pixel in said image has a periodic pattern, and a boundary of each of said partial areas matches at least one boundary of said periodic pattern.

9. An image processing method for performing image processing in parallel using a plurality of processors, wherein when an individual scanning line is divided into a plurality of partial areas, at least one of said plurality of processors is allocated to each of said partial areas for at least one scanning line constituting an image, and image processing is performed in parallel,
wherein the image processor comprises:
memory areas for the number of scanning lines, less than the number of said plurality of processors, as memory areas for storing an image processing result; and
means of transferring the corresponding image processing result to a processor in the subsequent stage in the sequence of the lineup of the partial areas in the scanning line;
wherein a lineup of a bit length of each pixel in said image has a periodic pattern, and a boundary of each of said partial areas matches at least one boundary of said periodic pattern.

10. A computer readable storage medium storing instructions causing a computer to execute the image processing method according to claim 9.

11. A printer control unit having a function for performing image processing in parallel using plurality of processors, comprising control means by which when an individual scanning line is divided into a plurality of areas, at least one of said plurality of processors is allocated to each of said partial areas for at least one scanning line constituting an image, and image compression processing is performed in parallel, and compressed data corresponding to each partial area is transmitted to a printer, wherein when the bit length of each pixel of a partial area corresponding to a processor is L1-LN respectively, said control means controls said processor to perform image compression processing of said partial area targeting at least the (L1+ - - - +LN) length data string in which data of said each pixel is lined up,
wherein the lineup of the bit length of each pixel in said image has a periodic pattern, and the boundary of said partial area matches at least one of the boundaries of said periodic pattern.

12. An image processor for performing image processing in parallel using a plurality of processors, comprising control means by which when an individual scanning line is divided into a plurality of partial areas, at least one of said plurality of processors is allocated to each of said partial areas for at least one scanning line constituting an image, and image processing is performed in parallel, wherein when the bit length of each pixel of a partial area corresponding to a processor is L1-LN respectively, said control means controls said processor to perform image processing of said partial area targeting at least the (L1+ - - - +LN) length data string in which the data of said each pixel is lined up,
wherein a lineup of the bit length of each pixel in said image has a periodic pattern, and a boundary of said partial area matches at least one boundary of said periodic pattern.

13. The image processor according to claim 12, wherein said image processing is image compression processing or image decompression processing.

14. The image processor according to claim 12, further comprising storage means for storing said periodic pattern, wherein said control means acquires the bit length of each pixel by applying said periodic pattern to said (L1+ - - - +LN) length data string, and extracts information for each pixel.

15. The image processor according to claim 12, wherein at least one of the bit lengths L1-LN of said each pixel is different from the other bit lengths.

16. An image processing method for performing image processing in parallel using a plurality of processors, wherein when an individual scanning line is divided into a plurality of partial areas, at least one of said plurality of processors is allocated to each of said partial areas for at least one scanning line constituting an image, and image processing is performed in parallel,
wherein the image processor comprises:
memory areas for the number of scanning lines, less than the number of said plurality of processors, as memory areas for storing an image processing result; and
means of transferring the image processing result to a processor in the subsequent stage when the image processing result for one scanning line is collected;
wherein a lineup of a bit length of each pixel in said image has a periodic pattern, and a boundary of each of said partial areas matches at least one boundary of said periodic pattern.

17. A computer readable storage medium storing instructions causing a computer to execute the image processing method according to claim 16.

18. A printer having a function for performing image processing in parallel using a plurality of processors, comprising: storage means for storing a periodic pattern for specifying the lineup of a bit length of each pixel; and control means by which an individual scanning line is divided into a plurality of partial areas, compressed partial data corresponding to each of said partial areas is received from a host device, and at least one of said plurality of processors is allocated to the compressed partial data for at least one scanning line constituting an image, and image decompression processing is performed in parallel, wherein when the bit length of each pixel of a partial area corresponding to a processor is L1-LN respectively, said control means acquires the bit length of each pixel by applying said periodic pattern, and extracts information for each pixel targeting at least the (L1+ - - - +LN) length data string in which data of said each pixel, that said processor output as the result of image decompression processing, is lined up.

19. A printer system comprising a host device and a printer that can communicate with said host device, in which the host device and printer have a function to perform image processing in parallel using a plurality of processors respectively; wherein the host device comprises first control means for allocating, when an individual scanning line is divided into a plurality of partial areas, at least one of said plurality of processors is allocated to each of said partial areas for at least one scanning line constituting an image, performing image compression processing in parallel, and transmitting the compressed data, corresponding to each partial area (hereafter called "compressed partial data"), to the printer, when the bit length of each pixel of a partial area corresponding to a processor is L1-LN respectively, said first control means controls said processor to perform image compression processing of said partial area targeting at least the (L1+ - - - +LN) length data string in which data of said each pixel is lined up, said printer comprises storage means for storing a periodic pattern for specifying the lineup of the bit length of each pixel, and second control means by which when an individual scanning line is divided into a plurality of partial areas, compressed partial data corresponding to each of said partial area is received from the host device, and at least one of the plurality of processors is allocated to the compressed partial data for at least one scanning line constituting an image, and image decompression processing is performed in parallel, and when the bit length of each pixel of a partial area corresponding to a processor is L1-LN respectively, said second control means acquires the bit length of each pixel by applying said periodic pattern and extracts information for each pixel targeting at least the (L1+ - - - +LN) length data string in which the data of each pixel, that said processor output as a result of image decompression processing, is lined up.

20. An image processing method, wherein when the bit length of each pixel of a scanning line constituting an image is L1-LN respectively, image processing for said scanning line is performed for at least one scanning line, targeting at least the (L1+ - - - +LN) length data string in which the data of said each pixel is lined up, and wherein the lineup of the bit length of each pixel in said image has a periodic pattern, and the boundary of said partial area matches at least one of the boundaries of said periodic pattern.

21. A computer readable storage medium storing instructions causing a computer to execute the image processing method according to claim 20.

22. An image processor for decompressing data in parallel targeting data compressed for each partial area when scanning lines (or bands) constituting an image are divided into a plurality of said partial areas perpendicular to the direction of the scanning line, comprising: means of reading compressed data of each partial area from a first memory for storing burst-transferred data in data set units including compressed data of which capacity is the same for each partial area so as to maintain the lineup sequence of the scanning lines (or bands), and transferring the compressed data to an FIFO type second memory; means of allocating at least one of a plurality of processors to said partial areas respectively; and a parallel processor unit in which each processor reads compressed data in the partial area where said processor itself is allocated from the second memory and executes decompression processing in parallel synchronizing in scanning line (or band) units.

23. A printer comprising the image processor according to claim 22.

24. An image processing system comprising an image compression unit and an image decompression unit, each of which has a function to perform image processing in parallel using a plurality of processors, wherein the image compression unit allocates at least one of the plurality of processors to each of partial areas when scanning lines (or bands) constituting an image are divided into a plurality of said partial areas perpendicular to the direction of the scanning line, and performs image compression processing in parallel, and burst-transmits the data to the image decompression unit in data set units including compression data of which capacity is the same for each partial area, and the image decompression unit receives the burst-transferred data from the image compression unit and stores it in a first memory, reads the compressed data of each partial area from said first memory so as to maintain the lineup sequence of the scanning lines (or bands), and transfers it to an FIFO type second memory, and allocates at least one of the plurality of processors to each of said partial areas, and controls each processor to read the compressed data of the partial area where the processor itself is allocated, and to perform image decompression processing in parallel synchronizing in scanning line (or band) units.

25. An image processing method for decompressing the data in parallel targeting data compressed for each partial area when scanning lines (or bands) constituting an image are divided into a plurality of said partial areas perpendicular to the direction of the scanning lines, comprising steps of: receiving burst-transferred data in data set units including compressed data of which capacity is the same for each partial area and storing it in a first memory; reading the compressed data of each partial area from said first memory so as to maintain the lineup sequence of the scanning lines (or bands), and storing it in an FIFO type second memory; and allocating at least one of the plurality of processors to each of said partial areas, and controlling each processor to read compressed data in the partial area where said processor itself is allocated from a second memory and to perform image decompression processing in parallel synchronizing in scanning line (or band) units.

26. A computer readable storage medium storing instructions for causing a computer to execute the image processing method according to claim 25.

* * * * *